US008904615B2

(12) United States Patent
Ohno et al.

(10) Patent No.: US 8,904,615 B2
(45) Date of Patent: Dec. 9, 2014

(54) FASTENING DEVICE, METHOD OF LOADING FASTENING MEMBER, AND DEVICE FOR LOADING FASTENING MEMBER

(75) Inventors: Kenichi Ohno, Tochigi (JP); Mitsutaka Igaue, Tochigi (JP); Kenichiro Ono, Tochigi (JP); Takeshi Nakamura, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 197 days.

(21) Appl. No.: 13/139,395

(22) PCT Filed: Oct. 1, 2009

(86) PCT No.: PCT/JP2009/067157
§ 371 (c)(1),
(2), (4) Date: Jun. 17, 2011

(87) PCT Pub. No.: WO2010/070966
PCT Pub. Date: Jun. 24, 2010

(65) Prior Publication Data
US 2011/0245052 A1    Oct. 6, 2011

(30) Foreign Application Priority Data

Dec. 16, 2008 (JP) ................. 2008-319782
Dec. 17, 2008 (JP) ................. 2008-321054
Jun. 2, 2009  (JP) ................. 2009-133060
Jul. 8, 2009  (JP) ................. 2009-161636

(51) Int. Cl.
B25B 17/00    (2006.01)
B25B 23/00    (2006.01)
B23Q 17/00    (2006.01)
B23P 21/00    (2006.01)
B23Q 7/10     (2006.01)
B23P 11/00    (2006.01)
B23P 19/06    (2006.01)

(52) U.S. Cl.
CPC ........................ B23P 19/06 (2013.01)
USPC ............. 29/407.02; 29/407.1; 29/525.11; 29/785; 29/787; 29/809; 81/57.23; 81/57.37; 81/57.3; 227/109; 227/112; 227/117; 227/118; 227/135

(58) Field of Classification Search
CPC .......... B23Q 17/00; B23Q 7/10; B23P 11/00; B23P 17/00; B23P 21/00; B25C 5/02; B25C 5/06; B25C 5/00; B25B 17/00; B25B 23/00; B25B 13/02; B25B 17/02
USPC .............. 29/407.02, 407.1, 525.11, 785, 787, 29/809, 428; 227/109, 112, 117, 118, 135; 81/57.23, 57.37, 124.1, 57.3
See application file for complete search history.

(56) References Cited

U.S. PATENT DOCUMENTS 2,868,053 A * 1/1959 Jorgensen et al. ........... 81/57.23
2,878,700 A * 3/1959 Reynolds .................... 81/57.37

(Continued)

FOREIGN PATENT DOCUMENTS

JP    62-32734    2/1987
JP    03-283830   11/1988

(Continued)

OTHER PUBLICATIONS

English translation of JP2000-198032A, machine translation.*

*Primary Examiner* — David Bryant
*Assistant Examiner* — Darrell C Ford
(74) *Attorney, Agent, or Firm* — Rankin, Hill & Clark LLP

(57) ABSTRACT

A fastening device includes a rotational drive portion that rotationally drives a socket, an advance/retract drive portion that causes this socket to advance or retract along a rotational axis thereof, a magazine that retains a plurality of heads that retain bolts, and a switching portion that moves this magazine to selectively position one of a plurality of heads ahead and on the rotational axis of the socket. One of the heads is selected and positioned on the rotational axis of the socket by the switching portion, then the socket is advanced by the advance/retract drive portion and the head thus selected is retained by the socket, then the socket is advanced further by the advance/retract drive portion and the head to detach is detached from the magazine, and then the head is rotated by driving the rotational drive portion, thereby fastening a bolt retained in the head.

3 Claims, 41 Drawing Sheets

(56) References Cited

U.S. PATENT DOCUMENTS

| | | | |
|---|---|---|---|
| 3,586,115 A * | 6/1971 | Amtsberg et al. | 173/33 |
| 3,757,613 A * | 9/1973 | Arndt et al. | 81/57.22 |
| 4,237,605 A * | 12/1980 | Jung et al. | 29/783 |
| 4,265,147 A * | 5/1981 | Fox | 81/55 |
| 4,335,500 A * | 6/1982 | Munekata et al. | 483/59 |
| 4,338,709 A * | 7/1982 | Straub et al. | 29/26 A |
| 4,474,090 A * | 10/1984 | Berecz | 81/431 |
| 4,586,405 A * | 5/1986 | Berecz | 81/57.37 |
| 4,926,719 A * | 5/1990 | Kross et al. | 81/57.37 |
| 5,295,295 A * | 3/1994 | Aoyama | 29/813 |
| 5,457,866 A * | 10/1995 | Noda | 29/407.02 |
| 5,864,937 A * | 2/1999 | Cecil et al. | 29/464 |
| 6,138,340 A * | 10/2000 | Yoshida | 29/468 |
| 6,668,685 B2 * | 12/2003 | Boston | 81/57.22 |
| 6,813,977 B2 * | 11/2004 | Goodhue et al. | 81/433 |
| 7,134,368 B2 * | 11/2006 | Nagy | 81/490 |
| 7,377,019 B2 * | 5/2008 | Haytayan | 29/432 |
| 8,438,955 B2 * | 5/2013 | Wilson et al. | 81/57.36 |
| 8,544,369 B2 * | 10/2013 | Park | 81/435 |
| 2004/0129090 A1 * | 7/2004 | Schoeps | 73/862.21 |
| 2006/0201282 A1 * | 9/2006 | Lee | 81/58.3 |
| 2007/0095155 A1 * | 5/2007 | Rainone et al. | 73/862.22 |
| 2007/0214919 A1 * | 9/2007 | Ehleiter et al. | 81/451 |
| 2008/0059131 A1 * | 3/2008 | Tokita et al. | 703/5 |
| 2010/0202842 A1 * | 8/2010 | Whitehead et al. | 408/16 |
| 2013/0192389 A1 * | 8/2013 | Carlin et al. | 73/862.21 |

FOREIGN PATENT DOCUMENTS

| | | |
|---|---|---|
| JP | 01-271179 | 10/1989 |
| JP | H03-096137 | 10/1991 |
| JP | 04-183529 | 6/1992 |
| JP | 5-60738 | 8/1993 |
| JP | 6218637 | 8/1994 |
| JP | 6-66931 | 9/1994 |
| JP | 07-040158 | 2/1995 |
| JP | 07-060567 | 3/1995 |
| JP | 07-076161 | 3/1995 |
| JP | 09-011068 | 1/1997 |
| JP | 2000-198032 | 7/2000 |
| JP | 2007-111794 | 5/2007 |

* cited by examiner

CONTROL DEVICE

FIG. 45
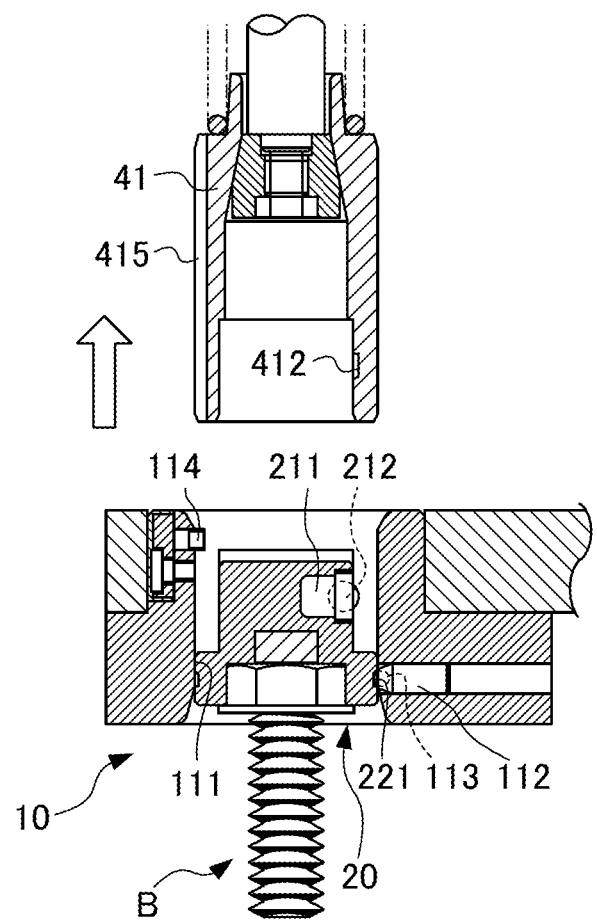
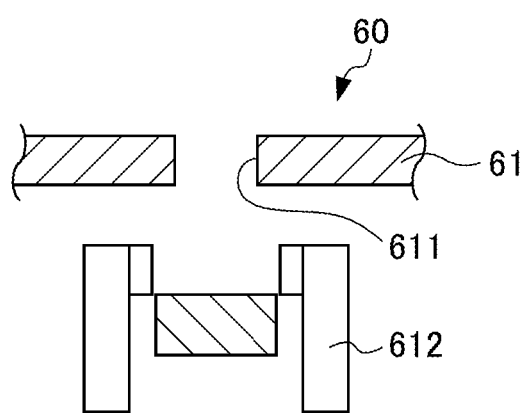

FASTENING DEVICE, METHOD OF LOADING FASTENING MEMBER, AND DEVICE FOR LOADING FASTENING MEMBER

TECHNICAL FIELD

The present invention relates to a fastening device. Specifically, it relates to a fastening device that fastens a screw or bolt to a predetermined location on a work. In addition, the present invention relates to a method of loading a fastening member. Specifically, the present invention relates to a method of loading a fastening member in which a fastening member such as a bolt or screw is loaded into a magazine of a fastening device. Furthermore, the present invention relates to a device for loading a fastening member. Specifically, the present invention relates to a device for loading a fastening member that loads a fastening member such as a bolt or screw in a retaining portion.

BACKGROUND ART

Conventionally, in the manufacturing process of automobiles, the fixing of components to a plurality of locations on a work by screws or bolts has been performed using a fastening device.

For example, this fastening device includes a robot arm and a nut runner provided to a leading end of this robot arm (refer to Patent Document 1). Then, a bolt is retained by a socket of the nut runner, and when a component is conveyed in a state temporarily fixed to the work, the robot arm is controlled to insert the bolt retained in this nut runner into a predetermined location of the work. Thereafter, the socket is made to rotate to fasten the bolt.

However, in recent years, a plurality of types of vehicle models have been manufactured on one line, as a result of which it has been demanded for a plurality of types of bolts to be fastened with one fastening device. Therefore, the following such fastening device has been proposed (refer to Patent Document 2).

Specifically, the fastening device of Patent Document 1 includes a plate-shaped pallet to which a socket is mounted, and a nut runner arranged below this pallet. A bolt is retained in the socket. According to this fastening device, first, the rotational shaft of the nut runner is made to ascend to fit together with the socket, whereby the socket is mounted to a lead end of the rotational shaft. Next, the socket mounted to the leading end of the nut runner is made to ascend slightly by moving the nut runner, after which this socket detaches from the pallet by moving in a horizontal direction. Thereafter, the nut runner is made to ascend again to make the socket approach a predetermined position on the work, and the bolt is fastened. Subsequently, the nut runner is made to descend and the head is mounted to a magazine again.

However, since the bolt is retained to the socket of this nut runner, a bolt loading device is used. Relative to bolts that have been aligned in advance, the bolt loading device makes the socket approach the head of a bolt from above the bolt while rotating, and matches the phase with the head of the bolt, thereby fitting the bolt and the socket (e.g., refer to Patent Document 3).

Patent Document 1: Japanese Patent No. 2929879
Patent Document 2: Japanese Unexamined Patent Application Publication No. H7-60567
Patent Document 3: Japanese Unexamined Utility Model Application Publication No. H3-96137

DISCLOSURE OF THE INVENTION

Problems to be Solved by the Invention

However, with the configuration exemplified in Patent Document 2, the socket cannot be detached from the pallet simply by causing it to ascend, whereupon it is necessary to move it in a horizontal direction. When the movement direction of the socket is changed in this way, there has been a problem in that a long time is required in fastening of the bolt. In addition, with the configuration exemplified in Patent Document 2, when the head is mounted to the magazine after having fastened a bolt, there has been a problem in that the rotational phase of the head is not constant. In addition, with the configuration exemplified in Patent Document 2, since the bolts loaded to the magazine are of one type, there has been a problem in that a plurality of types of bolts cannot be fastened thereby. Moreover, with the bolt loading device exemplified in Patent Document 3, since it cannot be determined whether a bolt has been fitted to the socket, there has been a problem in that an operation of phasing by rotating the socket is performed even after phasing between the bolt and socket has completed, whereby time loss arises.

The present invention has an object of providing a fastening device that can shorten the time required to fasten a fastening member. The present invention has an object of providing a fastening device that can adjust the socket to a predetermined rotational phase when causing the head to retain to the magazine again after fastening a bolt. The present invention has an object of providing a method of loading a fastening member that allows a plurality of types of fastening members to be loaded to a magazine. The present invention has an object of providing a device for loading a fastening member that can execute a subsequent operation immediately after phasing between the fastening member and a retaining portion has completed, whereby time loss can be decreased.

Means for Solving the Problems

A fastening device (e.g., the fastening device 6 described later) according to the present invention includes: a rotational drive portion (e.g., the rotational drive portion 40 described later) that rotationally drives a socket (e.g., the socket 41 described later); an advance/retract drive portion (e.g., the advance/retract drive portion 50 described later) that causes the socket to advance and retract along a rotational axis thereof; a magazine (e.g., the magazine 10 described later) that retains a plurality of heads (e.g., the head 20 described later) for retaining fastening members (e.g., the bolt B described later); and a switching portion (e.g., the switching portion 30 described later) that moves the magazine to selectively position one among the plurality of heads ahead of the socket on the rotational axis thereof, in which the plurality of heads is retained to the magazine so as to detach from the magazine when moved in an advancing direction of the socket, and in which one among the plurality of heads is selected and made to be positioned on the rotational axis of the socket by the switching portion, then the socket is made to advance by the advance/retract drive portion and the head thus selected is retained by the socket, then the socket is made to advance further by the advance/retract drive portion and the head is made to detach from the magazine, and then the head is made to rotate by driving the rotational drive portion, thereby fastening a fastening member retained in the head.

In this case, it is preferable for a plurality of through-holes (e.g., the head recess portion 111 described later) to be formed in the magazine, the plurality of heads to be housed in the plurality of through-holes, respectively, the head to be retained in the socket and detach from the magazine when the socket advances and penetrates the through-hole, and the head to be retained in the magazine again and detach from the socket when, from a state in which the head is detached from the magazine, the socket retracts and is pulled out from the through-hole.

According to the present invention, the head can be retained by the socket by simply causing the socket to advance by way of the advance/retract drive portion, after which the head can be made to detach from the magazine. Therefore, since it is no longer necessary to change the movement direction of the head as is conventionally, the time required in fastening of a fastening member can be shortened. In addition, it is configured such that a plurality of heads is retained in the magazine, and one among the plurality of heads is selectively positioned ahead and on the rotational axis of the socket by moving this magazine. Therefore, by having a different type of fastening member retained in the respective heads, and appropriately selecting one among these heads by driving the switching portion, a desired bolt from among the plurality of types of fastening members can be fastened.

In this case, it is preferable for the force at which the magazine retains the head to be larger than the force at which the socket retains the head, in a case of the socket being pulled out from the through hole by retracting the socket.

According to the present invention, since the force at which the magazine retains the head is set to be larger than the force at which the socket retains the head, it is possible to retain the head in the magazine while allowing to detach from the socket easily, when causing the socket to retract to pull out from the through hole.

In this case, it is preferable for the mechanism by which the magazine retains the head and the mechanism by which the socket retains the head to be configured by a plunger (e.g., the plunger 112, 211 described later) and a concaved portion (e.g., the concaved portion 221, 412 described later) at which the plunger engages, and for the retaining force of these two to be adjusted by the angle of the wall surface (vertical surface 222, tapered surface 223, vertical surface 414, tapered surface 413) of the concaved portion engaged by the plunger.

According to the present invention, the mechanism by which the magazine retains the head and the mechanism by which the socket retains that head are configured by plungers and concaved portions engaged by these plungers. Therefore, the mechanism by which the magazine retains the head and the mechanism by which the socket retains the head can be realized with a simple configuration.

In this case, it is preferable for a plurality of through-holes (e.g., the head recess portion 111 described later) to be formed in the magazine, for the plurality of heads to be housed in the plurality of through-holes, respectively, for a protrusion (e.g., the pin 114 described later) to be provided to an inner circumferential surface of the through-hole, for a step (e.g., the step 415 described later) from a base edge to a leading edge of the socket is formed at the outer circumferential surface of the socket, for the head to be retained inside the socket and made to detach from the magazine by causing the socket to advance to penetrate the through-hole by way of the advance/retract drive portion, a fastening member retained in the head to be fastened by making the head rotate by way of the rotational drive portion, and the head to be made to detach from the socket and be retained in the magazine again by causing the socket to retract to pull out from the through-hole by way of the advance/retract drive portion, and for the protrusion to engage with the step of the socket while the socket is made to retract to pull out from the through-hole, and then the socket to rotate by the step of the socket being pressed by the protrusion in accordance with the socket retracting.

According to the present invention, when the socket is made to retract and is pulled out from the through hole, the protrusion engages the step of the socket, and then the step of the socket is pressed by the protrusion in accordance with the socket retracting, and the socket rotates. Therefore, when the head is retained again to the magazine after fastening of the bolt, the head can be adjusted to a predetermined rotational phase relative to the magazine.

In this case, it is preferable for the protrusion to engage the step of the socket when the socket is made to advance and penetrates the through hole, and then the socket to rotate by the step of the socket being pressed by the protrusion in accordance with the socket advancing.

According to the present invention, the protrusion engages the step of the socket when the socket is made to advance and penetrates the through hole, and then the socket rotates by the step of the socket being pressed by the protrusion in accordance with the socket advancing. Therefore, when the socket is inserted to the magazine, the socket can be adjusted to a predetermined rotational phase relative to the head.

In this case, it is preferable for a one-way clutch (e.g., the one-way clutch 421 described later) that allows the socket to free-wheel only in one direction to be provided to the rotational drive portion.

According to the present invention, since the one-way clutch is provided to the rotational drive portion, it is no longer necessary to cause the entire rotational drive portion to rotate when the socket is pressed by the protrusion and made to rotate, and since the socket can be made to rotate with little pressing force, operation of the fastening device is smooth.

In this case, when the socket is made to retract and pulls out from the through hole, it is preferable for the protrusion to engage the head, thereby restricting retraction of the head.

According to the present invention, when the socket is made to retract and pulls out from the through hole, since the protrusion is made to engage the head, thereby restricting retraction of the head, the head 20 can be prevented from pulling out from the magazine with the socket.

A method of loading a fastening device according to the present invention, the method for loading a fastening member (e.g., the bolt B described later) to a plurality of heads (e.g., the head 20, 20a described later) retained to a magazine (e.g., the magazine 10 described later) includes the step of: retaining one among the plurality of heads with a socket (e.g., the socket 94 described later) that can retain the head, using the socket; retaining the fastening member with the head by causing the socket to move; and moving the socket and retaining the head having retained the fastening member to the magazine again.

In a method of loading a fastening member according to the present invention, the method for loading a fastening member into a plurality of heads retained to a magazine includes the steps of: preparing a socket that can retain the head by selecting one among the plurality of heads and disposing the head thus selected between the socket and the fastening member; retaining the head thus selected with the socket by causing the socket to advance toward the fastening member; detaching the head from the magazine by causing the socket to advance further; retaining the fastening member with the head by causing the fastening member to fit in the head; and retracting the socket and retaining the head having retained the fastening member in the magazine again.

According to the present invention, by providing a plurality of types of heads to the magazine, and fitting the fastening members according to type into these heads, respectively, a plurality of types of fastening members can be loaded to the magazine.

In addition, by repeating the operations to fit the fastening member in each head, the fastening members are loaded into all of the heads retained to the magazine. Therefore, since the phase of one of the heads and the phase of the head of one of the fastening members simply must be matched in a one-time operation compared to a case of simultaneously loading fastening members to all of the heads retained in a magazine, the fastening members can be reliably loaded by the magazine.

In this case, in the step of retaining the fastening member, it is preferable for the socket to be made to rotate while advancing and a relative distance of the head in relation to the fastening member to be monitored, and in a case of the relative distance becoming no more than a predetermined value, to determine that the fastening member is fitted to the head.

According to the present invention, when retaining the fastening member by the head, the socket is made to rotate while advancing, whereby the head is made to rotate while pushing the fastening member and the relative distance of this head to the fastening member is monitored. When the phase of the head matches the phase of the fastening member, the fastening member fits into the head; therefore, the relative distance of the head to the fastening member decreases. Therefore, in a case of the relative distance of the head to the fastening member being no more than a predetermined value, it is determined that the fastening member is fitted in the head. Consequently, since it is possible to easily determine that the head is retaining the fastening member, malfunctions of the device when retaining the fastening members in the heads can be reduced.

In addition, when retaining the fastening member by the head, since the fastening member is made to be retained in the head simply by linear motion and rotational motion of the socket, it is possible to have the fastening member reliably retained in the head due to due to the operation of the head being simplified.

In this case, in the step of retaining the fastening member, in a case of the relative distance not becoming no more than a predetermined value over a predetermined time, it is preferable for it to be determined that the fastening member is not fitted to the head, the head to b separated from the fastening member by causing the socket to retract, and a retry causing the socket to rotate while advancing again to be performed.

Although the head is made to rotate while pushing the fastening member when retaining the fastening member, the head and the fastening member may engage without fitting, and the phase of the head may not match the phase of the fastening member even if configured in this way. Therefore, according to the present invention, when retaining the fastening member, in a case of the relative distance not becoming no more than a predetermined value over a predetermined time period, a retry is performed. The likelihood of the fastening member fitting the head is raised by this retry, whereby it is possible to more reliably retain the fastening members in the heads.

A head according to the present invention is characterized in being retained to the magazine, being able to fit together with a bolt, and being detachable with a socket.

The magazine according to the present invention retains a plurality of heads, in which a plurality of types of fastening members fit to the plurality of heads, respectively.

A device for loading a fastening member (e.g., the bolt loading device 4A, 4B described later) according to the present invention includes: a retaining portion (e.g., the head 20, 20A described later) in which an end side of a fastening member (e.g., the bolt B described later) can fit; a rotational drive portion (e.g., the rotational drive portion 93 described later) that causes the retaining portion to rotate; an advance/retract drive portion (e.g., the advance/retract drive portion 98 described later) that causes the retaining portion to advance and retract along a rotational axis thereof; and a control unit (e.g., the control device 80 described later) that causes the retaining portion to approach the fastening member by making to advance by way of the advance/retract drive portion while causing the retaining member to rotate by way of the rotational drive portion, and determines that the fastening member is fitted to the retaining member in a case of a relative distance (e.g., the relative distance d described later) between the retaining portion and the fastening member being less than a first predetermined value (e.g., the first predetermined value $d_1$ described later).

However, even if the leading end of the fastening member is not completely inserted, but rather only slightly inserted into the retaining portion, the phase of the fastening member and the phase of the retaining portion will match, and thus it is considered that the fastening member is fitted in the retaining portion. Therefore, the value of the relative distance between the retaining portion and fastening member in a state of the leading end of this fastening member being slightly inserted into the retaining portion is defined as the first predetermined value. Then, according to the present invention, in a case of a relative distance between the retaining portion and the fastening member being less than the first predetermined value, it is determined that the fastening member fits in the retaining portion. Therefore, since it can be determined that the fastening member fits in the retaining portion just by being slightly inserted, even if the leading end of the fastening member is not completely inserted in the retaining portion as is conventionally, phasing between the fastening member and the retaining portion ends, and then a subsequent operation such as stopping rotation of the retaining portion can be executed immediately, and thus time loss can be reduced.

In this case, it is preferable for the control unit to determine that the fastening member is fitted to the retaining member in a case of the relative distance between the retaining portion and the fastening member being less than a first predetermined value, and a reaction force (e.g., the torque reaction force F described later) of the retaining member being at least a predetermined value (e.g., the predetermined value $F_1$ described later), and to determine that the fastening member is not fitted to the retaining member in a case of the relative distance between the retaining portion and the fastening member becoming less than a second predetermined value (e.g., the second predetermined value $d_2$ described later) that is smaller than the first predetermined value.

According to the present invention, in a case of the relative distance between the retaining portion and the fastening member being less than the first predetermined value and the reaction force of the retaining portion being at least the predetermined value, it is determined that the fastening member fits in the retaining portion. If the leading end of the fastening member is slightly inserted into the retaining portion, rotation of the retaining portion will be restricted by the fastening member, and a reaction force generates at the retaining portion. Therefore, it can be more reliably determined that the fastening member has been fitted to the retaining portion, whereby malfunctions can be prevented.

When the fastening member is completely inserted inside of the retaining portion, advancement of the retaining portion stops, and the relative distance becomes a predetermined value. Therefore, when a value no more than this predetermined value is defined as the second predetermined value, there is a possibility that the fastening member is not present in a case of the relative distance being less than the second predetermined value. Therefore, according to the present invention, in a case of the relative distance between the retaining portion and the fastening member being less than the second predetermined value, it is determined that the fastening member is not fitted into the retaining portion. Therefore, even in a case of attempting to retain the fastening member, irrespective of the fastening member not being present, it is possible to quickly move to a subsequent operation.

In this case, in a case of determining that the fastening member is fitted in the retaining portion, it is preferable for the control unit to cause the retaining portion to retract by way of the advance/retract drive portion.

According to the present invention, in a case of determining that the fastening member is fitted to the retaining portion, since the retaining portion is made to retract by the advance/retract drive portion, it is possible to quickly move to a subsequent operation after the retaining portion retains the fastening member.

In this case, it is preferable to further include a holding portion (e.g., the holding portion 62 described later) that holds another end of the fastening member, in which the control unit releases holding of the fastening member by way of the holding portion in a case of having determined that the fastening member is fitted to the retaining portion.

According to the present invention, in a case of determining that the fastening member is fitted in the retaining portion, holding of the fastening member by the holding portion is released. Therefore, the fastening member can be prevented from falling in the period until fitting into the retaining portion of the device for loading a fastening member by the holding portion, and the fastening member can be reliably loaded to the device for loading a fastening member.

In addition, provided that it is not determined that the fastening member is fitted in the retaining portion, the holding of the fastening member by the holding portion is not released; therefore, the fastening member can be prevented from being retained in the retaining portion at an unstable attitude. Therefore, irrespective of the phase of the fastening member and the phase of the retaining portion not matching, for example, when the fastening member is attracted by the magnet of the retaining portion, although this fastening member may be at a sloped attitude relative to the retaining portion, such a situation can be avoided. In addition, even in a case of fitment between the fastening member and the retaining portion having failed, a retry trying to retain the fastening portion again is possible by temporarily separating the retaining portion from the fastening member, and then making the retaining portion advance toward the fastening member again.

Effects of the Invention

According to the present invention, the head can be retained by the socket by simply causing the socket to advance by way of the advance/retract drive portion, after which the head can be made to detach from the magazine. Therefore, since it is no longer necessary to change the movement direction of the head as is conventionally, the time required in fastening of a bolt can be shortened. In addition, it is configured such that a plurality of heads is retained in the magazine, and one among the plurality of heads is selectively positioned ahead and on the rotational axis of the socket by moving this magazine. Therefore, by having a different type of fastening member retained in the respective heads, and appropriately selecting one among these heads by driving the switching portion, a desired bolt from among the plurality of types of fastening members can be fastened.

BRIEF DESCRIPTION OF THE DRAWINGS

FIG. 45 is a view (4) illustrating operation of the bolt loading system according to this embodiment.

Figure 1:
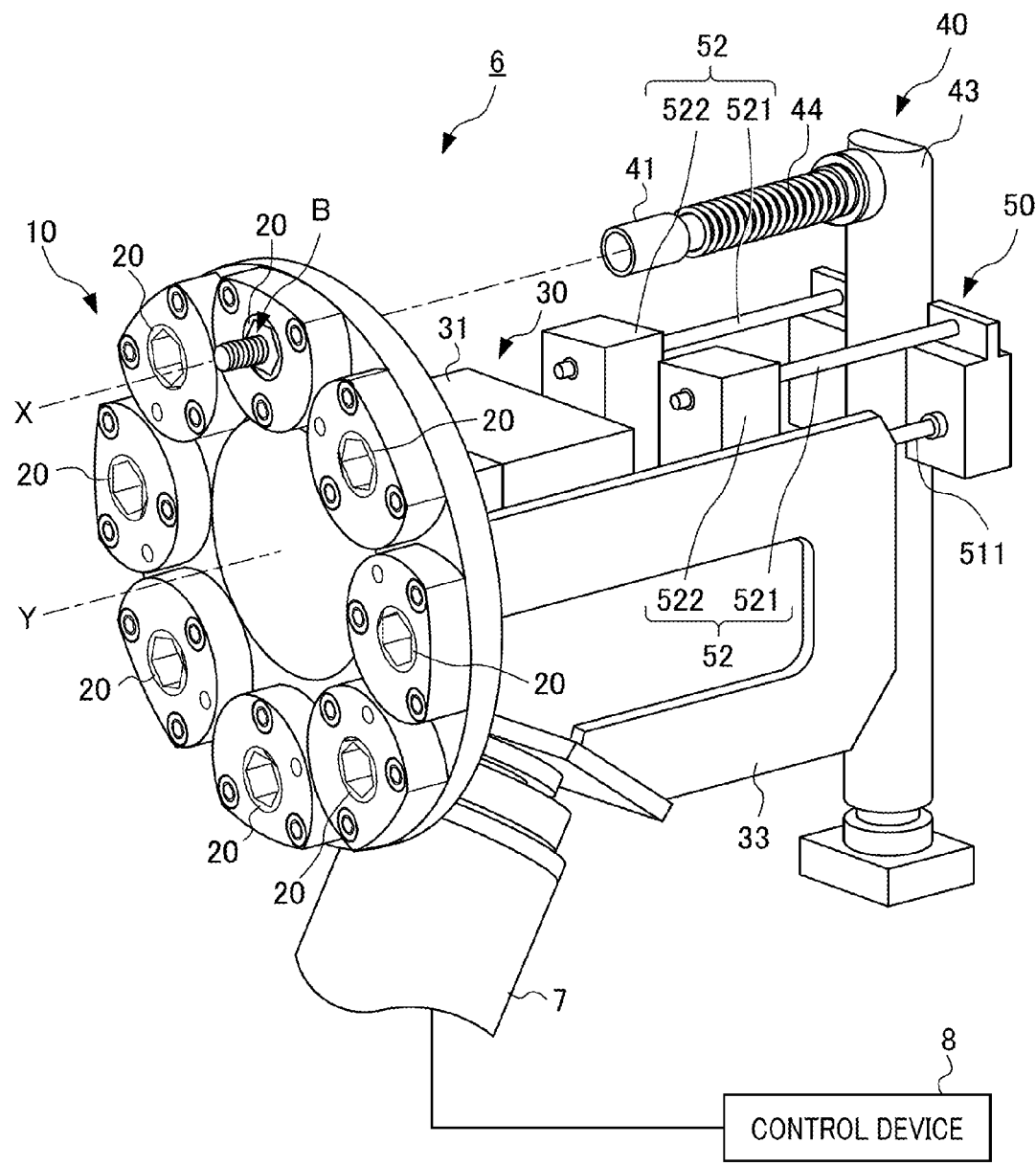
FIG. 1 is a perspective view showing a fastening device according to a first embodiment according to the present invention.

EXPLANATION OF REFERENCE NUMERALS 4A, 4B Bolt loading device (device for loading fastening member)
6 Fastening device
10 Magazine
20, 20A Head (retaining portion)
30 Switching portion
40 Rotational drive portion
41 Socket
50 Advance/retract drive portion
62 Holding portion
80 Control device (control unit)
93 Rotational drive portion
97 Advance/retract drive portion
111 Head recess portion (through-hole)
112 Plunger
114 Pin
211 Plunger
221 Concaved portion
222 Vertical surface (wall surface)
223 Tapered surface (wall surface)
412 Concaved portion
413 Tapered surface (wall surface)
414 Vertical surface (wall surface)
415 Step
421 One-way clutch
B Bolt (fastening member)
d Relative distance
$d_1$ First predetermined value
$d_2$ Second predetermined value
F Torque reaction force

PREFERRED MODE FOR CARRYING OUT THE INVENTION

Hereinafter, each embodiment according to the present invention will be explained based on the drawings.

First Embodiment

Figure 2:
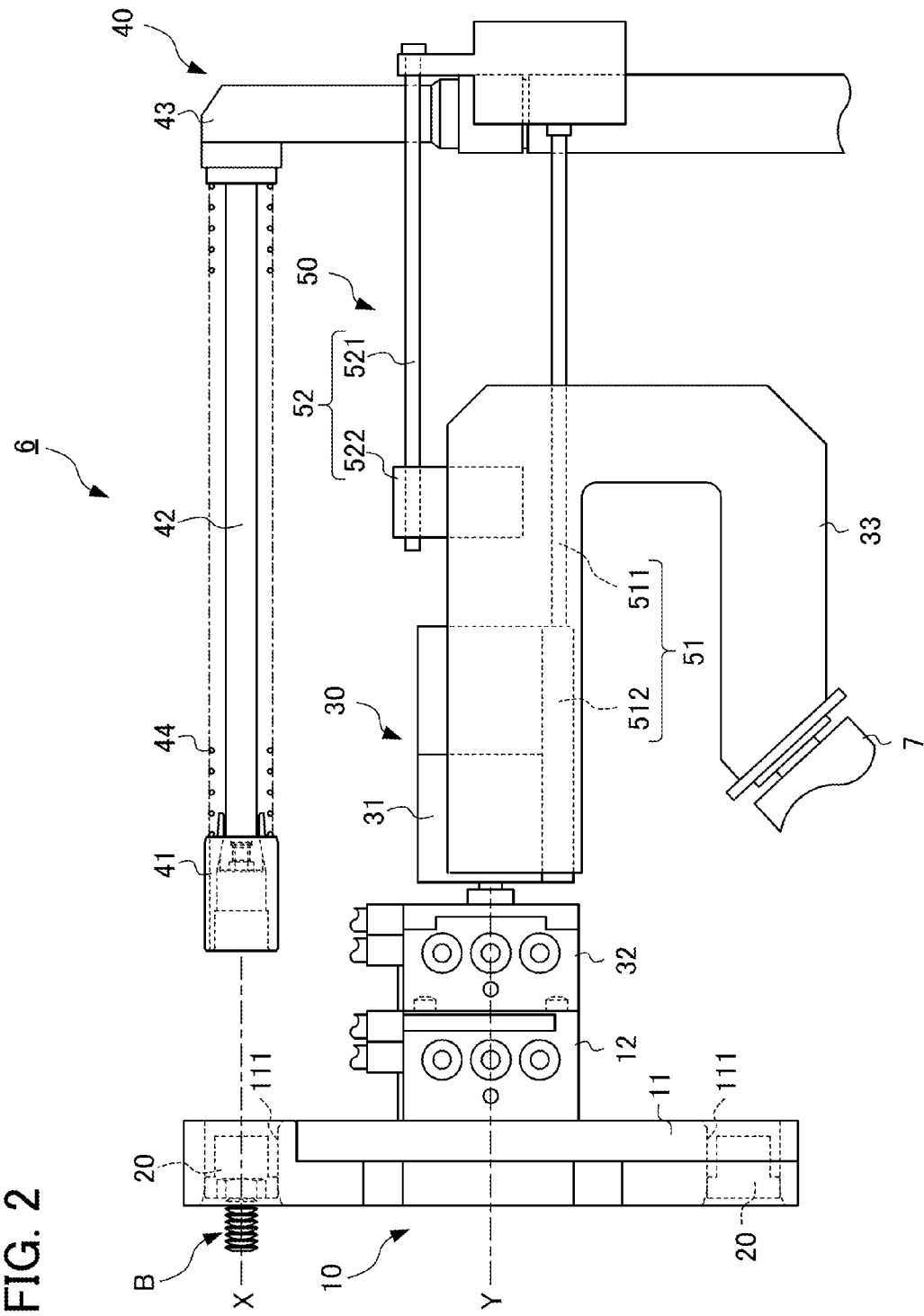
FIG. 2 is a cross-sectional view of the fastening device according to the embodiment.

FIG. 1 is a perspective view showing a simple overview of a fastening device 6 according to a first embodiment according to the present invention. FIG. 2 is a cross-sectional view of the fastening device 6. The fastening device 6 is a device that fastens a bolt B as a fastening member, and is provided to a leading end of a robot arm 7. This fastening device 6 includes a rotational drive portion 40 that rotationally drives a socket 41, an advance/retract drive portion 50 that causes the socket 41 of the rotational drive portion 40 to advance or retract along a rotational axis thereof, a magazine 10 that retains eight heads 20, and a switching portion 30 that causes this magazine 10 to rotate to selectively position one among the heads 20 ahead of the socket 41 on the rotational axis thereof.

The robot arm 7 is controlled by a control device 8, and changes the position and attitude of the fastening device 6 in three-dimensional space.

Figure 3:
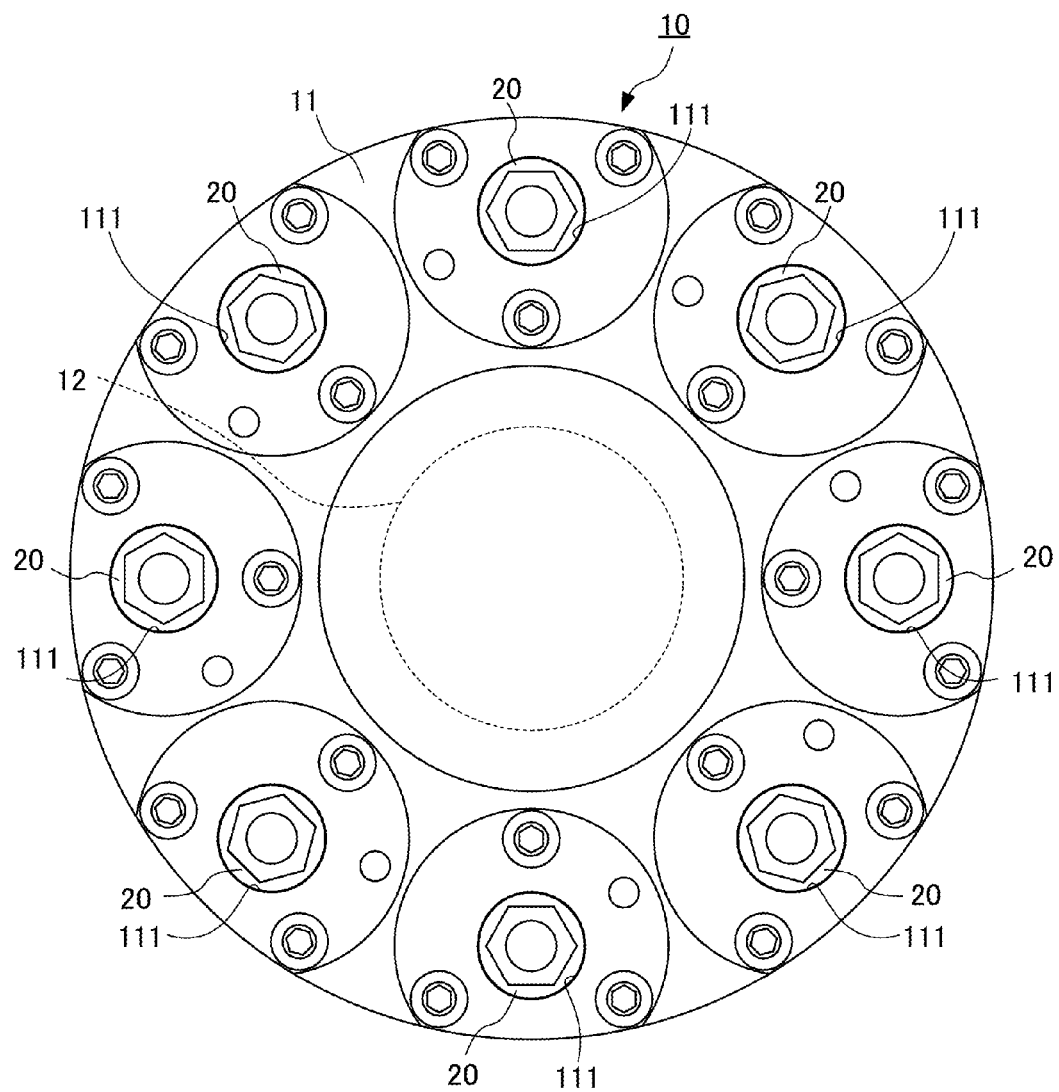
FIG. 3 is a front view of a magazine of the fastening device according to the embodiment.

FIG. 3 is a front view of the magazine 10. The magazine 10 includes a base portion 11 of disk shape, an attachment/detachment portion 12 provided at the center of this base portion 11 on a back side thereof, and the aforementioned eight heads 20 disposed along the outer circumferential surface of the base portion 11, as shown in FIG. 3. The base portion 11 has eight through-holes formed at predetermined intervals along the outer circumference thereof, and these through-holes serve as head recess portions 111, respectively.

Each head 20 is housed and retained in the head recess portions 111 so as to detach from the magazine 10 when moved in the advancing direction of the socket 41. Bolts B are retained in these heads 20 (refer to FIG. 4). The attachment/detachment portion 12 is a so-called auto tool changer.

The switching portion 30 includes a magazine drive portion 31 that drives rotationally, an attachment/detachment portion 32 provided to a leading end of a rotational shaft of this magazine drive portion 31, and a mounting bracket 33 that is installed at a leading end flange surface of the robot arm 7 and supports the magazine drive portion 31.

The attachment/detachment portion 32 is a so-called auto tool changer, and the attachment/detachment portion 12 of the magazine 10 is detachable thereto. The magazine drive portion 31 is driven by the control device 8. By fixing the attachment/detachment portion 12 of the magazine 10 to the attachment/detachment portion 32 of the switching portion 30 and driving the magazine drive portion 31, the magazine 10 rotates about the rotational axis Y, causing the heads 20 to move.

The rotational drive portion 40 includes a socket 41, a rod-like shaft 42 connected to the central axis of the socket 41, and a drive portion 43 that causes the shaft 42 to rotate. A spring 44 for causing the socket 41 to float is interposed between the drive portion 43 and the socket 41. The rotational axis X of this rotational drive portion 40 is substantially parallel to the rotational axis Y of the magazine 10.

An advance/retract drive portion 50 is provided to the mounting bracket 33 of the switching portion 30, and is controlled by the control device 8 to cause the rotational drive portion 40 to advance or retract along the rotational axis X. This advance/retract drive portion 50 includes a cylinder mechanism 51 and a pair of slide guides 52.

The pair of slide guides 52 includes a slide beam 521 installed to the rotational drive portion 40, and a slide guide 522 provided to the mounting bracket 33 and through which the slide beam 521 is inserted. This pair of slide guides 52 guides the rotational drive portion 40 by the slide beams 521 sliding in the slide guides 522.

The cylinder mechanism 51 includes a piston rod 511 installed to the rotational drive portion 40, and a cylinder 512 that causes this piston rod 511 to advance or retract. The rotational drive portion 40 advances and retracts by means of driving the cylinder mechanism 51.

Figure 4:
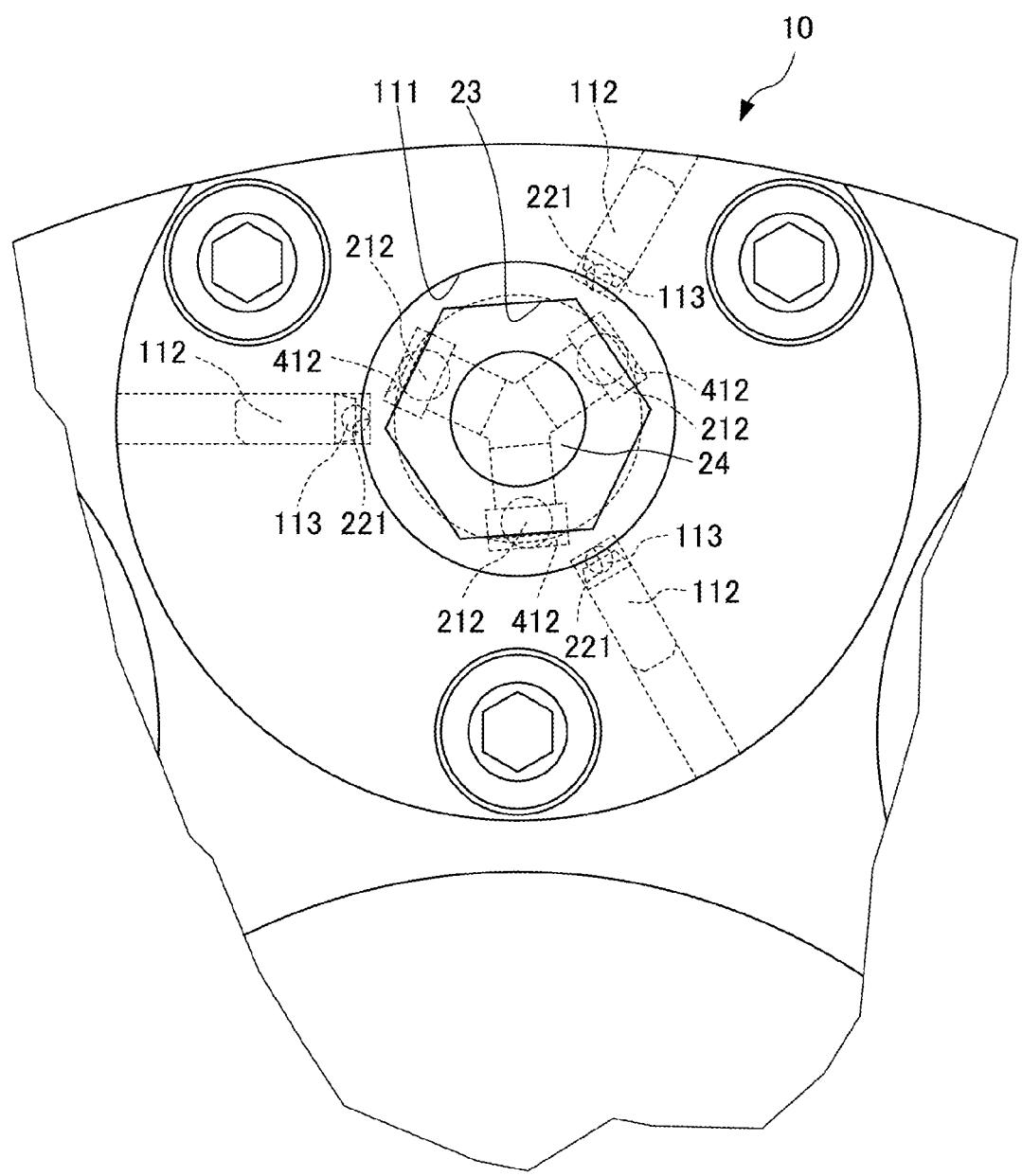
FIG. 4 is an enlarged plan view of a portion in which a head of the magazine is housed according to the embodiment.
Figure 5:
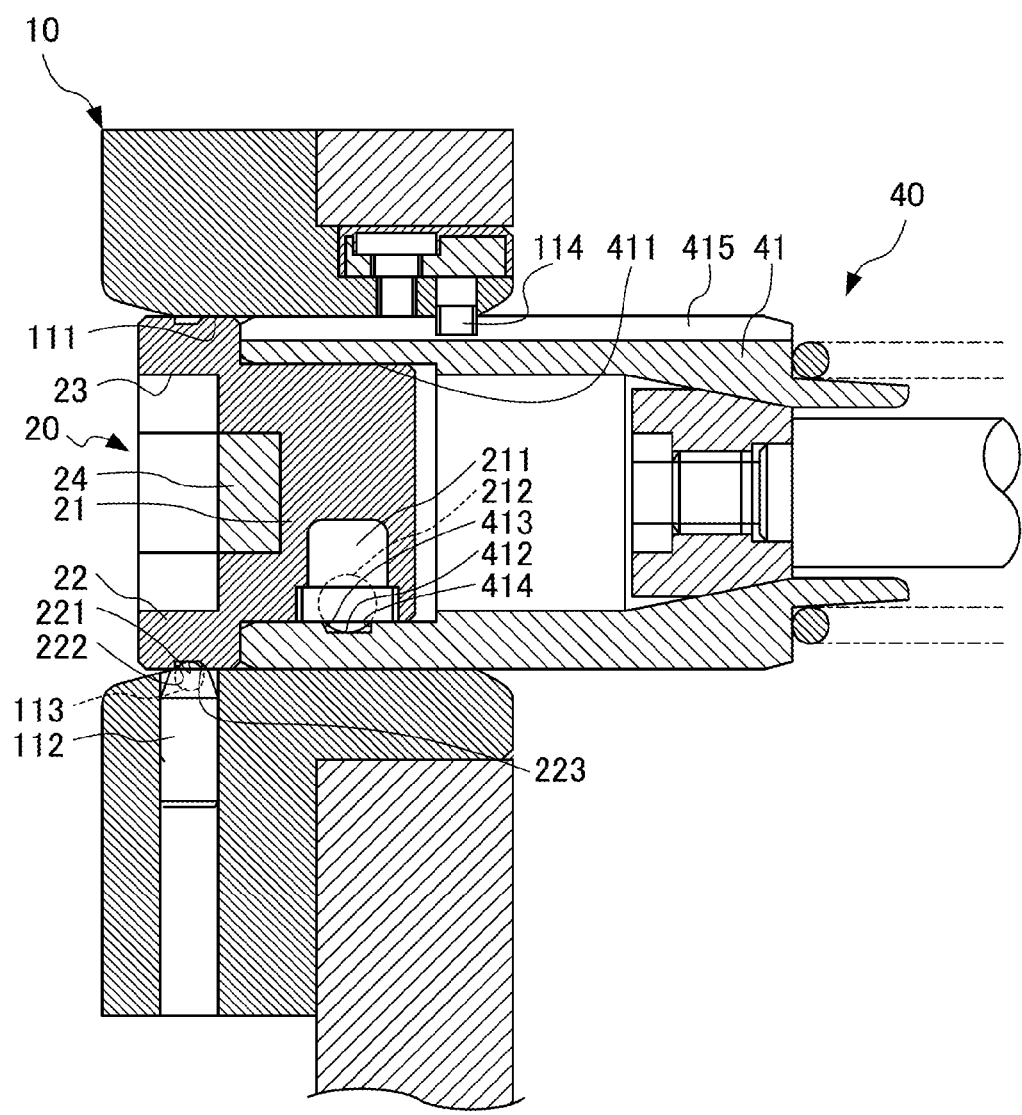
FIG. 5 is an enlarged cross-sectional view of a portion in which a head of the magazine is housed according to the embodiment.

FIG. 4 is an enlarged plan view of a portion at which a head 20 of the magazine 10 is housed, and FIG. 5 is an enlarged cross-sectional view of the portion at which the head 20 of the magazine 10 is housed. FIG. 5 shows a state in which the socket 41 is inserted into the head recess portion 111 of the magazine 10. A plunger 112 having a protractable/retractable ball 113 is provided at three locations in the inner circumferential surface of the head recess portion 111 of the magazine 10 on a front side thereof.

The ball 113 is biased in a direction projecting from the inner circumferential surface of the head recess portion 111 by a spring that is not illustrated. A pin 114 projects at a position in the inner circumferential surface of the head recess portion 111 on a rear side of the magazine 10.

The head 20 includes a column-shaped head main body 21, and a disk-shaped flange portion 22 formed at a leading end side of this head main body 21 and having an outside diameter larger than the head main body 21. A hexagonal concaved portion is formed in the leading end surface of the head 20, and this concaved portion serves as a bolt retaining portion 23 in which the head of the bolt B fits. A magnet 24 is installed at the bottom surface of this bolt retaining portion 23, and retains the bolt B by way of the magnetic force of the magnet 24.

A concaved portion 221 in which the ball 113 of the aforementioned plunger 112 engages is formed at three locations on the outer circumferential surface of the flange portion 22. A wall surface of this concaved portion 221 on a leading end side of the head 20 is a vertical surface 222 that is substantially perpendicular to the axial direction of the head 20, and the wall surface of the concaved portion 221 on a base end side of the head 20 is a tapered surface 223 sloped relative to the axial direction of the head 20.

A plunger 211 having a protractable/retractable ball 212 is provided at three locations on the outer circumferential surface of the head main body 21. The ball 212 is biased to a direction projecting from the outer circumferential surface of the head main body 21 by a spring that is not illustrated.

A concaved portion is formed in the leading end surface of the socket 41 of the rotational drive portion 40, and this concaved portion is a head retaining portion 411 in which the head main body 21 of the head 20 fits and is retained. A concaved portion 412 at which the ball 212 of the aforementioned plunger 211 engages is formed in the inner circumferential surface of this head retaining portion 411. The wall surface of this concaved portion 412 on the leading end side of the socket 41 is a tapered surface 413 sloped relative to the axial direction of the socket 41, and the wall surface of the concaved portion 412 on a base end side of the socket 41 is a vertical surface 414 that is substantially perpendicular to the axial direction of the socket 41. In addition, a key groove 415 in which the pin 114 of the magazine 10 fits is formed in the outer circumferential surface of the socket 41 along the rotational axis of the socket 41.

Next, operations of the aforementioned fastening device 6 will be explained. A state in which the bolts B are installed in all of the heads 20 of the magazine 10 is assumed as an initial setting. First, the robot arm 7 is controlled by the control device to avoid obstacles and move so that a first mounting position is positioned on the rotational axis X of the fastening device 6. In addition, the magazine 10 is made to rotate by driving the switching portion 30, whereby one among the plurality of heads 20 is selectively positioned on the rotational axis of the socket 41.

Figure 6:
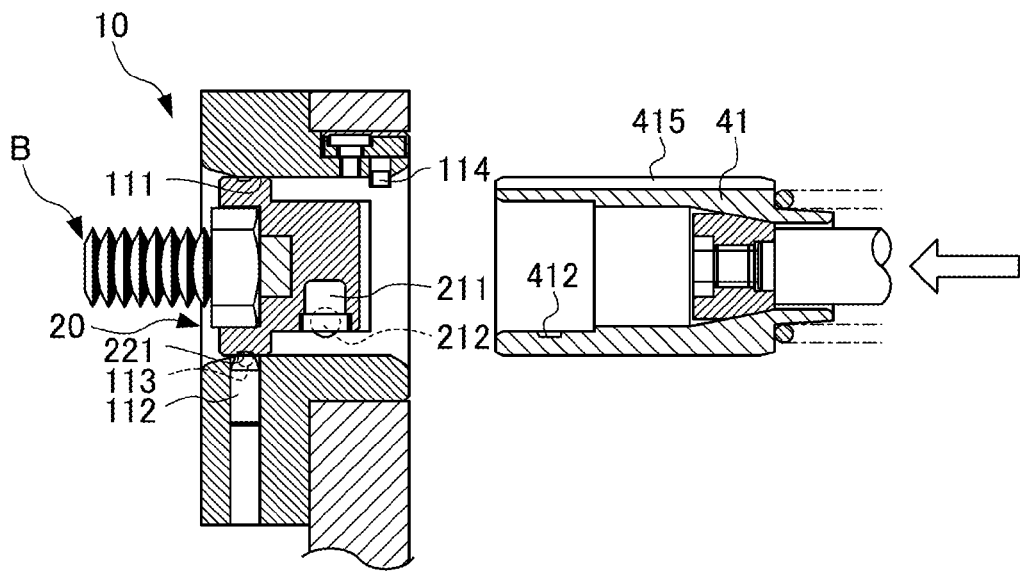
FIG. 6 is a view (1 of 5) illustrating operation of the fastening device according to the embodiment.
Figure 7:
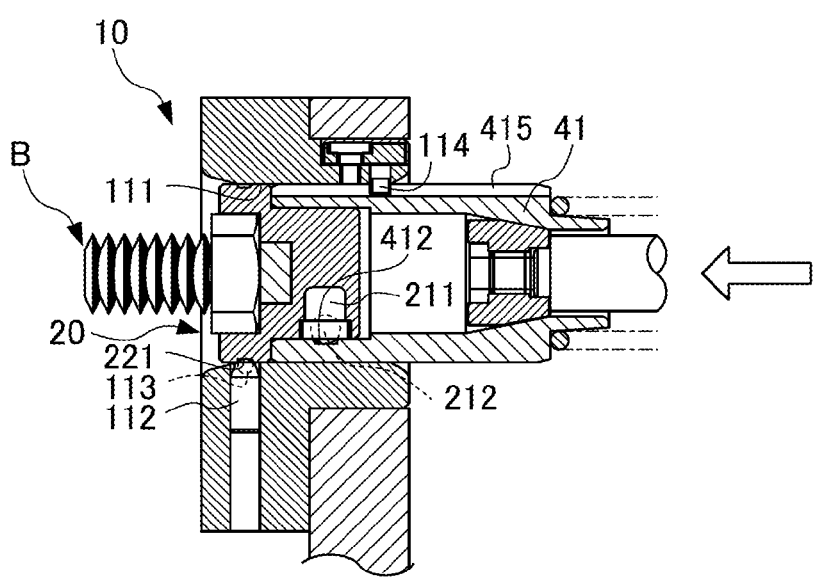
FIG. 7 is a view (2 of 5) illustrating operation of the fastening device according to the embodiment.

Next, the socket 41 is made to approach the head recess portion 111 of the magazine 10 by driving the advance/retract drive portion 50, as shown in FIG. 6. Then, the socket 41 inserts into the head recess portion 111 while causing the key groove 415 of the socket 41 to fit together with the pin 114 of the head recess portion 111 of the magazine 10, as shown in FIG. 7. When this is done, the plunger 211 of the head 20 engages the concaved portion 412 of the socket 41, and the socket 41 retains the head 20.

Figure 8:
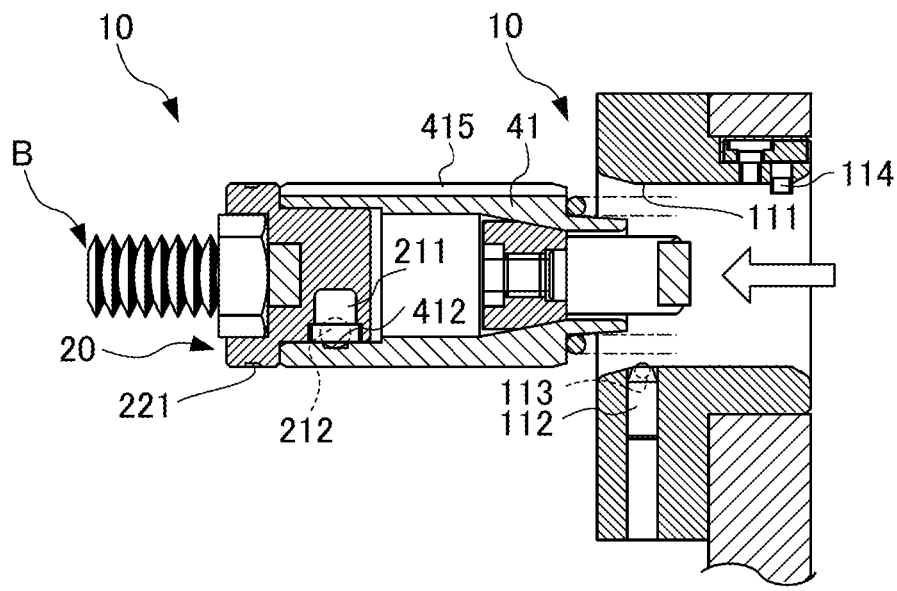
FIG. 8 is a view (3 of 5) illustrating operation of the fastening device according to the embodiment.

Furthermore, the socket 41 is made to advance by driving the advance/retract drive portion 50, whereby this socket 41 is made to penetrate the head recess portion 111, as shown in FIG. 8.

At this time, the plunger 211 of the head 20 engages the vertical surface 414 of the concaved portion 412 of the socket 41, and the plunger 112 of the magazine 10 engages the tapered surface 223 of the concaved portion 221 of the head 20. Therefore, the force from the socket 41 pressing the head 20 and causing it to move is greater than the force from the magazine 10 suppressing movement of the head 20. Consequently, the retaining of the head 20 by the magazine 10 is released, and the head 20 moves with the socket 41.

Therefore, the engaging between the concaved portion 221 of the head 20 and the plunger 112 of the magazine 10 is released, the head 20 detaches from the magazine 10, and moves to the front side of the magazine 10 along with the socket 41.

Subsequently, the head 20 is made to rotate by driving the drive portion 43 of the rotational drive portion 40, whereby the bolt B fastens to the first mounting position.

Figure 9:
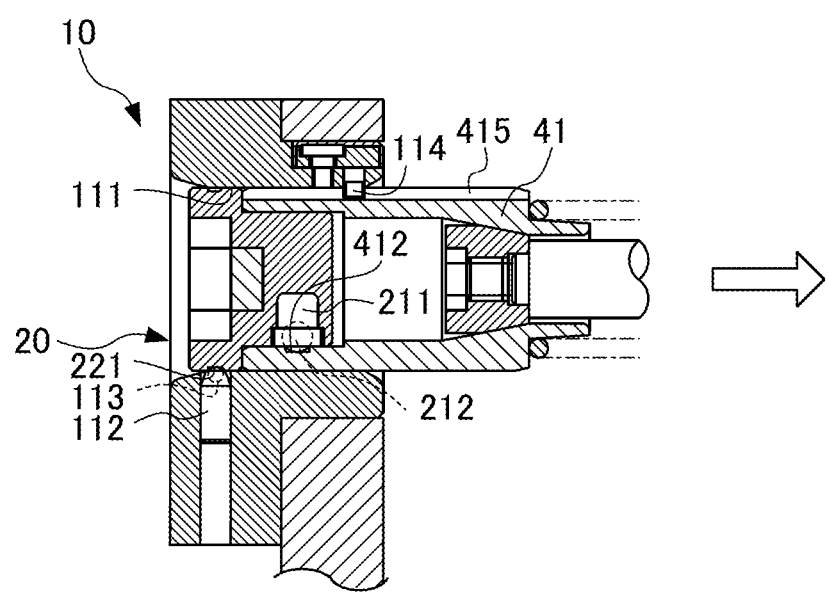
FIG. 9 is a view (4 of 5) illustrating operation of the fastening device according to the embodiment.

After completion of fastening the bolt B, the driving of the drive portion 43 of the rotational drive portion 40 is stopped, whereupon the socket 41 is made to retract by driving the advance/retract drive portion 50. When this is done, the head 20 retracts along with the socket 41, and the concaved portion 221 of the head 20 and the plunger 112 of the magazine 10 engage, whereby the head 20 is retained to the magazine 10 again, as shown in FIG. 9.

Figure 10:
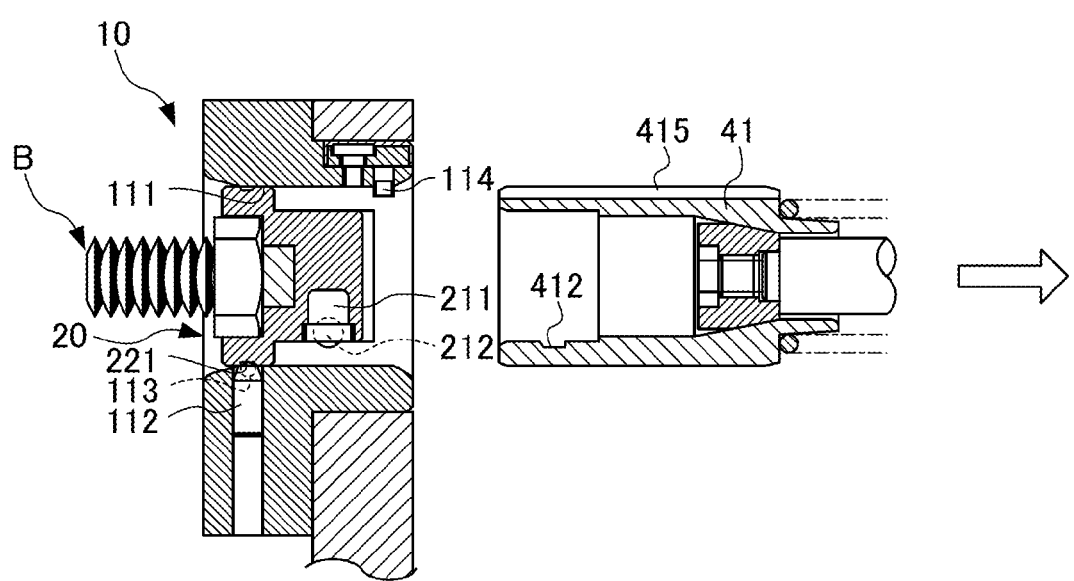
FIG. 10 is a view (5 of 5) illustrating operation of the fastening device according to the embodiment.

Furthermore, the socket 41 is made to retract by driving the advance/retract drive portion 50, and this socket 41 pulls out from the head recess portion 111, as shown in FIG. 10.

At this time, the plunger 211 of the head 20 engages the vertical surface 414 of the concaved portion 412 of the socket 41, and the plunger 112 of the magazine 10 engages the vertical surface 222 of the concaved portion 221 of the head 20. Therefore, the force at which the magazine 10 retains the head 20 is greater than the force at which the socket 41 retains the head 20. Consequently, the head 20 is retained by the magazine 10, and the head 20 detaches from the socket 41.

Therefore, the engaging between the plunger 211 of the head 20 and the concaved portion 412 of the socket 41 is released, the head 20 detaches from the socket 41, and the socket 41 retracts alone.

Subsequently, the robot arm 7 is controlled by the control device 8 to move the fastening device 6 near a second mounting position of the bolt B, and the same operations as the aforementioned operations are repeated.

There are the following effects according to the present embodiment.

(1) The head 20 is retained by the socket 41 simply by the advance/retract drive portion 50 causing the socket 41 to advance, after which the head 20 can be made to detach from the magazine 10. Consequently, since it is no longer necessary to change the movement direction of the head as is conventionally, the time required to fasten the bolt B can be shortened. In addition, a plurality of the heads 20 are retained in the magazine 10, and it is configured such that one among the plurality of heads 20 is selectively positioned ahead of the socket 41 on the rotational axis thereof by the switching portion 30 causing this magazine 10 to rotate. Therefore, by having a different type of bolt B retained in the respective heads 20, and appropriately selecting one among these heads 20 by driving the switching portion 30, a desired bolt B from among the plurality of types of bolts B can be fastened.

(2) Since the force at which the magazine 10 retains the head 20 is set to be greater than the force at which the socket 41 retains the head 20, it is possible to retain the head 20 in the magazine 10 while allowing to detach from the socket 41 easily, when causing the socket to retract to pull out from the head recess portion 111.

(3) The mechanism by which the magazine 10 retains the head 20 and the mechanism by which the socket 41 retains the head 20 are configured by plungers 112, 211, and concaved portions 221, 412 in which these plungers 112, 211 engage, respectively. Therefore, the mechanism by which the magazine 10 retains the head 20 and the mechanism by which the socket 41 retains the head 20 can be realized with a simple configuration.

Second Embodiment

Figure 11:
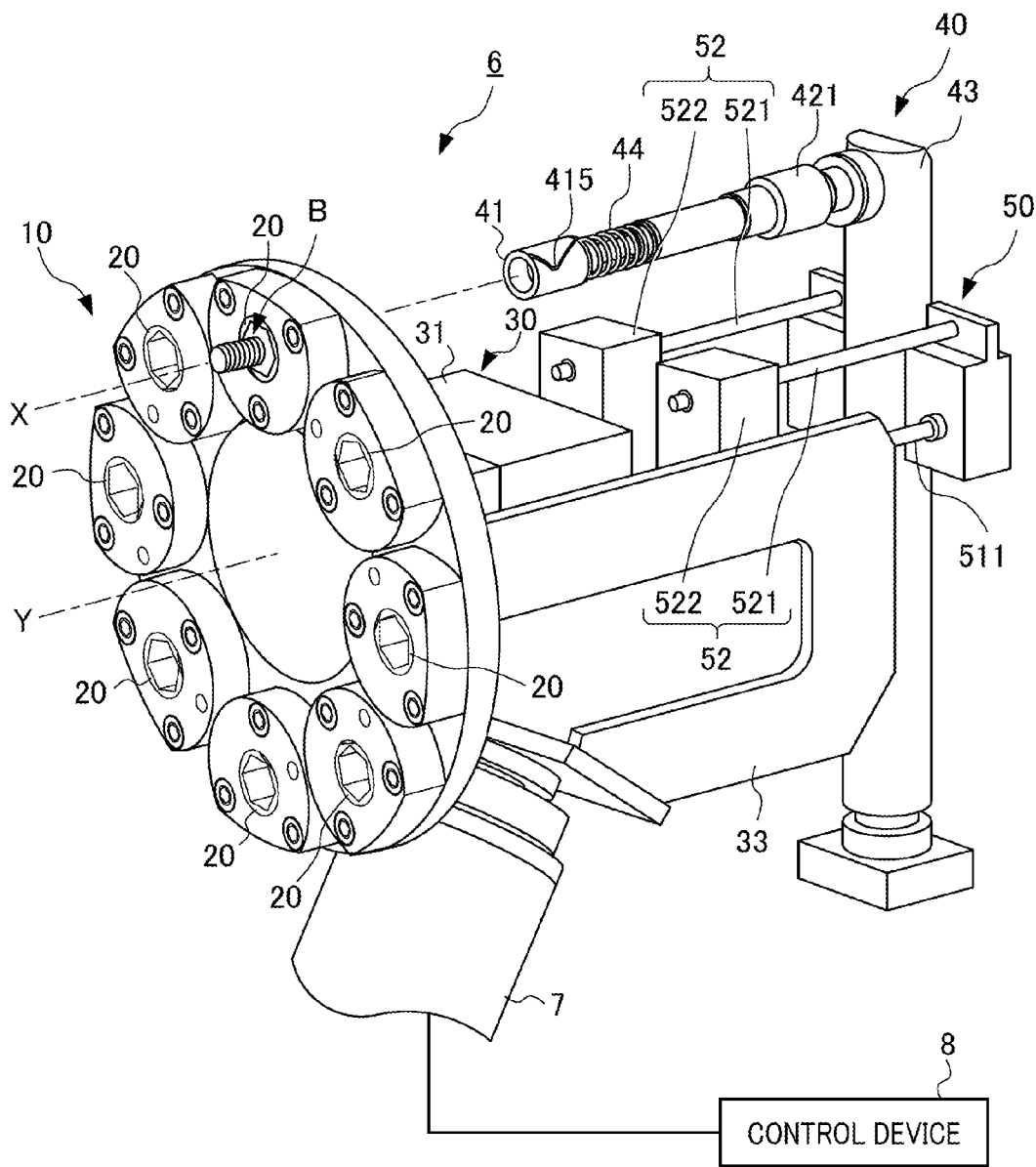
FIG. 11 is a perspective view showing a fastening device according to a second embodiment according to the present invention.
Figure 12:
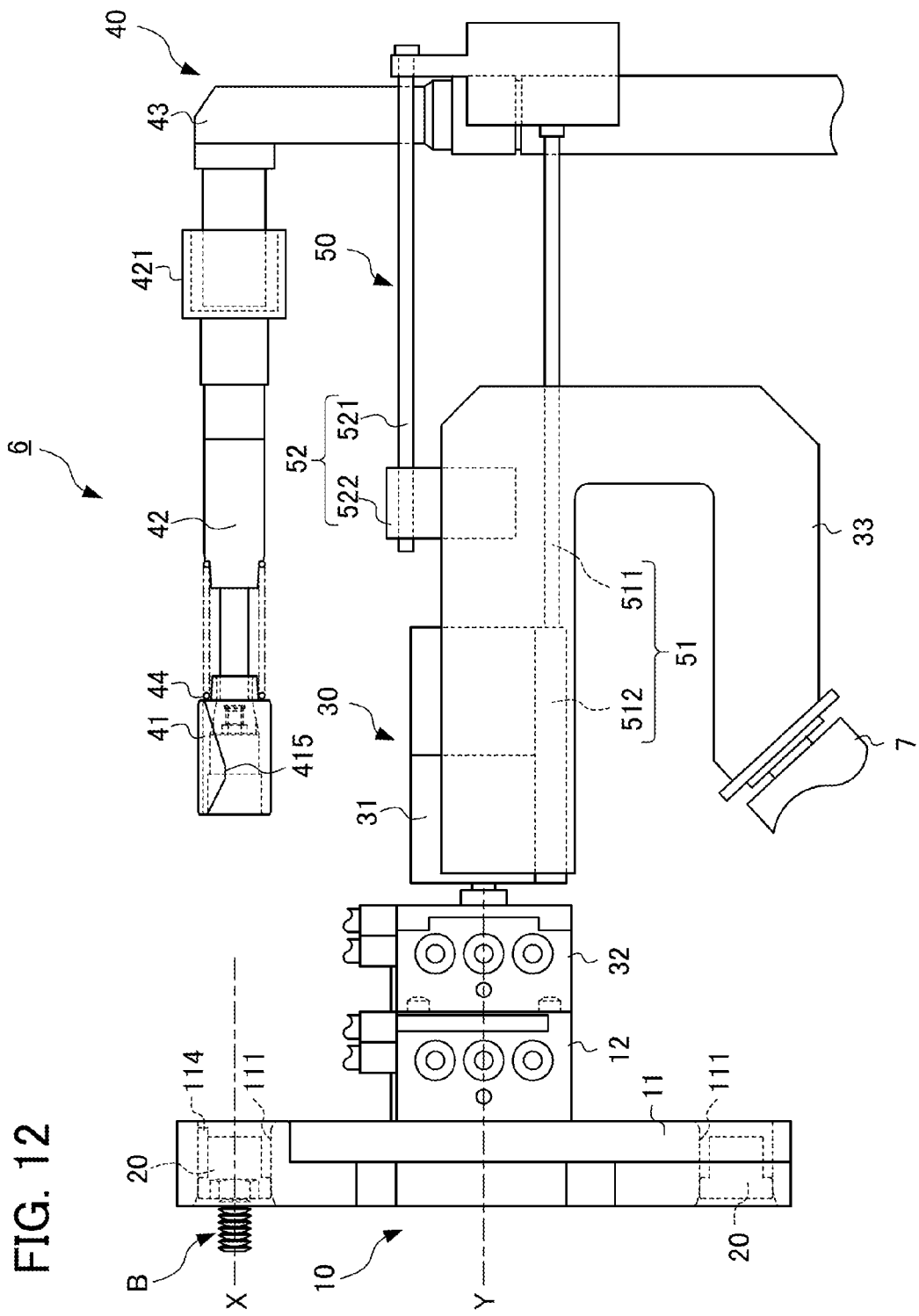
FIG. 12 is a cross-sectional view of the fastening device according to this embodiment.

FIG. 11 is a perspective view showing a simple overview of the fastening device 6 according to a second embodiment according to the present invention. FIG. 12 is a cross-sectional view of the fastening device 6. The fastening device 6 is a device that fastens a bolt B as a fastening member, and is provided to a leading end of a robot arm 7. This fastening device 6 includes a rotational drive portion 40 that rotationally drives a socket 41, an advance/retract drive portion 50 that causes the socket 41 of the rotational drive portion 40 to advance or retract along a rotational axis thereof, a magazine 10 that retains eight heads 20, and a switching portion 30 that causes this magazine 10 to rotate to selectively position one among the heads 20 ahead of the socket 41 on the rotational axis thereof.

The robot arm 7 is controlled by a control device 8, and changes the position and attitude of the fastening device 6 in three-dimensional space.

Figure 13:
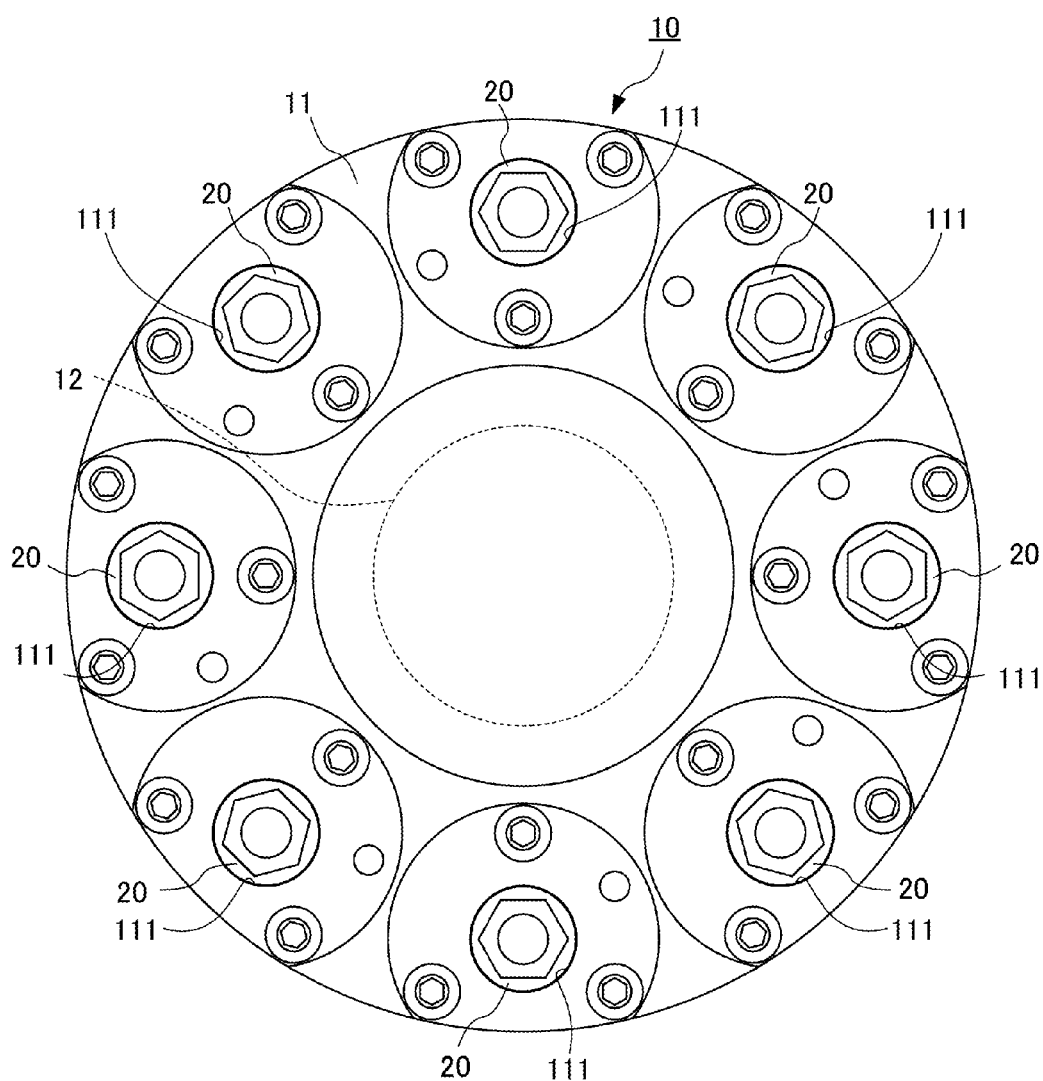
FIG. 13 is a front view of a magazine of the fastening device according to this embodiment.

FIG. 13 is a front view of the magazine 10. The magazine 10 includes a base portion 11 of disk shape, an attachment/detachment portion 12 provided at the center of this base portion 11 on a back side thereof, and the aforementioned eight heads 20 disposed along the outer circumferential surface of the base 11, as shown in FIG. 13. The base portion 11 has eight through-holes formed at predetermined intervals along the outer circumference thereof, and these through-holes serve as head recess portions 111, respectively.

Each head 20 is housed and retained in the head recess portions 111 so as to detach from the magazine 10 when moved in the advancing direction of the socket 41. Bolts B are retained in these heads 20 (refer to FIG. 14). The attachment/detachment portion 12 is a so-called auto tool changer.

The switching portion 30 includes a magazine drive portion 31 that drives rotationally, an attachment/detachment portion 32 provided to a leading end of a rotational shaft of this magazine drive portion 31, and a mounting bracket 33 that is installed at a leading end flange surface of the robot arm 7 and supports the magazine drive portion 31.

The attachment/detachment portion 32 is a so-called auto tool changer, and the attachment/detachment portion 12 of the magazine 10 is detachable thereto. The magazine drive portion 31 is driven by the control device 8. By fixing the attachment/detachment portion 12 of the magazine 10 to the attachment/detachment portion 32 of the switching portion 30 and driving the magazine drive portion 31, the center of the magazine 10 rotates about the rotational axis Y, causing the heads 20 to move.

The rotational drive portion 40 includes the aforementioned socket 41 of cylindrical shape, a rod-like shaft 42 connected to the socket 41, and the drive portion 43 that cases the shaft 42 to rotate. A one-way clutch is provided to the shaft 42. This one-way clutch 421 free-wheels when rotating clock-wise when viewed from the base end side of the shaft 42, and engages when rotating counter clock-wise. The drive portion 43 causes the shaft 42 to rotate with the central axis of the socket 41 as the rotational axis X. This rotational axis X is substantially parallel to the rotational axis Y of the magazine 10. In addition, a spring 44 for causing the socket 41 to float is interposed between the drive portion 43 and the socket 41.

An advance/retract drive portion 50 is provided to the mounting bracket 33 of the switching portion 30, and is controlled by the control device 8 to cause the rotational drive portion 40 to advance or retract along the rotational axis X. This advance/retract drive portion 50 includes a cylinder mechanism 51 and a pair of slide guides 52.

The pair of slide guides 52 includes a slide beam 521 installed to the rotational drive portion 40, and a slide guide 522 provided to the mounting bracket 33 and through which the slide beam 521 is inserted. This pair of slide guides 52 guides the rotational drive portion 40 by the slide beams 521 sliding in the slide guides 522.

The cylinder mechanism 51 includes a piston rod 511 installed to the rotational drive portion 40, and a cylinder 512 that causes this piston rod 511 to advance or retract. The rotational drive portion 40 advances and retracts by means of driving the cylinder mechanism 51.

Figure 14:
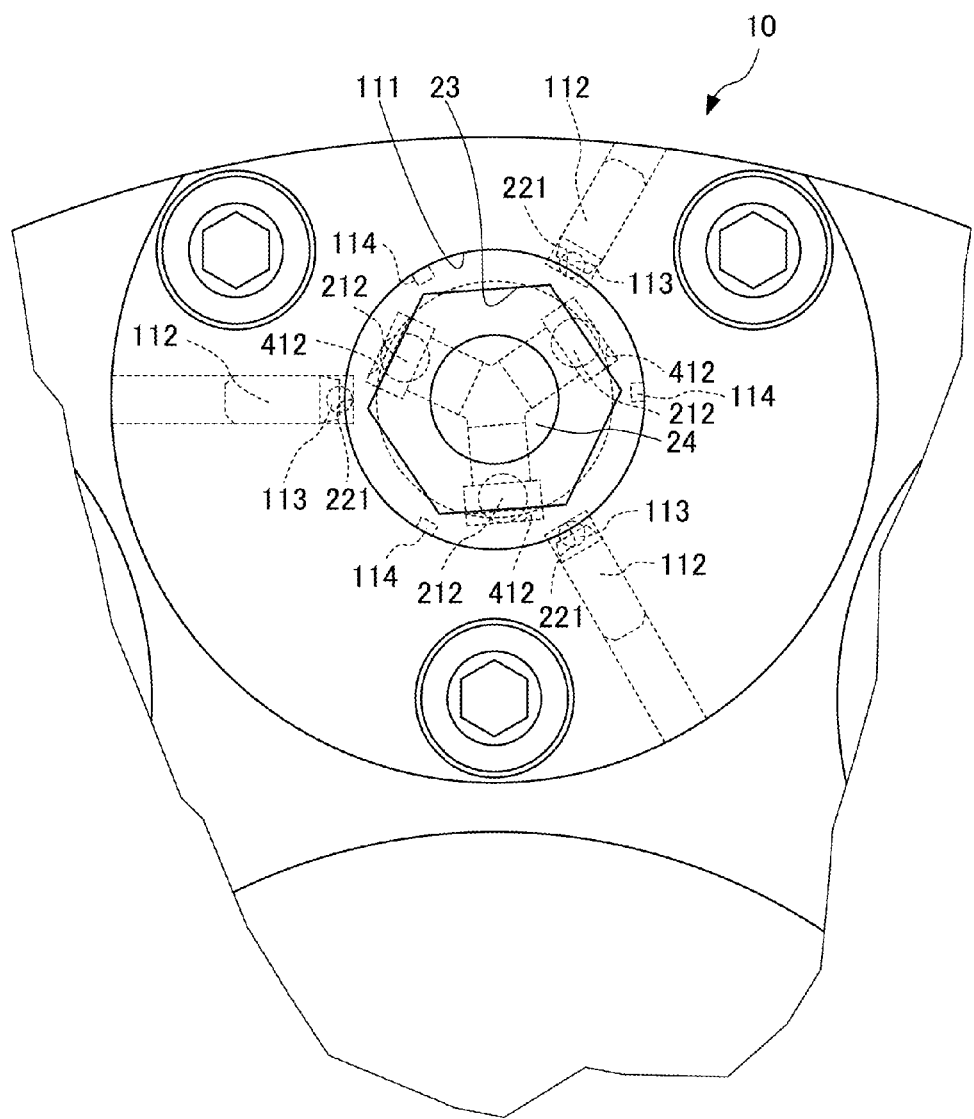
FIG. 14 is an enlarged plan view of a portion in which a head of the magazine is housed according to this embodiment.
Figure 15:
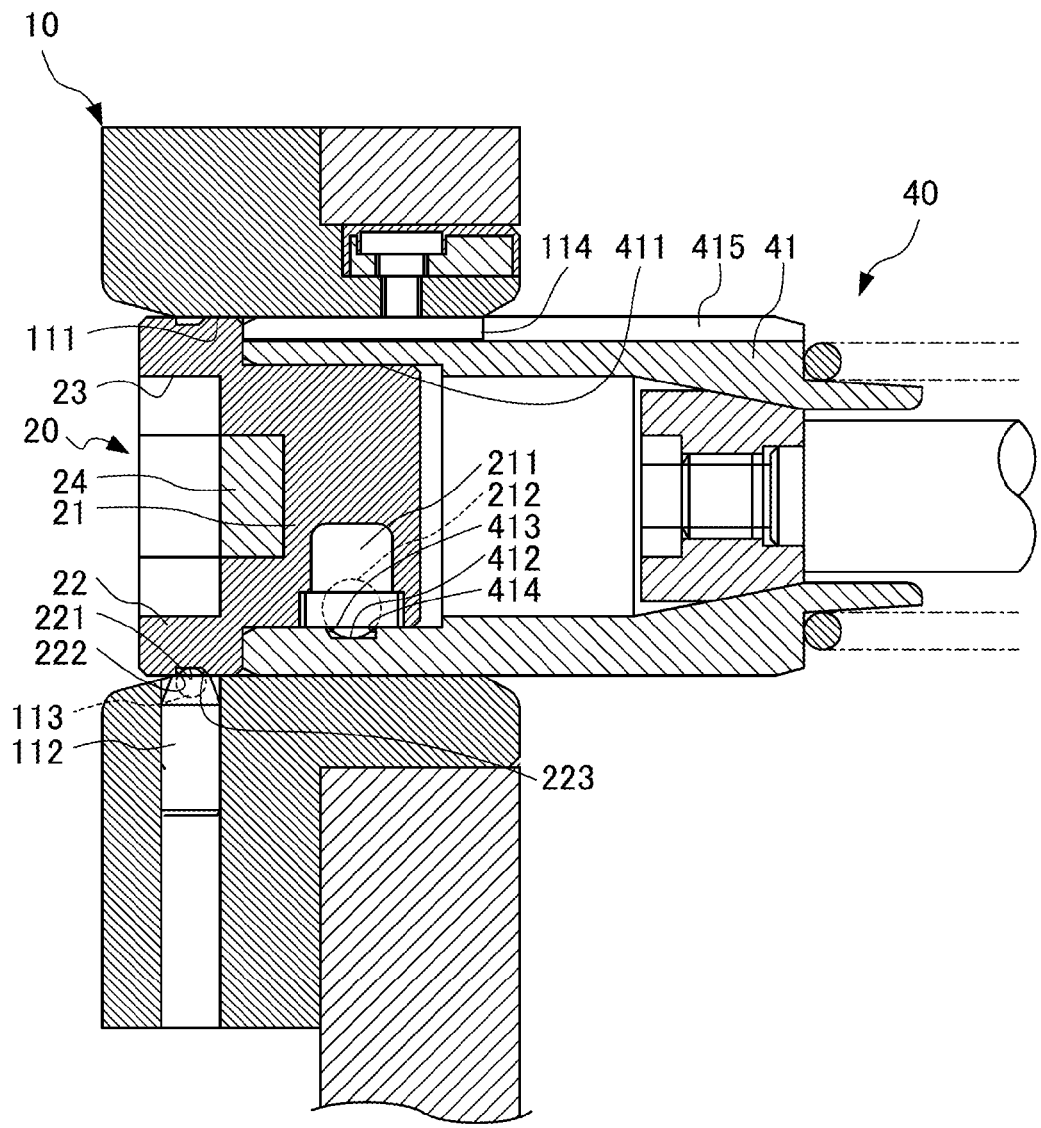
FIG. 15 is an enlarged cross-sectional view of a portion in which the head of the magazine is housed according to the embodiment.

FIG. 14 is an enlarged plan view of a portion at which a head 20 of the magazine 10 is housed, and FIG. 15 is an enlarged cross-sectional view of the portion at which the head 20 of the magazine 10 is housed. FIG. 15 shows a state in which the socket 41 is inserted into the head recess portion 111 of the magazine 10. A plunger 112 having a protractable/ retractable ball 113 is provided at three locations in the inner circumferential surface of the head recess portion 111 of the magazine 10 on a front side thereof. The ball 113 is biased in a direction projecting from the inner circumferential surface of the head recess portion 111 by a spring that is not illustrated. In addition, opposing the plungers 112, three pins 114 are provided in the inner circumferential surface of the head recess portion 111 on a rear side of the magazine 10 to project.

The head 20 includes a column-shaped head main body 21, and a disk-shaped flange portion 22 formed at a leading end side of this head main body 21 and having an outside diameter larger than the head main body 21. A hexagonal concaved portion is formed in the leading end surface of the head 20, and this concaved portion serves as a bolt retaining portion 23 in which the head of the bolt B fits. A magnet 24 is installed at the bottom surface of this bolt retaining portion 23, and retains the bolt B by way of the magnetic force of the magnet 24.

A concaved portion 221 in which the ball 113 of the aforementioned plunger 112 engages is formed at three locations on the outer circumferential surface of the flange portion 22. A wall surface of this concaved portion 221 on a leading end side of the head 20 is a vertical surface 222 that is substantially perpendicular to the axial direction of the head 20, and the wall surface of the concaved portion 221 on a based end side of the head 20 is a tapered surface 223 sloped relative to the axial direction of the head 20.

A plunger 211 having a protractable/retractable ball 212 is provided at three locations on the outer circumferential surface of the head main body 21. The ball 212 is biased to a direction projecting from the outer circumferential surface of the head main body 21 by a spring that is not illustrated.

A concaved portion is formed in the leading end surface of the socket 41 of the rotational drive portion 40, and this concaved portion is a head retaining portion 411 in which the head main body 21 of the head 20 fits and is retained. A concaved portion 412 at which the ball 212 of the aforementioned plunger 211 engages is formed in the inner circumferential surface of this head retaining portion 411. The wall surface of this concaved portion 412 on the leading end side of the socket 41 is a tapered surface 413 sloped relative to the axial direction of the socket 41, and the wall surface of the concaved portion 412 on a base end side of the socket 41 is a vertical surface 414 that is substantially perpendicular to the axial direction of the socket 41.

Figure 16:
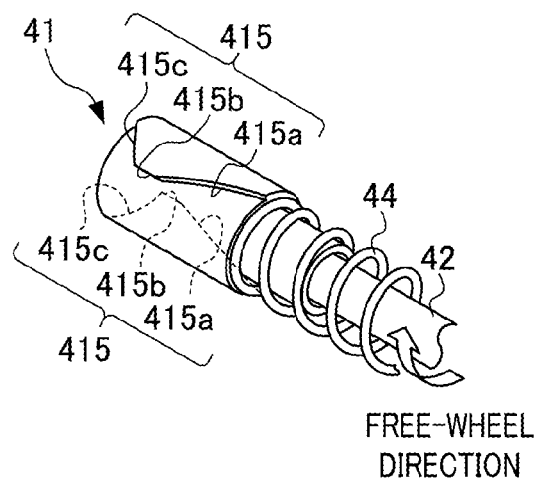
FIG. 16 is a perspective view of a socket of the fastening device according to the embodiment.

FIG. 16 is a perspective view of the socket 41. A two level step 415 reaching the leading edge from the base edge is provided in the outer circumferential surface of the socket 41. A pin 114 of the magazine 10 is able to lock in this step 415. More specifically, the step 415 includes a first guide portion 415*a* extending from the base edge to the leading end side counter clock-wise when viewed from the shaft 42 side, a retaining portion 415*b* continuous with this first guide portion 415*a* and extending substantially in parallel with the central axis of the socket 41, and a second guide portion 415*c* continuous with this retaining portion 415*b* and extending until the leading edge clockwise when viewed from the shaft 42 side. In addition, this socket 41 free-wheels in the clock-wise direction when viewed from the shaft 42 side as shown by the arrow in FIG. 16, by way of he one-way clutch 421.

Next, operations of the aforementioned fastening device 6 will be explained. A state in which the bolts B are installed in all of the heads 20 of the magazine 10 is assumed as an initial setting. First, the robot arm 7 is controlled by the control device to avoid obstacles and move so that a first mounting position is positioned on the rotational axis X of the fastening device 6. In addition, the magazine 10 is made to rotate by driving the switching portion 30, whereby one among the plurality of heads 20 is selectively positioned on the rotational axis of the socket 41.

Figure 17:
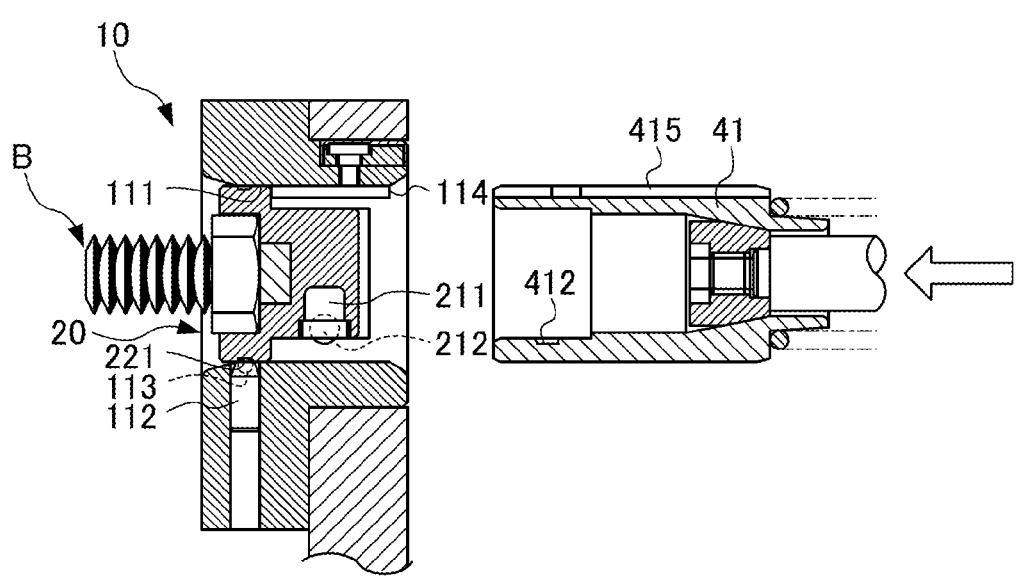
FIG. 17 is a view (1 of 5) illustrating operation of the fastening device according to this embodiment.

Next, the socket 41 is made to approach the head recess portion 111 of the magazine 10 by driving the advance/retract drive portion 50, and inserts into the head recess portion 111, as shown in FIG. 17. When this is done, a base edge of the pin 114 of the magazine 10 engages with the second guide portion 415*c* of the step 415 of the socket 41, as shown in FIG. 18(*a*).

Figure 18A:
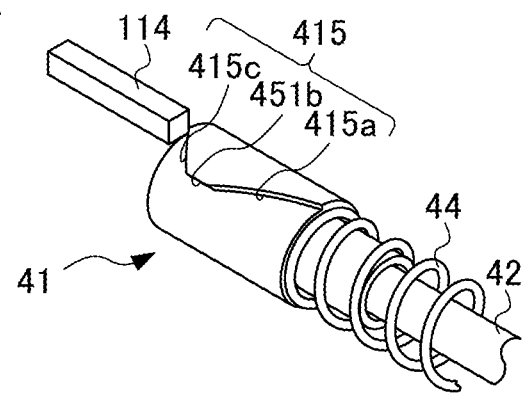
FIGS. 18A-18C are perspective views (1 of 5) illustrating operation of the socket of the fastening device according to this embodiment.
Figure 18B:
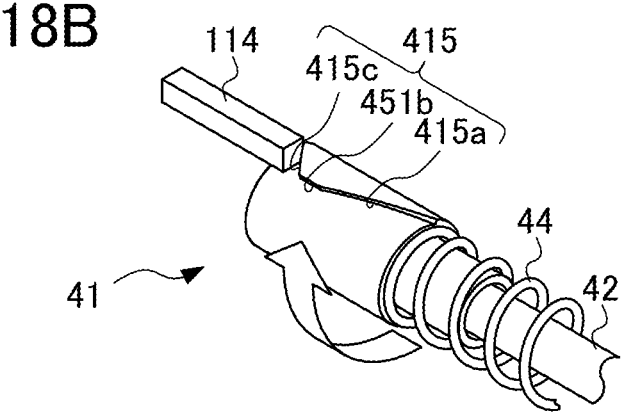
Figure 18C:
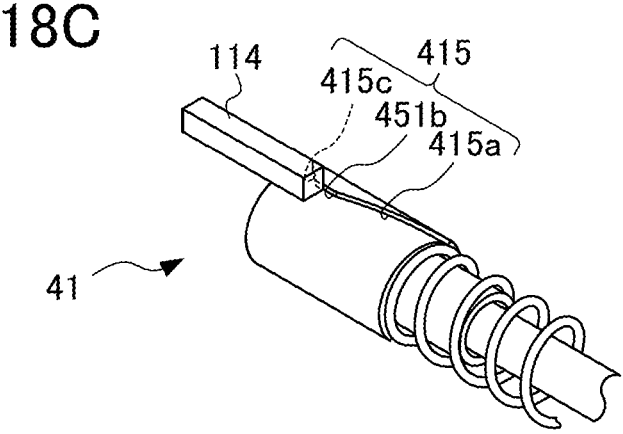

When the socket 41 is made to advance further, it is arranged such that the pin 114 of the magazine 10 moves to the base end side of the socket 41 along the second guide portion 415*c*, as shown in FIG. 18(*b*). At this time, since the second guide portion 415*c* extends clock-wise, when viewed from the shaft 42 side from the base end side to the leading end side, it is pressed by the pin 114, whereby the socket 41 rotates in the direction indicated by the arrow in FIG. 18(*b*). The rotational direction of this socket 41 is the free-wheel direction according to the one-way clutch 421.

Subsequently, when the pin 114 of the magazine 10 reaches the retaining portion 415*b*, since the retaining portion 415*b* extends substantially in parallel to the central axis of the socket 41, it is no longer pressed by the pin 114, and rotation of the socket 41 ends, as shown in FIG. 18(*c*). The concaved portion 412 of the socket 41 is positioned on an extension of the straight line in the rotational axis X direction of the plunger 211 of the head 20 due to the rotation of this socket 41.

Figure 19:
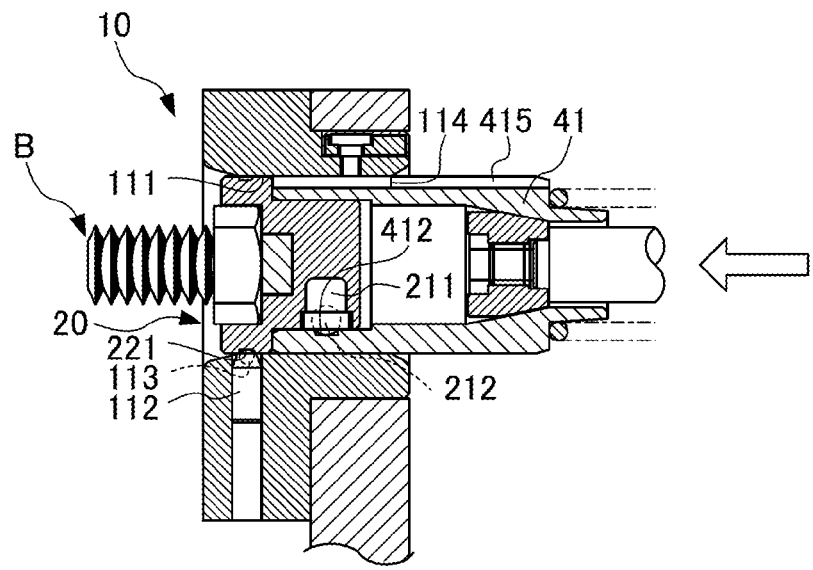
FIG. 19 is a view (2 of 5) illustrating operation of the fastening device according to this embodiment.

Subsequently, the socket 41 is completely inserted into the head recess portion 111, as shown in FIG. 19. When this is done, the plunger 211 of the head 20 engages the concaved portion 412 of the socket 41, whereby the socket 41 retains the head 20.

Figure 20:
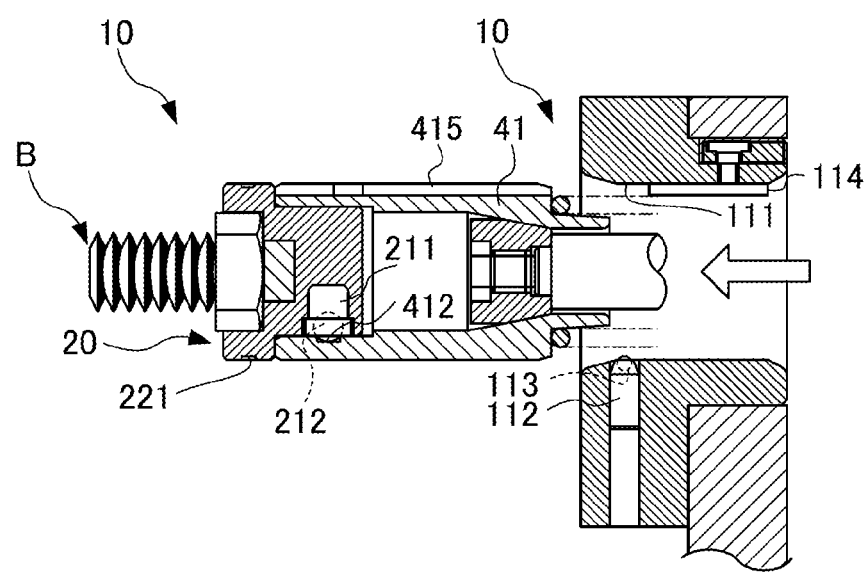
FIG. 20 is a view (3 of 5) illustrating operation of the fastening device according to this embodiment.

Furthermore, the socket 41 is made to advance by driving the advance/retract drive portion 50, whereby this socket 41 is made to penetrate the head recess portion 111, as shown in FIG. 20.

At this time, the plunger 211 of the head 20 engages the vertical surface 414 of the concaved portion 412 of the socket 41, and the plunger 112 of the magazine 10 engages the tapered surface 223 of the concaved portion 221 of the head 20. Therefore, the force by the socket 41 pressing the head 20 and causing it to move is greater than the force by the magazine 10 suppressing movement of the head 20.

Consequently, the engaging between the concaved portion 221 of the head 20 and the plunger 112 of the magazine 10 is released, the head 20 detaches from the magazine 10, and moves to the front side of the magazine 10 along with the socket 41.

Subsequently, the head 20 is made to rotate by driving the drive portion 43 of the rotational drive portion 40, whereby the bolt B fastens to the first mounting position.

Figure 21A:
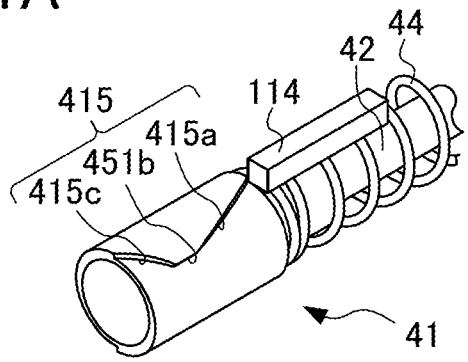
FIGS. 21A-21C are perspective views (2 of 5) illustrating operation of the socket of the fastening device according to this embodiment.
Figure 21B:
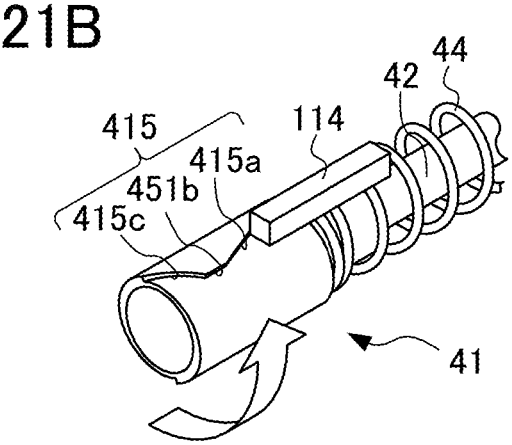

After completion of fastening the bolt B, the driving of the drive portion 43 of the rotational drive portion 40 is stopped, the advance/retract drive portion 50 is driven, whereupon the socket 41 is made to retract. When this is done, the leading edge of the pin 114 of the magazine 10 engages the first guide portion 415*a* of the step 415 of the socket 41, as shown in FIG. 21(*a*).

When the socket 41 is made to retract further, it is configured such that the pin 114 of the magazine 10 moves to the leading end side of the socket 41 along the first guide portion 415*a*. At this time, since the first guide portion 415*a* extends counter clock-wise when viewed from the shaft 42 side from the base end side to the leading end side, it is pressed by the pin 114, whereby the socket 41 rotates in the direction indicated by the arrow in FIG. 21(b). The rotational direction of this socket 41 is the free-wheel direction according to the one-way clutch 421.

Figure 21C:
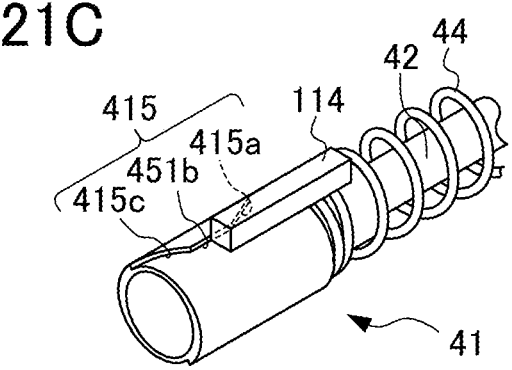

Subsequently, when the pin 114 of the magazine 10 reaches the retaining portion 415b, since the retaining portion 415b extends substantially in parallel to the central axis of the socket 41, it is no longer pressed by the pin 114, and rotation of the socket 41 ends, as shown in FIG. 21(c). The concaved portion 221 of the head 20 is positioned on an extension of the straight line in the rotational axis X direction of the plunger 112 of the magazine 10 by the rotation of this socket 41.

Figure 22:
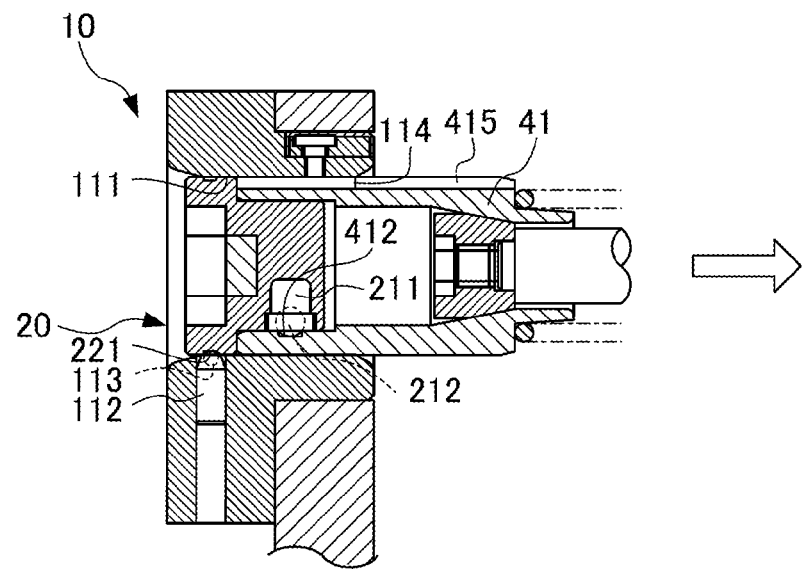
FIG. 22 is a view (4 of 5) illustrating operation of the fastening device according to this embodiment.

Subsequently, the head 20 retracts along with the socket 41, and the concaved portion 221 of the head 20 and the plunger 112 of the magazine 10 engage, whereby the head 20 is retained to the magazine 10 again, as shown in FIG. 22.

Figure 23:
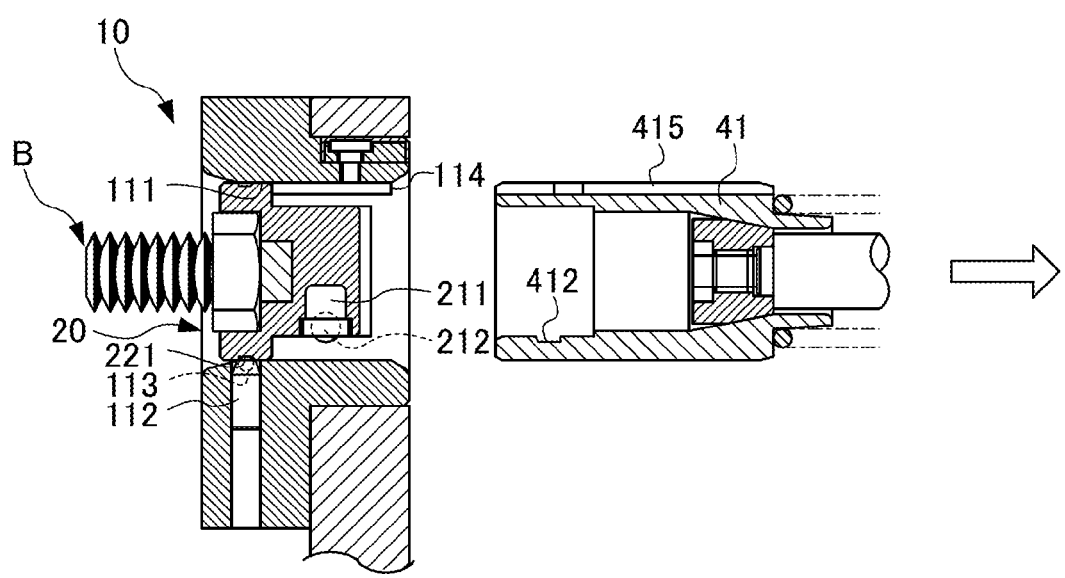
FIG. 23 is a view (5 of 5) illustrating operation of the fastening device according to this embodiment.

Furthermore, the socket 41 is made to retract by driving the advance/retract drive portion 50, and this socket 41 pulls out from the head recess portion 111, as shown in FIG. 23.

At this time, the plunger 211 of the head 20 engages the vertical surface 414 of the concaved portion 412 of the socket 41, and the plunger 112 of the magazine 10 engages the vertical surface 222 of the concaved portion 221 of the head 20. Therefore, the force at which the magazine 10 retains the head 20 is greater than the force at which the socket 41 retains the head 20.

In addition, the pin 114 of the magazine 10 engages the flange portion 22 of the head 20, whereby retraction of the head 20 is restricted. Therefore, the engaging between the plunger 211 of the head 20 and the concaved portion 412 of the socket 41 is released, the head 20 is retained by the magazine 10, the head 20 detaches from the socket 41, and the socket 41 retracts alone.

Subsequently, the robot arm 7 is controlled by the control device 8 to move the fastening device 6 near a second mounting position of the bolt B, and the same operations as the aforementioned operations are repeated.

There are the following effects according to the present embodiment.

(1) When the socket 41 is made to retract and is pulled out from the head recess portion 111, the pin 114 engages the step 415 of the socket 41, and then the step 415 of the socket 41 is pressed by the pin 114 in accordance with the socket 41 retracting, and the socket 41 rotates. Therefore, when the head 20 is retained again to the magazine 10 after fastening of the bolt B, the head 20 can be adjusted to a predetermined rotational phase relative to the magazine, thereby enabling the concaved portion 221 of the head 20 to be reliably engaged to the plunger 112 of the magazine 10.

(2) When the socket 41 is made to advance and penetrates the head recess portion 111, the pin 114 engages the step 415 of the socket 41, and then the step 415 of the socket 41 is pressed by the pin 114 in accordance with the socket 41 advancing, whereby the socket 41 rotates. Therefore, when the socket 41 is inserted into the magazine 10, the socket 41 can be adjusted to a predetermined rotational phase relative to the head 20, thereby enabling the concaved portion 412 of the socket 41 to be reliably engaged to the plunger 211 of the head 20.

(3) Since the one-way clutch 412 is provided to the rotational drive portion 40, it is no longer necessary to cause the entire rotational drive portion 40 to rotate when the socket 41 is pressed by the pin 114 and made to rotate, and since the socket 41 can be made to rotate with little pressing force, operation of the fastening device 6 is smooth.

(4) When the socket 41 is made to retract and pulls out from the head recess portion 111, since the pin 114 is made to engage the head 20, thereby restricting retraction of the head 20, the head 20 can be prevented from pulling out from the magazine 10 with the socket 41.

Third Embodiment

Figure 24:
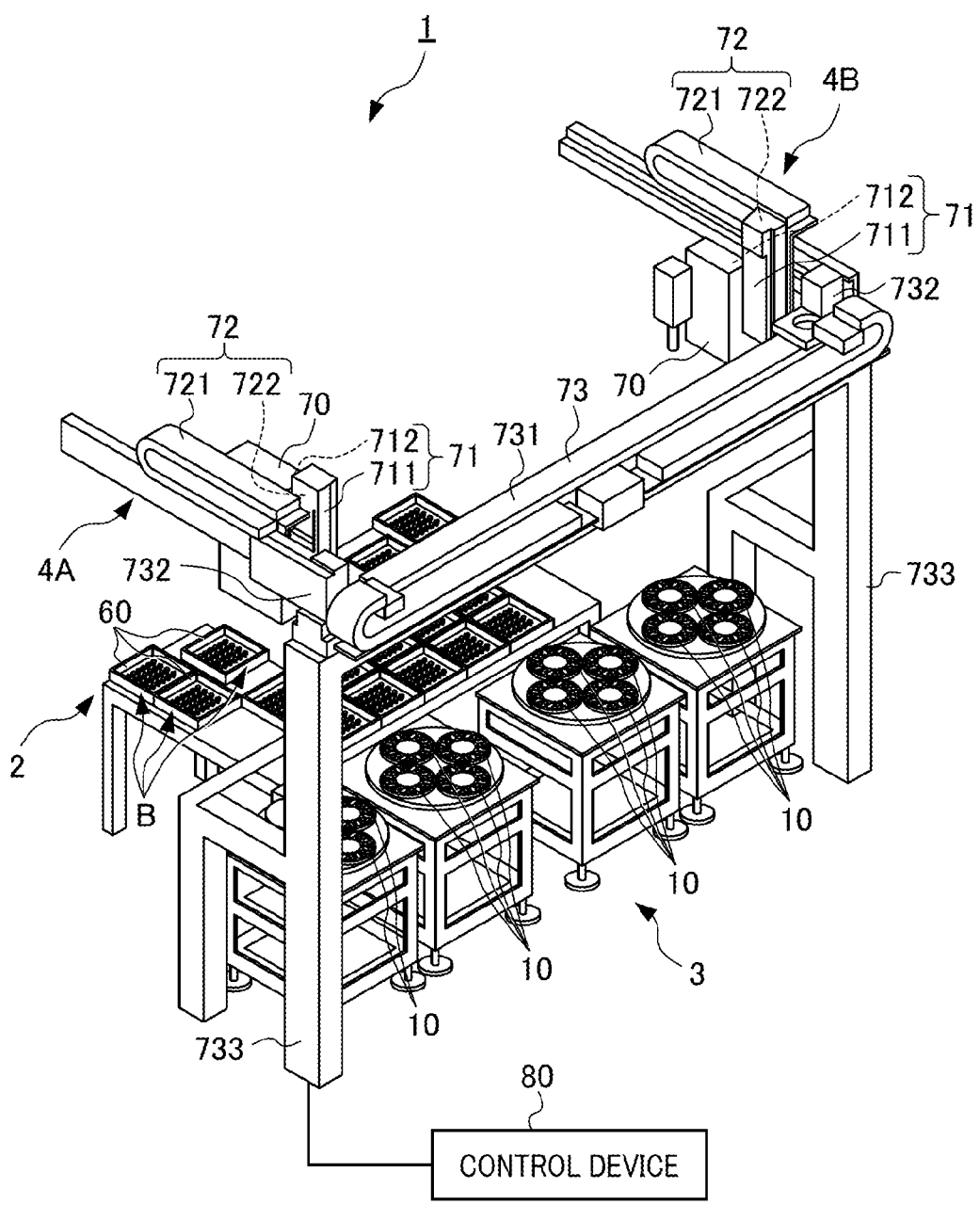
FIG. 24 is a perspective view of a device for loading a bolt according to a third embodiment according to the present invention to which a method of loading a fastening member is applied.

FIG. 24 is a perspective view showing a simple overview of a bolt loading system 1 to which a method of loading a fastening member has been applied according to a third embodiment according to the present invention. This bolt loading system 1 is an apparatus that loads bolts B into the magazine 10, and includes a bolt placement table 2 on which the bolts B are placed, four magazine placement tables 3 on which the magazines 10 are placed, a pair of bolt loading devices 4A, 4B that installs the bolts B placed on the bolt placement table 2 into this magazine 10, and a control device 80 that controls these.

A plurality of bolt storage cases 60 of box-shape with the top open is placed on the bolt placement table 2. The bolts B are sorted according to type and stored in these bolt storage cases 60. In other words, one type of bolt B is stored in one bolt storage case 60.

The bolt loading device 4A installs bolts into the magazines 10 on the two magazine placement tables 3 at the front left in FIG. 24, and the bolt loading device 4B loads bolts into the magazines 10 on the two magazine placement tables 3 at the back right in FIG. 24.

Although the bolt loading device 4A will be explained hereinafter, the configuration is the same for the bolt loading device 4B. The bolt loading device 4A includes a bolt installation mechanism 70 that retains the magazine 10 and installs the bolts B positioned directly thereunder into the magazine 10, a first transfer mechanism 71 that moves the bolt installation mechanism 70 vertically, a second transfer mechanism 72 that moves this first transfer mechanism 71 in a predetermined direction that is horizontal, and a third transfer mechanism 73 that moves this second transfer mechanism 72 in a horizontal direction that intersects the predetermined direction.

The first transfer mechanism 71 includes a slide rail 711 that extends substantially vertically, and a slide mechanism 712 that makes the bolt installation mechanism 70 slide along this slide rail 711. According to the first transfer mechanism 71, the bolt installation mechanism 70 can be moved up and down along the slide rail 711 by driving the slide mechanism 712.

The second transfer mechanism 72 includes a slide rail 721 that extends in a predetermined direction that is horizontal, and a slide mechanism 722 that makes the first transfer mechanism 71 slide along this slide rail 721. According to the second transfer mechanism 72, the bolt installation mechanism 70 can be moved in a predetermined direction that is horizontal along the slide rail 721 by driving the slide mechanism 722.

The third transfer mechanism 73 includes a slide rail 731 that extends in a direction that is horizontal and intersects the predetermined direction, a slide mechanism 732 that makes the second transfer mechanism 72 move along the slide rail 731, and a pair of support pillars 733 that is provided to interpose the magazine placement tables 3 and supports the slide rail 731. This slide rail 731 is shared by the bolt loading device 4A and the bolt loading device 4B. According to the third transfer mechanism 73, the bolt installation mechanism 70 can be moved in a direction that is horizontal and intersects the predetermined direction along the slide rail 731, by driving the slide mechanism 732.

Figure 25A:
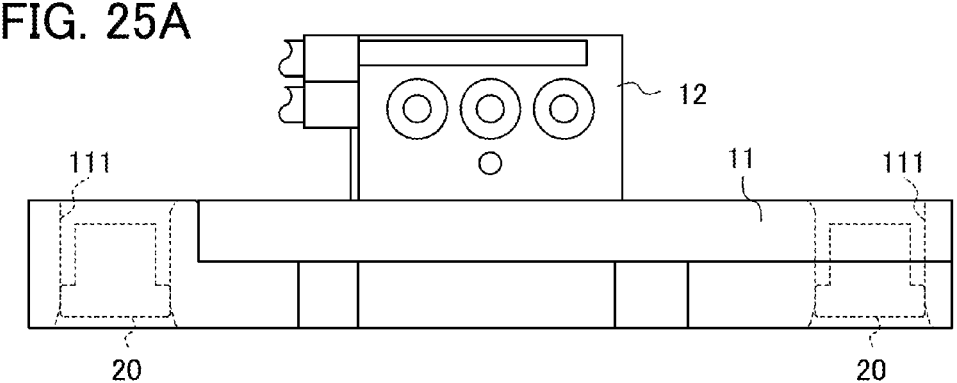
FIGS. 25A and 25B are a side view and front view, respectively, of a magazine of a bolt loading system according to this embodiment.
Figure 25B:
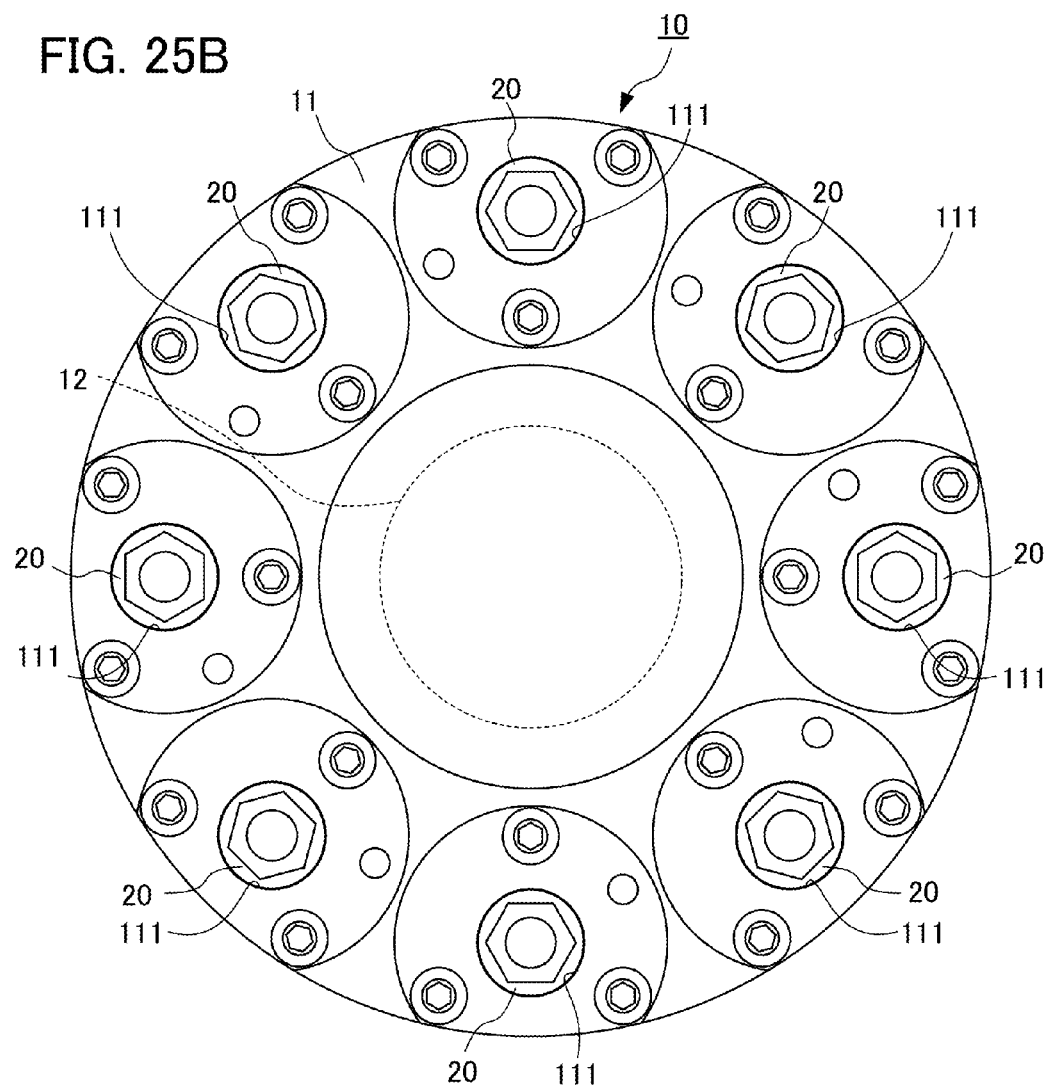

FIG. 25 provides a side view and plan view of the magazine 10. The magazine 10 includes a base portion 11 of disk shape, an attachment/detachment portion 12 provided at the center of this base portion 11 on a back side thereof, and eight of the aforementioned heads 20 disposed along the outer circumferential surface of the base portion 11. Eight through-holes are formed at predetermined intervals along the outer circumference in the base portion 11, and these through-holes serve as head recess portions 111, respectively.

Each head 20 is housed and retained in the head recess portions 111 so as to detach from the magazine 10 when moved in the advancing direction of the socket 41. Bolts B are retained in these heads 20 (refer to FIG. 26). The attachment/detachment portion 12 is a so-called auto tool changer.

Figure 26:
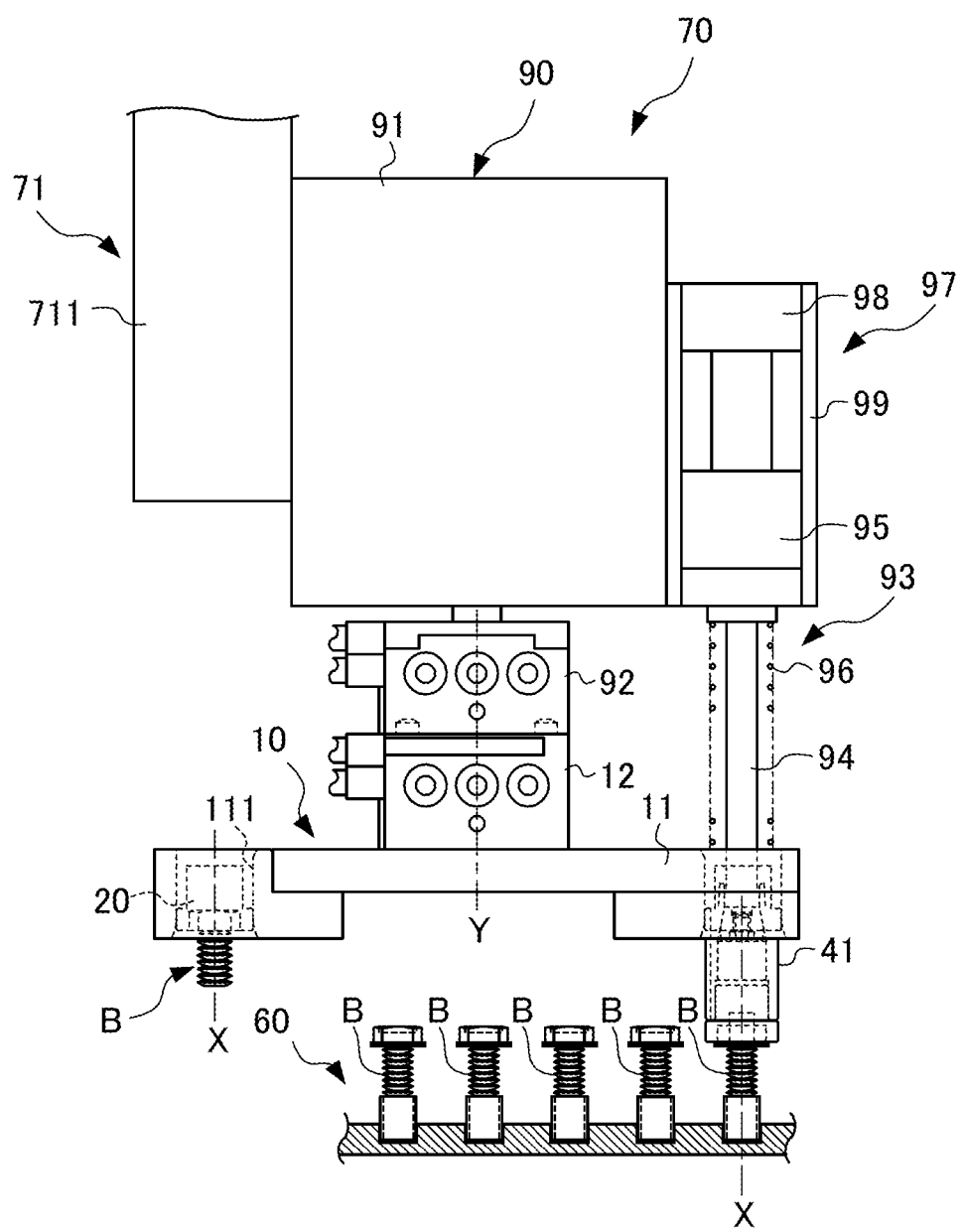
FIG. 26 is a side view of a bolt installation mechanism of the bolt loading system according to this embodiment.

FIG. 26 is a side view of the bolt installation mechanism 70. The bolt installation mechanism 70 includes a rotational drive portion 93 that rotationally drives the socket 41, an advance/retract drive portion 97 that makes the socket 41 of the rotational drive portion 93 advance or retract along the rotational axis thereof, and a switching portion 90 that causes the magazine 10 to rotate to selectively position one of the heads 20 on the rotational axis of the socket 41.

The switching portion 90 includes a magazine drive portion 91 that rotationally drives, and an attachment/detachment portion 92 provided at the leading end of a rotating shaft of this magazine drive portion 91. The magazine drive portion 91 is supported to be slidable to the slide rail 711 of the first transfer mechanism 71, as described above.

The attachment/detachment portion 92 is a so-called auto tool changer, and the attachment/detachment portion 12 of the magazine 10 is detachable thereto. According to the switching portion 90, the attachment/detachment portion 12 of the magazine 10 is installed to the attachment/detachment portion 92 of the switching portion 90, and the magazine 10 rotates about the rotational axis Y by driving the magazine drive portion 91 to cause the head 20 to move.

The rotational drive portion 93 includes the socket 41, a rod-like shaft 94 connected to a central shaft of the socket 41, and a drive portion 95 that causes the shaft 94 to rotate. A spring 96 for causing the socket 41 to float is interposed between the drive portion 95 and the socket 41. The rotational axis X of this rotational drive portion 93 is substantially parallel to the rotational axis Y of the magazine 10.

An advance/retract drive portion 97 is provided to the switching portion 90, and causes the rotational drive portion 93 to advance or retract along the rotational axis X. This advance/retract drive portion 97 includes a slide guide 99 that is provided substantially perpendicular to the magazine drive portion 91 and guides the rotational drive portion 93, and a cylinder mechanism 98 that causes the rotational drive portion 93 to advance and retract along this slide guide 99.

Figure 27:
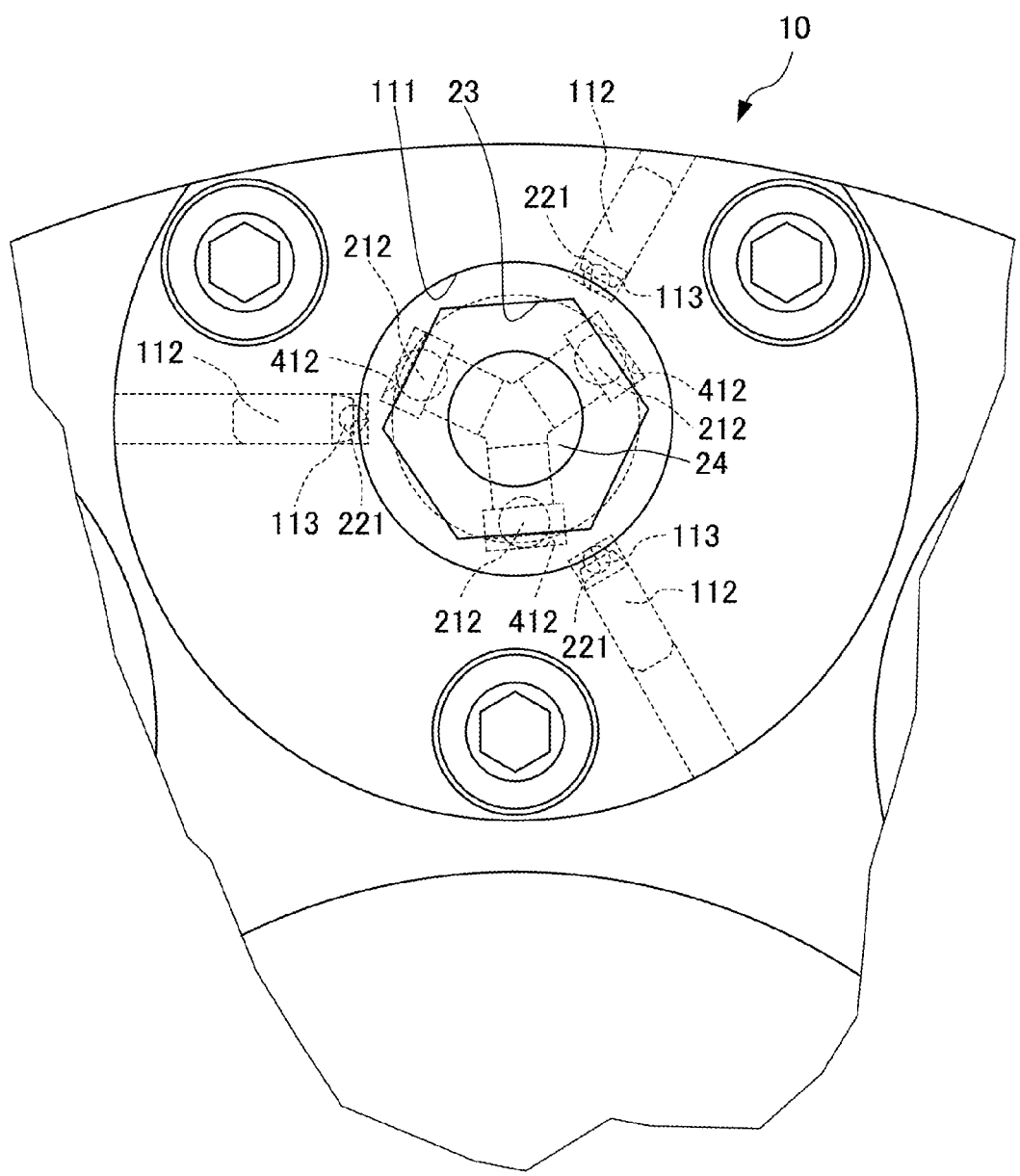
FIG. 27 is an enlarged plan view of a portion at which the head of the magazine is housed according to this embodiment.
Figure 28:
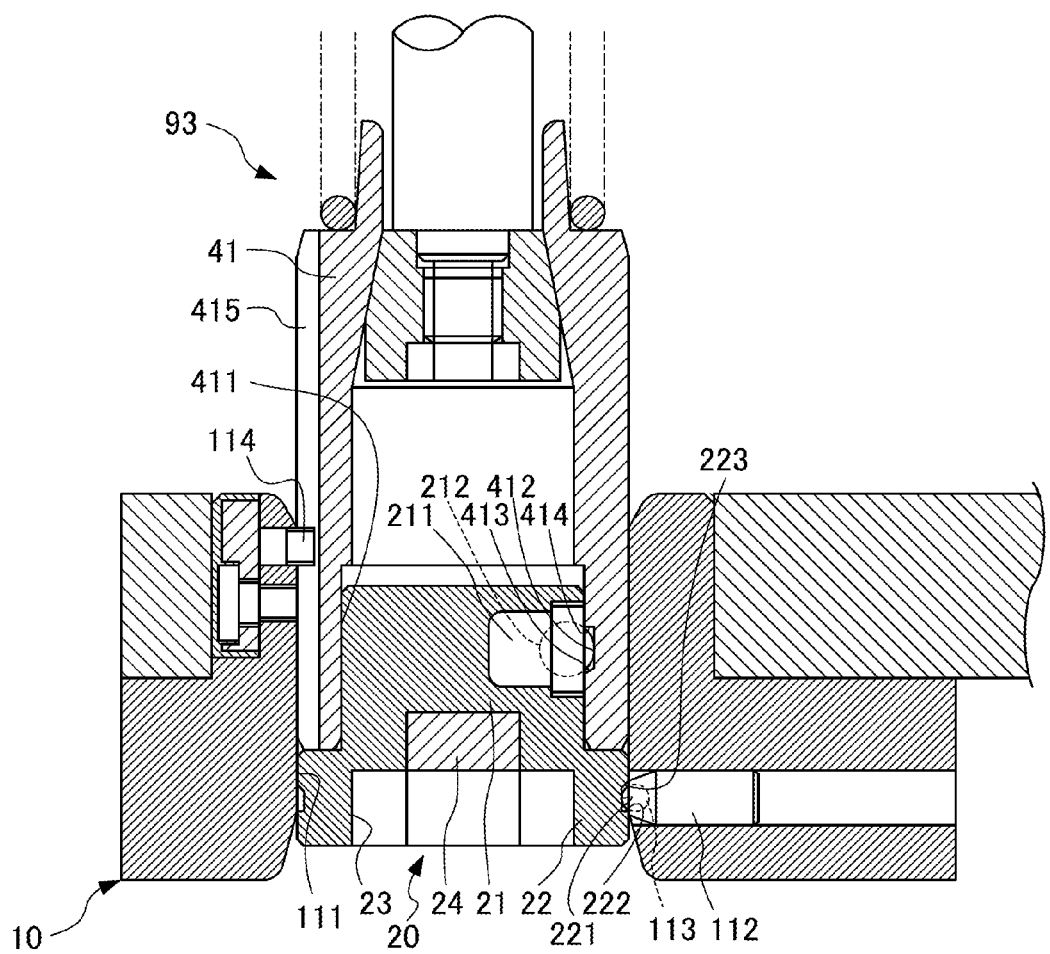
FIG. 28 is an enlarged cross-sectional view of a portion at which the head of the magazine is housed according to this embodiment.

FIG. 27 is an enlarged plan view of a portion at which the head 20 of the magazine 10 is housed, and FIG. 28 is an enlarged cross-sectional view of a portion at which the head 20 of the magazine 10 is housed. FIG. 28 shows a state in which the socket 41 is inserted in the head recess portion 111 of the magazine 10. A plunger 112 having a protractable/retractable ball 113 is provided at three locations in the inner circumferential surface of the head recess portion 111 of the magazine 10 on a front side thereof. The ball 113 is biased in a direction projecting from the inner circumferential surface of the head recess portion 111 by a spring that is not illustrated. A pin 114 projects at a position in the inner circumferential surface of the head recess portion 111 on a rear side of the magazine 10.

The head 20 includes a column-shaped head main body 21, and a disk-shaped flange portion 22 formed at a leading end side of this head main body 21 and having an outside diameter larger than the head main body 21. A hexagonal concaved portion is formed in the leading end surface of the head 20, and this concaved portion serves as a bolt retaining portion 23 in which the head of the bolt B fits. A magnet 24 is installed at the bottom surface of this bolt retaining portion 23, and retains the bolt B by way of the magnetic force of the magnet 24.

A concaved portion 221 in which the ball 113 of the aforementioned plunger 112 engages is formed at three locations on the outer circumferential surface of the flange portion 22. A wall surface of this concaved portion 221 on a leading end side of the head 20 is a vertical surface 222 that is substantially perpendicular to the axial direction of the head 20, and the wall surface of the concaved portion 221 on a base end side of the head 20 is a tapered surface 223 sloped relative to the axial direction of the head 20.

A plunger 211 having a protractable/retractable ball 212 is provided at three locations on the outer circumferential surface of the head main body 21. The ball 212 is biased to a direction projecting from the outer circumferential surface of the head main body 21 by a spring that is not illustrated.

A concaved portion is formed in the leading end surface of the socket 41 of the rotational drive portion 93, and this concaved portion is a head retaining portion 411 in which the head main body 21 of the head 20 fits and is retained. A concaved portion 412 at which the ball 212 of the aforementioned plunger 211 engages is formed in the inner circumferential surface of this head retaining portion 411. The wall surface of this concaved portion 412 on the leading end side of the socket 41 is a tapered surface 413 sloped relative to the axial direction of the socket 41, and the wall surface of the concaved portion 412 on a base end side of the socket 41 is a vertical surface 414 that is substantially perpendicular to the axial direction of the socket 41. In addition, a key groove 415 in which the pin 114 of the magazine 10 fits is formed in the outer circumferential surface of the socket 41 along the rotational axis of the socket 41.

Figure 29:
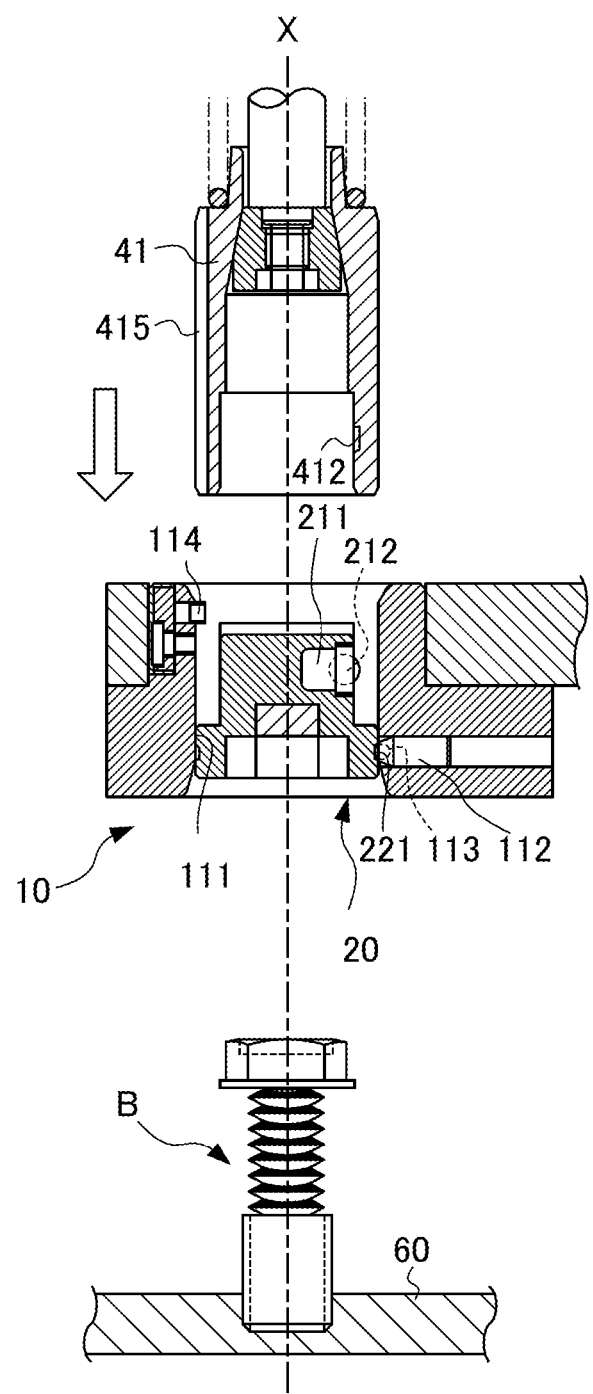
FIG. 29 is a view (1) illustrating operation of the bolt loading system according to this embodiment.

Next, operations of the aforementioned bolt loading system 1 will be explained. First, the first transfer mechanism 71, the second transfer mechanism 72 and the third transfer mechanism 73 are controlled by the control device 80 to make the bolt loading system 1 approach a bolt storage case 60 in which a predetermined type of the bolts B is stored, and moves so that this bolt B is positioned on the rotational axis X of the socket 41 of the bolt loading system 1, as shown in FIG. 29. In addition, the magazine 10 is made to rotate by driving the switching portion 90, whereby, depending on this predetermined type of bolt B, the head 20 is selectively positioned between the socket 41 and the bolt B.

Next, the socket 41 is made to approach the head recess portion 111 of the magazine 10 by driving the advance/retract drive portion 97.

Figure 30:
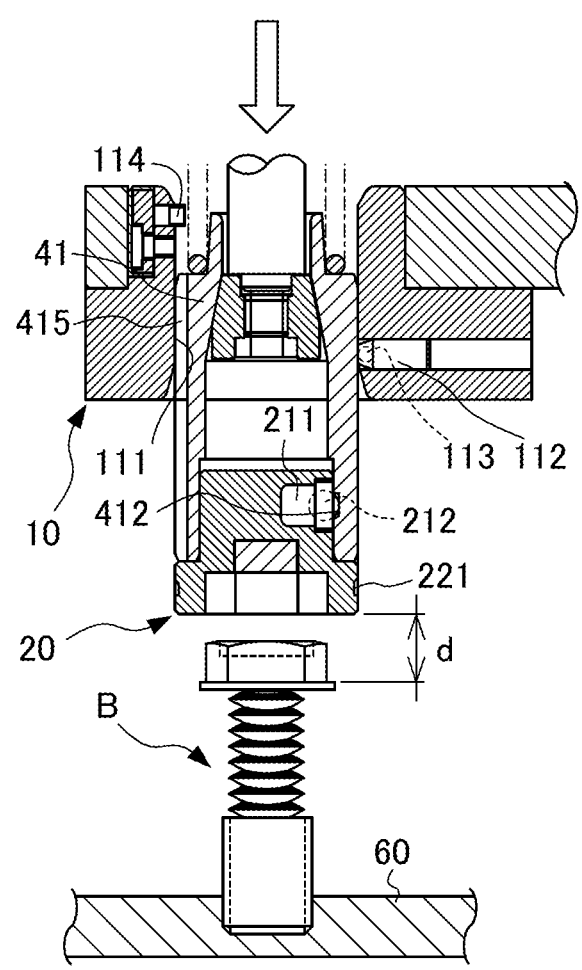
FIG. 30 is a view (2) illustrating operation of the bolt loading system according to this embodiment.
Figure 31:
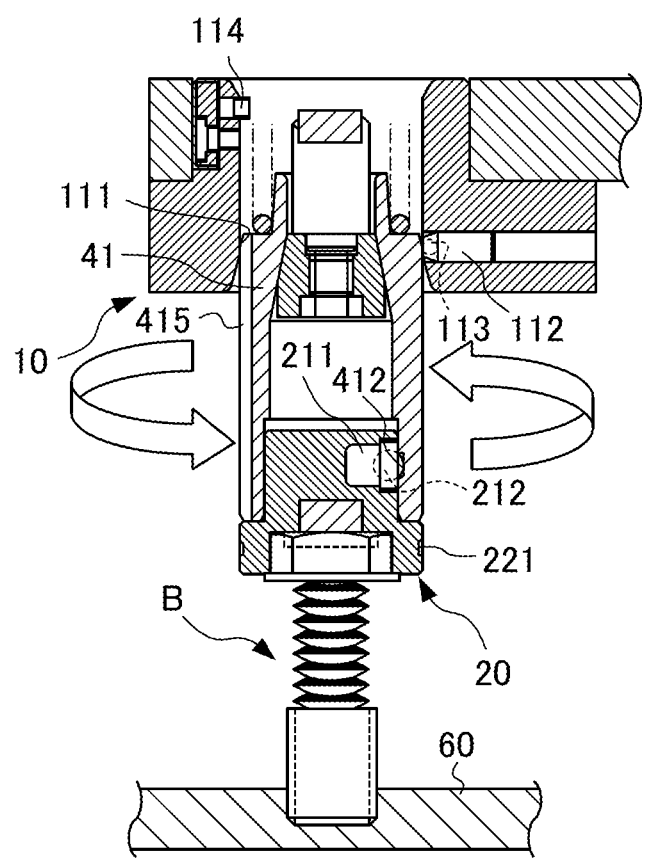
FIG. 31 is a view (3) illustrating operation of the bolt loading system according to this embodiment.

Then, the socket 41 inserts into the head recess portion 111 while causing the key groove 415 of the socket 41 to fit together with the pin 114 of the head recess portion 111 of the magazine 10, as shown in FIG. 30. When this is done, the plunger 211 of the head 20 engages the concaved portion 412 of the socket 41, and the socket 41 retains the head 20. Furthermore, the socket 41 is made to advance by controlling the advance/retract drive portion 97, whereby this socket 41 is made to penetrate the head recess portion 111. At this time, the engaging between the concaved portion 221 of the head 20 and the plunger 112 of the magazine 10 is released, the head 20 detaches from the magazine 10, and moves below the magazine 10 along with the socket 41.

Subsequently, the head 20 is made to rotate by driving the drive portion 95 of the rotational drive portion 93, while pushing the head 20 to the bolt B by driving the advance/ retract drive portion 97, thereby causing the phase of the bolt retaining portion 23 of the head 20 to change. At this time, the relative distance d of the head 20 relative to the bolt B is monitored by the control device 80.

Then, in a case of the relative distance d being substantially zero, it is determined that the phase of the bolt retaining portion 23 of the head 20 matches the phase of the head of the bolt B, and the head of the bolt B fits to the bolt retaining portion 23. By operating in this way, the bolt B is retained in the head 20.

It should be noted that, in a case of the relative distance d not becoming substantially zero over the elapse of a predetermined time, the control device 80 determines that the head of the bolt B does not fit in the bolt retaining portion 23 of the head 20, separates the head 20 from the bolt B by causing the socket 41 to retract, and then performs a retry in which the head 20 is made to approach the fastening member by causing the socket 41 to advance again.

After completion of retaining of the bolt B, the control device 80 stops driving of the drive portion 95 of the rotational drive portion 93, and drives the advance/retract drive portion 97, whereupon the socket 41 is made to retract. When this is done, the head 20 retracts along with the socket 41, and the concaved portion 221 of the head 20 and the plunger 112 of the magazine 10 engage, whereby the head 20 is retained to the magazine 10 again.

Figure 32:
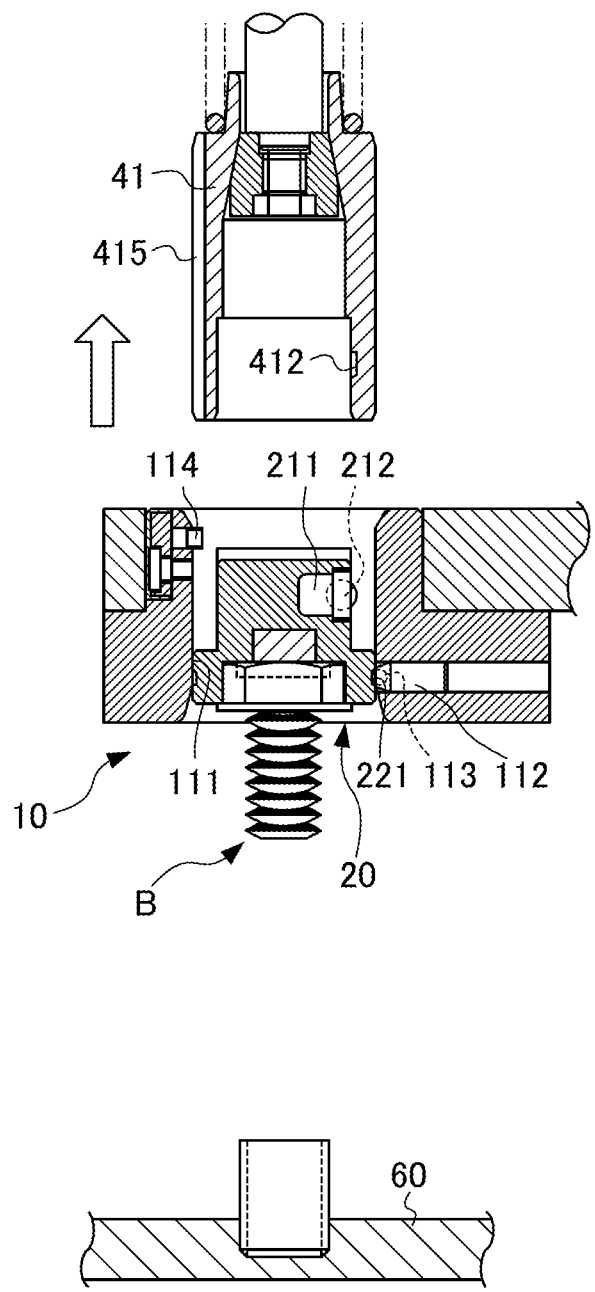
FIG. 32 is a view (4) illustrating operation of the bolt loading system according to this embodiment.

Furthermore, the socket 41 is made to retract by driving the advance/retract drive portion 97, and this socket 41 pulls out from the head recess portion 111, as shown in FIG. 32. At this time, the engaging between the plunger 211 of the head 20 and the concaved portion 412 of the socket 41 is released, the head 20 detaches from the socket 41, and the socket 41 retracts alone.

Subsequently, the same operations as the aforementioned operations are repeated to load the bolts B into all of the heads 20.

There are the following effects according to the present embodiment.

(1) By providing a plurality of types of heads 20 to the magazine 10, and fitting the bolts B according to type into these heads 20, respectively, a plurality of types of bolts B can be loaded to the magazine 10.

(2) By repeating the operations to fit the bolts B in each head 20, the bolts B are loaded into all of the heads 20 retained to the magazine 10. Therefore, since the phase of the bolt retaining portion 23 of one of the heads 20 and the phase of the head of one of the bolts B simply must be matched in a one-time operation compared to a case of simultaneously loading fastening members to all of the heads retained in a magazine, the bolts B can be reliably loaded by the magazine 10.

(3) When retaining the bolt B by the head 20, the socket 41 is made to rotate while advancing, whereby the head 20 is made to rotate while pushing the bolt B and the relative distance of this head 20 to the bolt B is monitored. When the phase of the bolt retaining portion 23 of the head 20 matches the phase of the head of the bolt B, the bolt B fits into the head 20; therefore, the relative distance of the head 20 to the bolt B decreases. Therefore, in a case of the relative distance d of the head 20 to the bolt B being substantially zero, it is determined that the bolt B fits in the head 20. Consequently, since it is possible to easily determine that the head 20 is retaining the bolt B, malfunctions of the bolt loading system 1 when retaining the bolts B in the heads 20 can be reduced.

(4) When retaining the bolt B by the head 20, since the bolt B is made to be retained in the head 20 simply by linear motion and rotational motion of the socket 41, it is possible to have the bolt B reliably retained in the head 20 due to the operation of the head 20 being simplified.

(5) When retaining the bolt B by the head 20, in a case of the relative distance d not becoming substantially zero over the span of a predetermined time, a retry is performed. The likelihood of the bolt B fitting the head 20 is raised by this retry, whereby it is possible to more reliably retain the bolts B in the heads 20.

Fourth Embodiment

Figure 33:
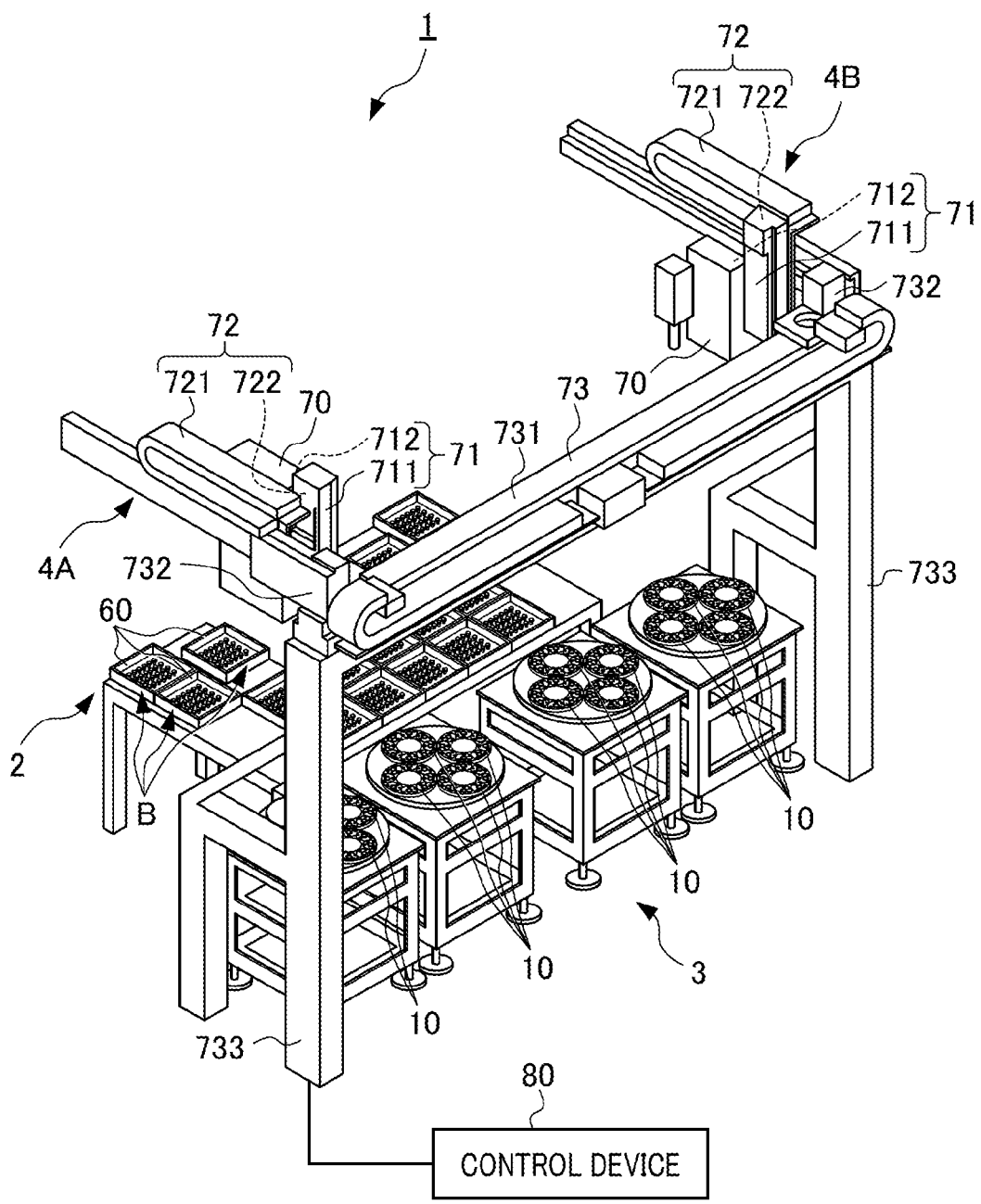
FIG. 33 is a perspective view of a bolt loading system to which the device for loading a fastening member according to a fourth embodiment according to the present invention.

FIG. 33 is a perspective view showing a simple overview of a bolt loading system 1 to which a device for loading fastening members is applied according to a fourth embodiment according to the present invention. This bolt loading system 1 is an apparatus that loads bolts B as a fastening member into the magazine 10, and includes a bolt placement table 2 on which the bolts B are placed, four magazine placement tables 3 on which the magazines 10 are placed, a pair of bolt loading devices 4A, 4B as devices for loading fastening members that installs the bolts B placed on the bolt placement table 2 into this magazine 10, and a control device 80 as a control unit that controls these.

A plurality bolt storage cases 60 is placed on the bolt placement table 2. The bolts B are sorted according to type and stored in these bolt storage cases 60. In other words, one type of bolt B is stored in one bolt storage case 60.

The bolt loading device 4A installs bolts B into the magazines 10 on the two magazine placement tables 3 at the front left in FIG. 33, and the bolt loading device 4B loads bolts B into the magazines 10 on the two magazine placement tables 3 at the back right in FIG. 33.

Although the bolt loading device 4A will be explained hereinafter, the configuration is the same for the bolt loading device 4B. The bolt loading device 4A includes a bolt installation mechanism 70 that retains the magazine 10 and installs the bolts B positioned directly thereunder into the magazine 10, a first transfer mechanism 71 that moves the bolt installation mechanism 70 vertically, a second transfer mechanism 72 that moves this first transfer mechanism 71 in a predetermined direction that is horizontal, and a third transfer mechanism 73 that moves this second transfer mechanism 72 in a horizontal direction that intersects the predetermined direction.

The first transfer mechanism 71 includes a slide rail 711 that extends substantially vertically, and a slide mechanism 712 that makes the bolt installation mechanism 70 slide along this slide rail 711. According to the first transfer mechanism 71, the bolt installation mechanism 70 can be moved up and down along the slide rail 711 by driving the slide mechanism 712.

The second transfer mechanism 72 includes a slide rail 721 that extends in a predetermined direction that is horizontal, and a slide mechanism 722 that makes the first transfer mechanism 71 slide along this slide rail 721. According to the second transfer mechanism 72, the bolt installation mechanism 70 can be moved in a predetermined direction that is horizontal along the slide rail 721 by driving the slide mechanism 722.

The third transfer mechanism 73 includes a slide rail 731 that extends in a direction that is horizontal and intersects the predetermined direction, a slide mechanism 732 that makes the second transfer mechanism 72 move along the slide rail 731, and a pair of support pillars 733 that is provided to interpose the magazine placement tables 3 and supports the slide rail 731. This slide rail 731 is shared by the bolt loading device 4A and the bolt loading device 4B. According to the third transfer mechanism 73, the bolt installation mechanism 70 can be moved in a direction that is horizontal and intersects the predetermined direction along the slide rail 731, by driving the slide mechanism 732.

Figure 34A:
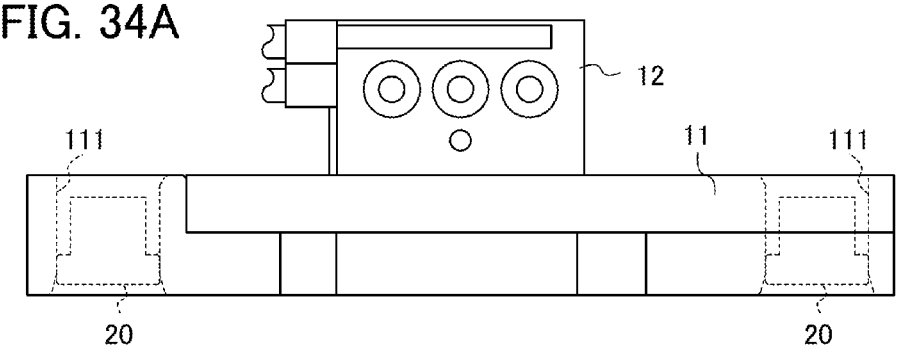
FIGS. 34A and 34B are a side view and front view, respectively, of a magazine of the bolt loading system according to this embodiment.
Figure 34B:
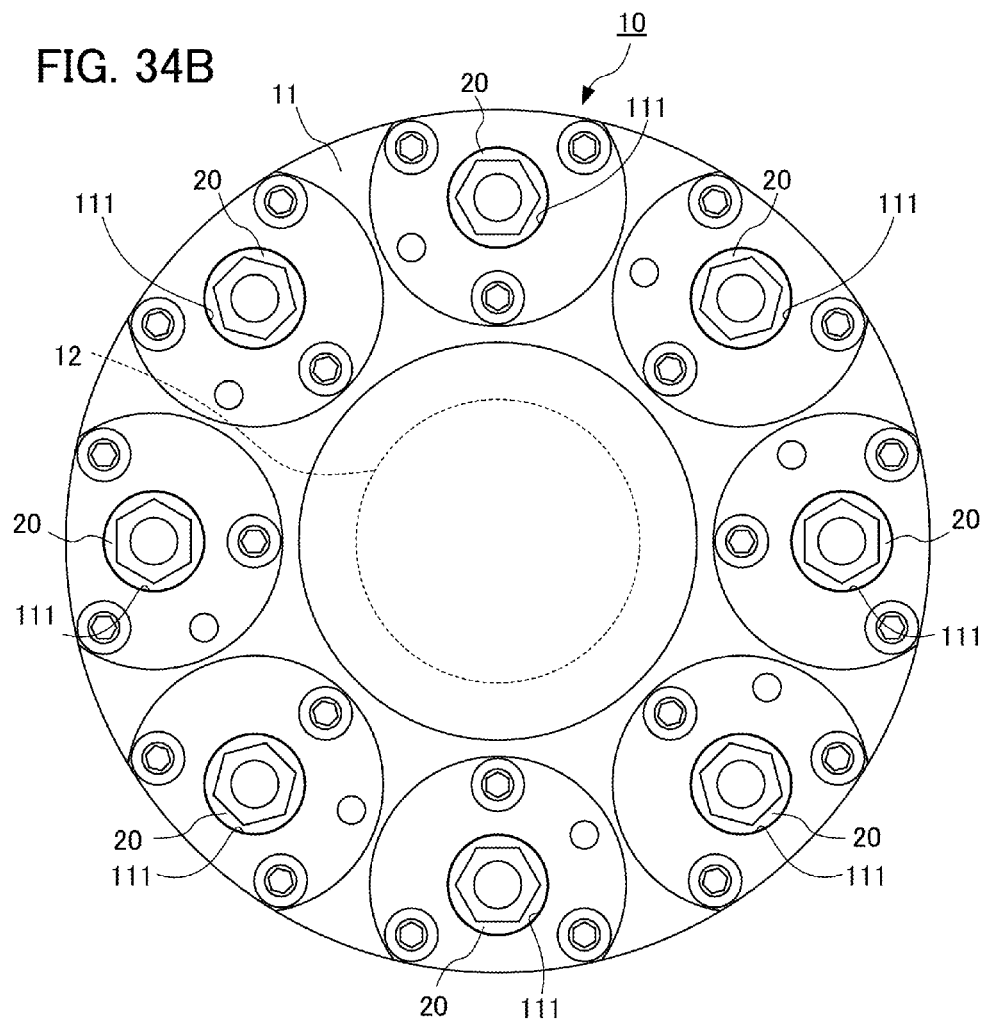

FIG. 34 provides a side view and plan view of the magazine 10. The magazine 10 includes a base portion 11 of disk shape, an attachment/detachment portion 12 provided at the center of this base portion 11 on a back side thereof, and eight of the heads 20 as retaining portions disposed along the outer circumferential surface of the base portion 11. Eight through-holes are formed at predetermined intervals along the outer circumference in the base portion 11, and these through-holes serve as head recess portions 111, respectively.

Each head 20 is housed and retained in the head recess portions 111 so as to detach from the magazine 10 when moved along the central axis of the magazine 10. Bolts B are retained in these heads 20 (refer to FIG. 35). The attachment/detachment portion 12 is a so-called auto tool changer.

Figure 35:
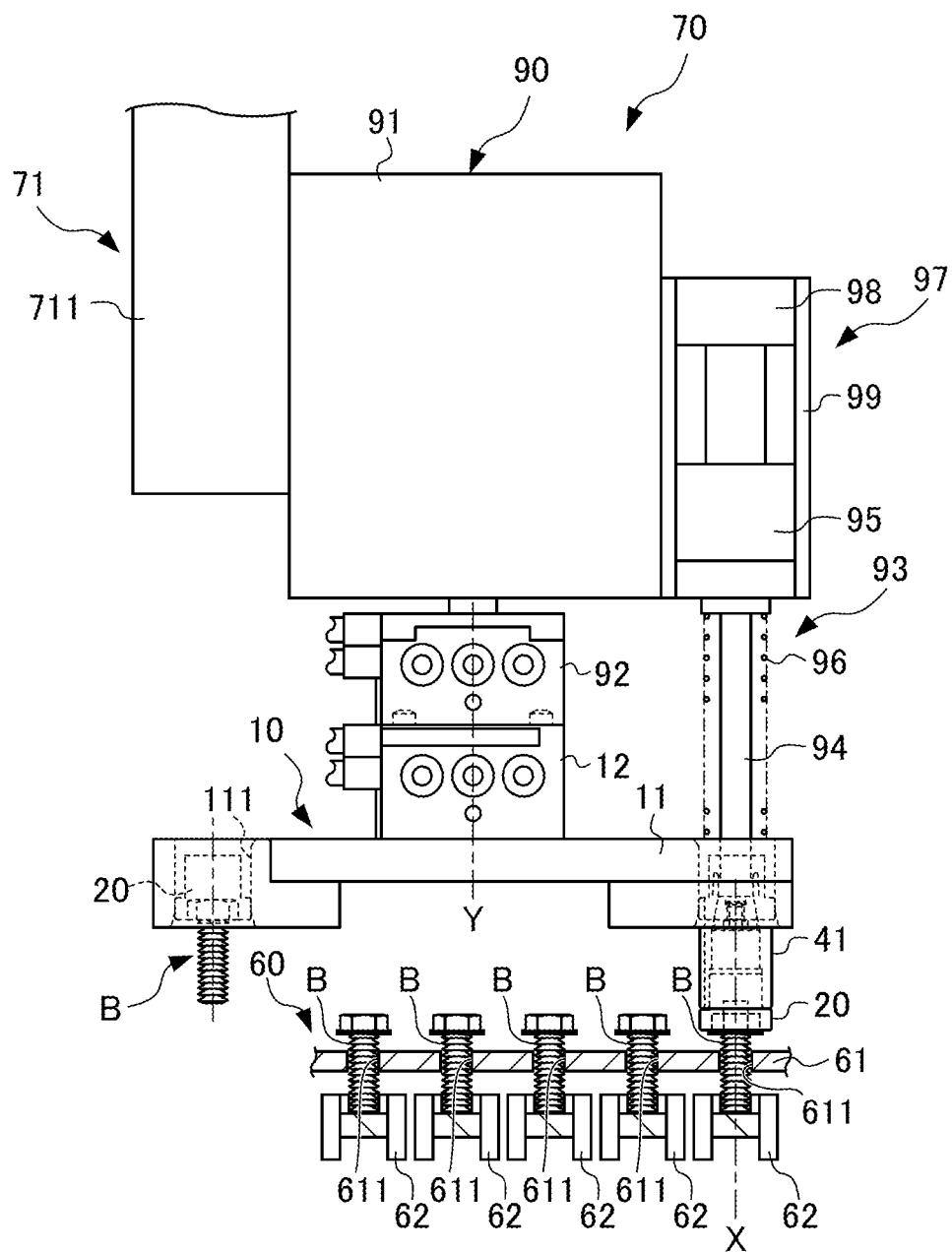
FIG. 35 is a side view of a bolt installation mechanism of the bolt loading system according to this embodiment.

FIG. 35 is a side view of the bolt installation mechanism 70. The bolt installation mechanism 70 includes the socket 41, a rotational drive portion 93 that rotationally drives this socket 41, an advance/retract drive portion 97 that makes this rotational drive portion 93 advance or retract along the rotational axis of the socket 41, and a switching portion 90 that causes the magazine 10 to rotate to selectively position one of the heads 20 on the rotational axis of the socket 41.

The switching portion 90 includes an attachment/detachment portion 92 to which the magazine 10 is installed, and a magazine drive portion 91 that rotationally drives this attachment/detachment portion 92. The magazine drive portion 91 is supported to be slidable to the slide rail 711 of the first transfer mechanism 71, as described above.

The attachment/detachment portion 92 is a so-called auto tool changer, and the attachment/detachment portion 12 of the magazine 10 is detachable thereto. According to the switching portion 90, the attachment/detachment portion 12 of the magazine 10 is installed to the attachment/detachment portion 92 of the switching portion 90, and the magazine 10 rotates with the rotational axis Y as the central axis by driving the magazine drive portion 91, whereby the head 20 moves.

The rotational drive portion 93 includes a rod-like shaft 94 connected to the central shaft of the socket 41, and a drive portion 95 that causes the shaft 94 to rotate. A spring 96 for causing the socket 41 to float is interposed between the drive portion 95 and the socket 41. This rotational drive portion 93 causes the socket 41 to rotate with the central axis thereof as the rotational axis X, by driving the drive portion 95. The rotational axis X of this rotational drive portion 93 is substantially parallel to the rotational axis Y of the magazine 10.

An advance/retract drive portion 97 is provided to the switching portion 90. This advance/retract drive portion 97 includes a slide guide 99 that is provided substantially perpendicular to the magazine drive portion 91 and guides the rotational drive portion 93, and a cylinder mechanism 98 that causes the rotational drive portion 93 to advance and retract along this slide guide 99. The advance/retract drive portion 97 causes the rotational drive portion 93 to advance or retract along the rotational axis X by driving the cylinder mechanism 98.

Figure 36:
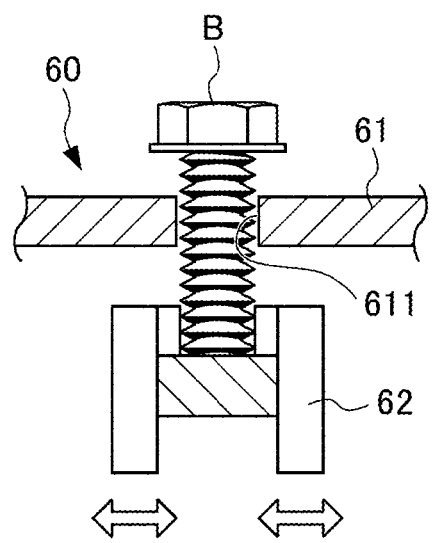
FIG. 36 is an enlarged cross-sectional view of a bolt housing case of the bolt loading system according to this embodiment.

FIG. 36 is an enlarged cross-sectional view of the bolt storage case 60. The bolt storage case 60 retains the bolts B to be aligned with the head thereof at the top side (refer to FIG. 35). This bolt storage case 60 includes a case main body 61 in which a plurality of through-holes 611 penetrated by the shank of the bolt B is formed, and a plurality of holding portions 62 that is provided inside of this case main body 61 and holds the bottom side of the bolts B, respectively.

A plurality of the bolts B is arranged so as to have projecting dimensions from the surface of the case main body 61 that are equal. Each of the holding portions 62 hold the bottom side of the bolt B by drawing together or separating a pair of clamping elements 621.

Figure 37:
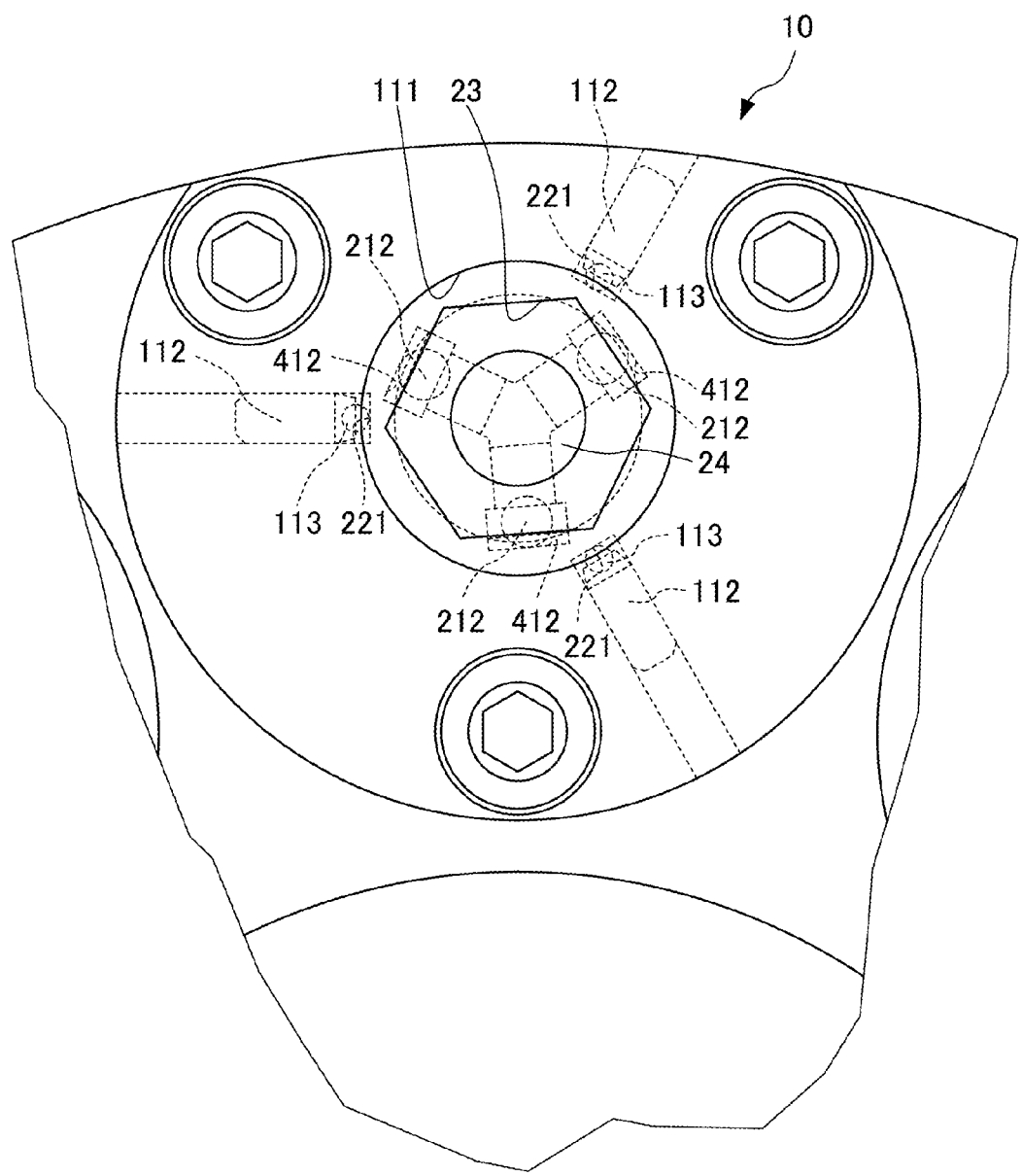
FIG. 37 is an enlarged plan view of a portion at which the head of the magazine is housed according to this embodiment.
Figure 38:
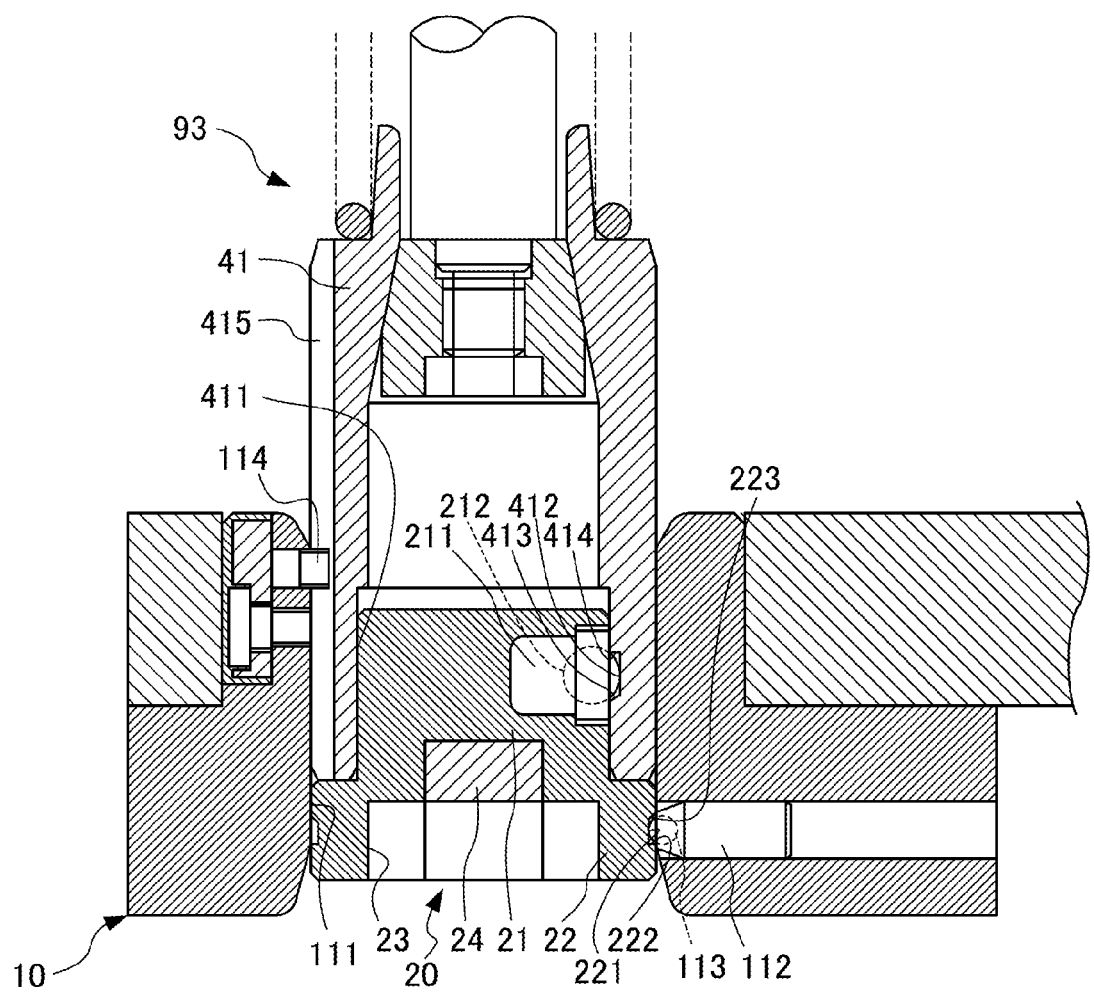
FIG. 38 is an enlarged cross-sectional view of a portion at which the head of the magazine is stored according to this embodiment.

FIG. 37 is an enlarged plan view of a portion at which the head 20 of the magazine 10 is housed, and FIG. 38 is an enlarged cross-sectional view of a portion at which the head 20 of the magazine 10 is housed. FIG. 38 shows a state in which the socket 41 is inserted in the head recess portion 111 of the magazine 10. A plunger 112 having a protractable/retractable ball 113 is provided at three locations in the inner circumferential surface of the head recess portion 111 of the magazine 10 on a front side thereof. The ball 113 is biased in a direction projecting from the inner circumferential surface of the head recess portion 111 by a spring that is not illustrated. A pin 114 projects at a position in the inner circumferential surface of the head recess portion 111 on a rear side of the magazine 10.

The head 20 includes a column-shaped head main body 21, and a disk-shaped flange portion 22 formed at a leading end side of this head main body 21 and having an outside diameter larger than the head main body 21. A hexagonal concaved portion is formed in the leading end surface of the head 20, and this concaved portion serves as a bolt retaining portion 23 in which the head of the bolt B fits. A magnet 24 is installed at the bottom surface of this bolt retaining portion 23, and retains the bolt B by way of the magnetic force of the magnet 24.

A concaved portion 221 in which the ball 113 of the aforementioned plunger 112 engages is formed at three locations on the outer circumferential surface of the flange portion 22. A wall surface of this concaved portion 221 on a leading end side of the head 20 is a vertical surface 222 that is substantially perpendicular to the axial direction of the head 20, and the wall surface of the concaved portion 221 on a base end side of the head 20 is a tapered surface 223 sloped relative to the axial direction of the head 20.

A plunger 211 having a protractable/retractable ball 212 is provided at three locations on the outer circumferential surface of the head main body 21. The ball 212 is biased to a direction projecting from the outer circumferential surface of the head main body 21 by a spring that is not illustrated.

A concaved portion is formed in the leading end surface of the socket 41, and this concaved portion is a head retaining portion 411 in which the head main body 21 of the head 20 fits and is retained. A concaved portion 412 at which the ball 212 of the aforementioned plunger 211 engages is formed in the inner circumferential surface of this head retaining portion 411. The wall surface of this concaved portion 412 on the leading end side of the socket 41 is a tapered surface 413 sloped relative to the axial direction of the socket 41, and the wall surface of the concaved portion 412 on a base end side of the socket 41 is a vertical surface 414 that is substantially perpendicular to the axial direction of the socket 41. In addition, a key groove 415 in which the pin 114 of the magazine 10 fits is formed in the outer circumferential surface of the socket 41 along the rotational axis of the socket 41.

Figure 39:
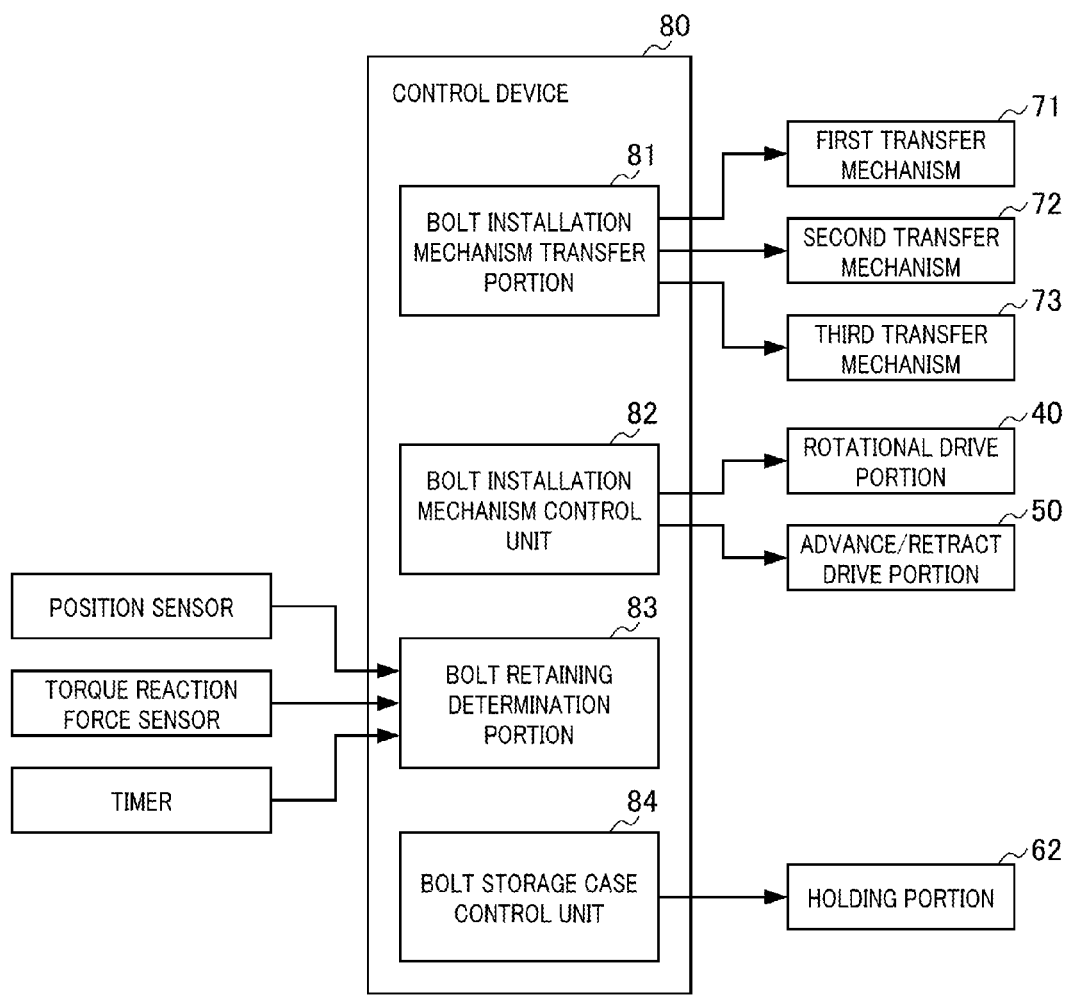
FIG. 39 is an illustration showing a block diagram of a control unit of the bolt loading system according to this embodiment.

FIG. 39 is an illustration showing a block diagram of the control device 80. The control device 80 includes a bolt installation mechanism transfer portion 81, a bolt installation mechanism control unit 82, a bolt retaining determination portion 83, and a bolt storage case control unit 84. The bolt installation mechanism transfer portion 81 controls a first transfer mechanism 71, a second transfer mechanism 72 and a third transfer mechanism 73 to move the bolt installation mechanism 70 to a predetermined position.

The bolt installation mechanism control unit 82 controls the rotational drive portion 93 and the advance/retract drive portion 97 to retain the bolt B by way of the bolt installation mechanism 70. More specifically, in a case of the head 20 being made to advance and approach the bolt B by way of the advance/retract drive portion 97, while the head 20 is made to rotate by the rotational drive portion 93, and it is determined that the bolt B fits in the head 20 by the bolt retaining determination portion 83, the head 20 is made to retract by the advance/retract drive portion 97.

Figure 40A:
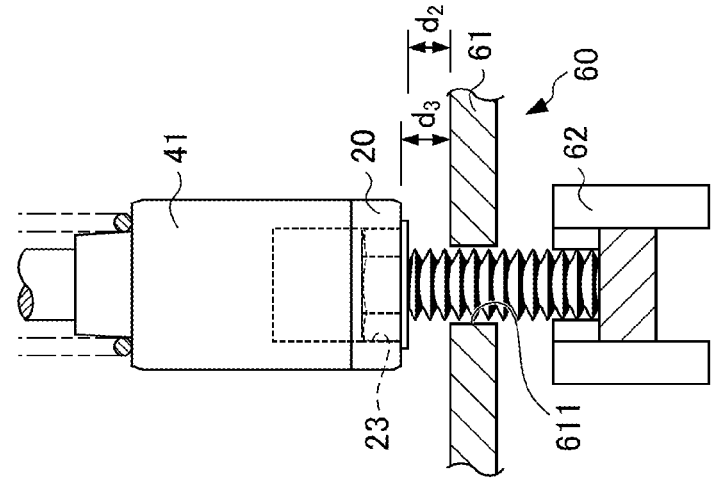
FIGS. 40A-40C are views illustrating operation of the control unit according to the embodiment.
Figure 40B:
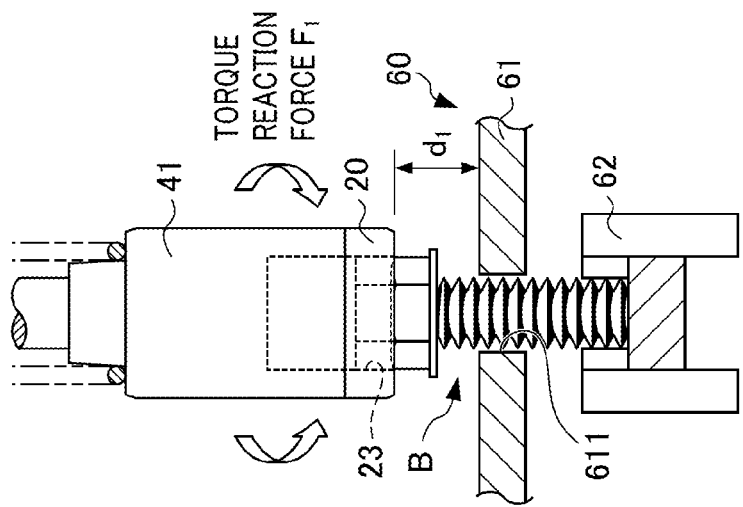
Figure 40C:
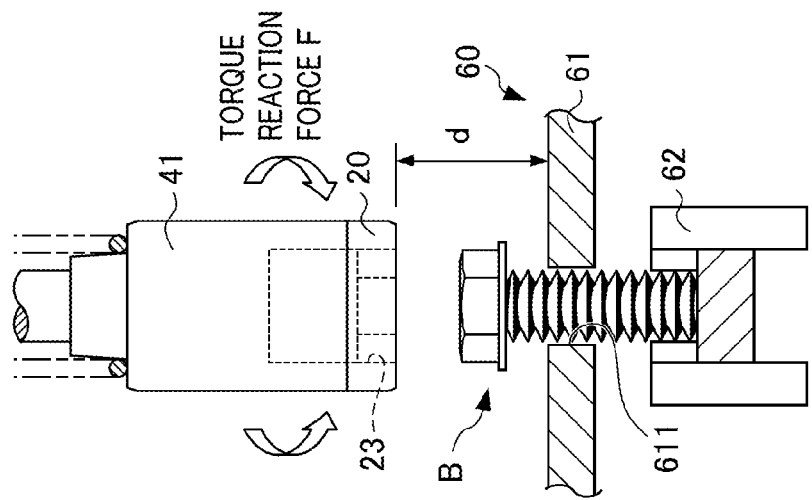

As shown in FIG. 40(*a*), the bolt retaining determination portion 83 detects a relative distance between the head 20 and the bolt B, herein the relative distance d from the lead end surface of the head 20 up to the surface of the of the case main body 61 from which the bolt B projects, based on a position sensor that is not illustrated. Then, in a case of this relative distance d being less than a first predetermined vale $d_1$ and a torque reaction force F of the head 20 detected by a torque reaction force sensor that is not illustrated being at least a predetermined value $F_1$, it is determined that the bolt B fits in the head 20.

Herein, the reason to define whether the relative distance d is less than the first predetermined value d1 as determination criteria for the bolt B fitting in the head 20 is as follows. Specifically, in a case of the lead end surface of the head 20 just riding above the head of the bolt B, the phase of the head 20 and the phase of the bolt B will not match, and thus it is not considered that the bolt B is fitted in the head 20. However, in a case of the head of the bolt B being slightly inserted inside the bolt retaining portion 23 of the head 20 and the relative distance d is $d_1$, the phase of the head 20 and the phase of the bolt B will match, and thus it is considered that the bolt B is fitted in the head 20, as shown in FIG. 40(*b*).

Furthermore, the reason to define whether the torque reaction force F is at least the predetermined value $F_1$ as determination criteria for the bolt B being retained is that, when the head of the bolt B is slightly inserted into the bolt retaining portion 23 of the head 20, rotation of the head 20 is restricted by the bolt B, as shown in FIG. 40(*b*). This bolt B does not rotate due to being held by the holding portion 62, and thus the torque reaction force $F_1$ of the bolt B acts on the head 20.

In addition, the bolt retaining determination portion 83 determines that the bolt B is not fit in the head 20 and the bolt B is not being retained, in a case of the relative distance d being less than a second predetermined value $d_2$, which is smaller than the first predetermined value $d_1$.

Herein, the reason to define whether the relative distance is less than the second predetermined value $d_2$ as determination criteria for the bolt B being retained is as follows. Specifically, as shown in FIG. 40(*c*), when the head of the bolt B is completely inserted into the bolt retaining portion 23 of the head 20, advancement of the bolt B ends, and the relative distance d becomes $d_3$. Therefore, when $d_2$, which is a value no more than $d_3$, is defined as the second predetermined value, there is a possibility that the bolt B is not present directly below the head 20 in a case of the relative distance d being less than the second predetermined value $d_2$.

In addition, the bolt retaining determination portion 83 measures the elapsed time required in bolt retaining using a timer that is not illustrated, and in a case of the relative distance d being at least the first predetermined value $d_1$ when this elapsed time exceeds a predetermined value, it is determined that the bolt B is not being retained.

Herein, the reason to define whether the relative distance d being at least the first predetermined value $d_1$ when the elapsed time exceeds a predetermined value as determination criteria for the bolt B being retained is as follows. Specifically, as described above, when the head of the bolt B is slightly inserted into the bolt retaining portion 23 of the head 20, the relative distance d becomes $d_1$. Therefore, since the leading end surface of the head 20 just rides above the head of the bolt B in a state in which the relative distance d is at least the first predetermined distance $d_1$, in a case of such a state spanning over a predetermined time, there is a possibility that some kind of failure has occurred. It should be note that, in this case, the head 20 is made to retract to temporarily separate the head 20 from the bolt B, after which retaining the bolt B may be retried by causing the head 20 to advance again. The likelihood of the bolt B fitting the head 20 is raised by performing a retry, whereby it is possible to more reliably retain the bolts B in the heads 20.

The bolt storage case control unit 84 holds the bolt B by way of the holding portion 62, and in a case of it having been determined by the bolt retaining determination portion 83 that the bolt B fits in the head 20, releases the holding of this bolt B by the holding portion 62.

Figure 41:
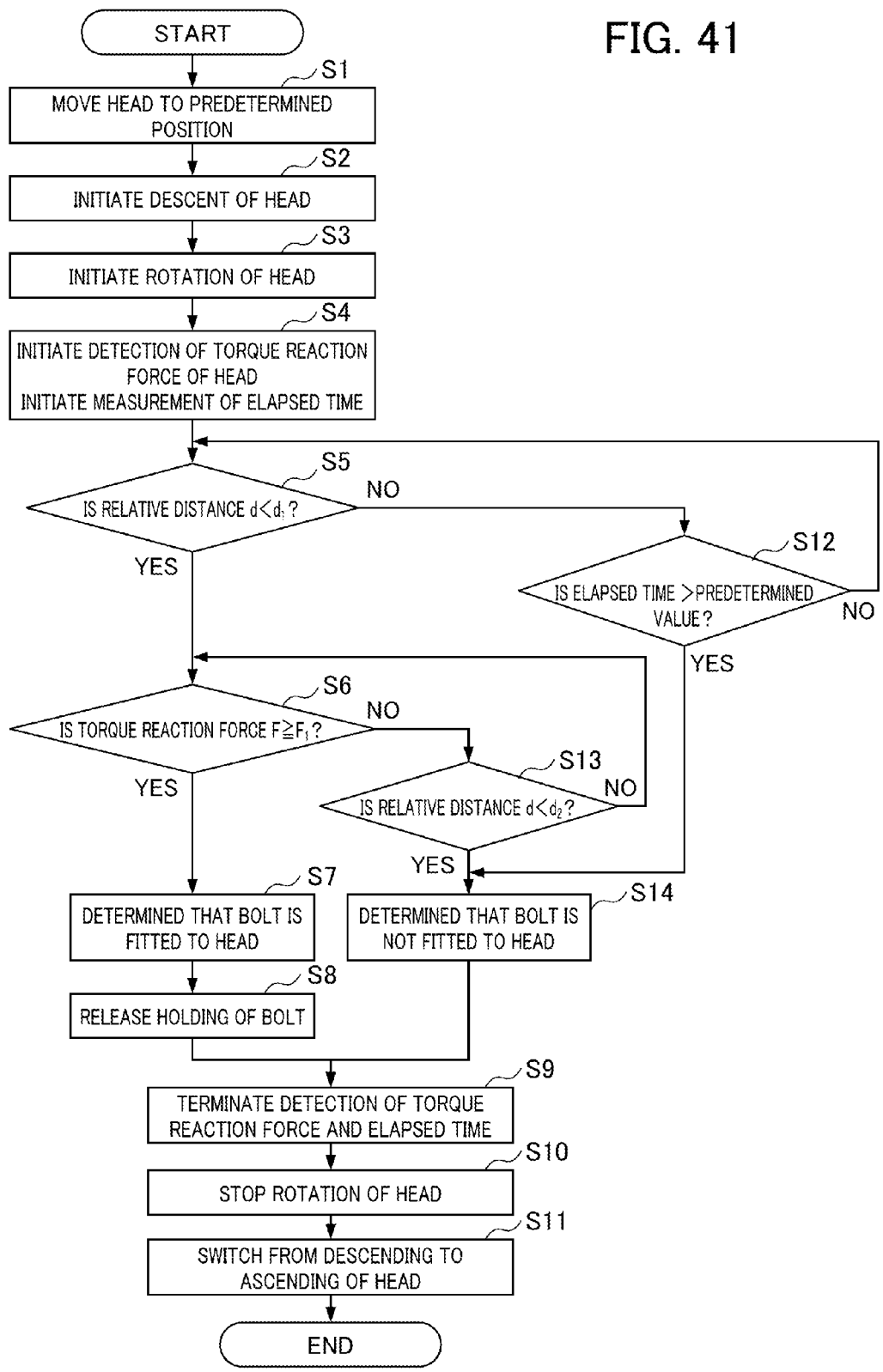
FIG. 41 is a flowchart of operations of the bolt loading system according to this embodiment.
Figure 42:
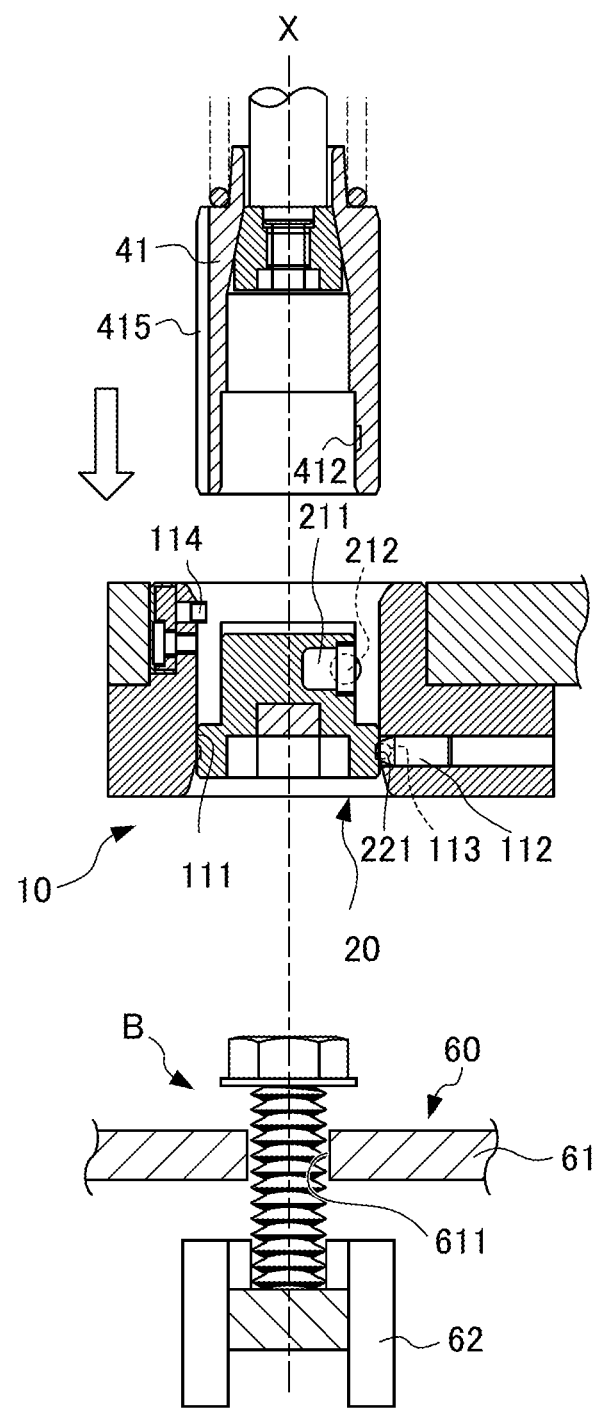
FIG. 42 is a view (1) illustrating operation of the bolt loading system according to this embodiment.

Next, operations of the aforementioned bolt loading system 1 will be explained while referring to the flowchart of FIG. 41. First, in Step S1, the first transfer mechanism 71, the second transfer mechanism 72 and the third transfer mechanism 73 are controlled by the control device 80 to make the bolt loading system 1 approach a bolt storage case 60 in which a predetermined type of the bolts B is stored, and moves so that this bolt B is positioned on the rotational axis X of the socket 41 of the bolt loading system 1, as shown in FIG. 42. In addition, the magazine 10 is made to rotate by controlling the switching portion 90 to cause a head 20 to be selectively arranged between the socket 41 and the bolt B in accordance with this predetermined type of bolt B.

Next, the socket 41 is made to descend by driving the advance/retract drive portion 97 to approach the head recess portion 111 of the magazine 10.

Figure 43:
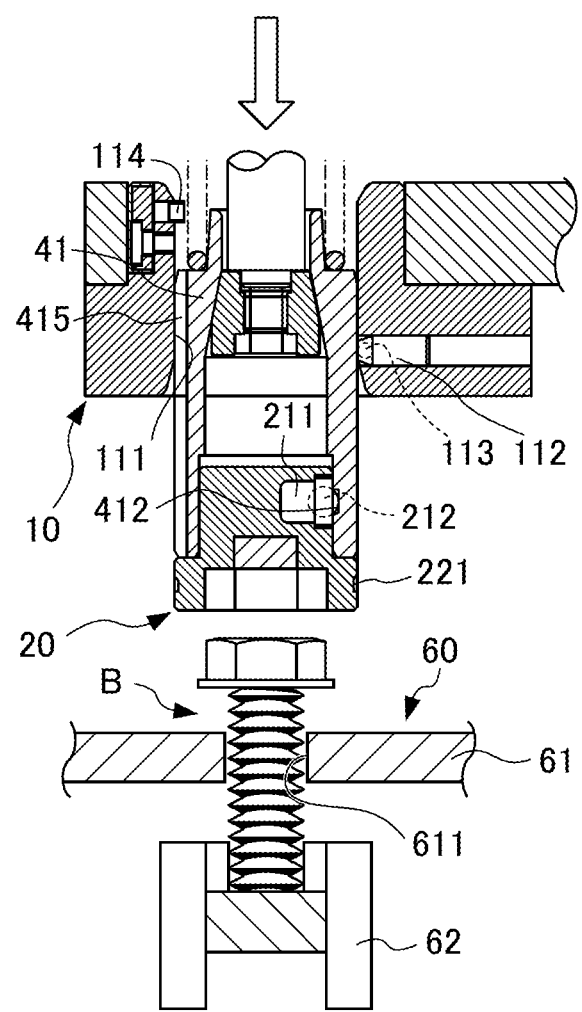
FIG. 43 is a view (2) illustrating operation of the bolt loading system according to this embodiment.

Then, the socket 41 is inserted into the head recess portion 111 while causing the key groove 415 of the socket 41 to fit together with the pin 114 of the head recess portion 111 of the magazine 10, as shown in FIG. 43. When this is done, the plunger 211 of the head 20 engages the concaved portion 412 of the socket 41, whereby the socket 41 retains the head 20. Furthermore, the socket 41 is made to descend further by driving the advance/retract drive portion 97, whereby this socket 41 is made to penetrate the head recess portion 111. At this time, the engaging between the concaved portion 221 of the head 20 and the plunger 112 of the magazine 10 is released, the head 20 detaches from the magazine 10, and moves below the magazine 10 along with the socket 41. Thereafter, the socket 41 is made to descend and this head 20 moves to a predetermined position.

In Step S2, the advance/retract drive portion 97 continues to be driven and the descent of the head 20 is initiated. In Step S3, the head 20 is made to rotate by driving the rotational drive portion 93, whereby the phase of the bolt retaining portion 23 of the head 20 is made to change.

In Step S4, detection of the torque reaction force F of the head 20 by a force sensor is initiated, and measurement of an elapsed time required in bolt retaining is initiated by driving a timer.

In Step S5, the aforementioned relative distance d is obtained, and it is determined whether this relative distance d is less than the first predetermined value $d_1$. In a case of this determination being YES, there is a possibility that the phase of the bolt retaining portion 23 of the head 20 and the phase of the head of the bolt B match, and thus Step S6 is advanced to. On the other hand, in a case of this determination being NO, Step S12 is advanced to.

In Step S6, it is determined whether the torque reaction force F of the head 20 is at least the predetermined value $F_1$. In a case of this determination being YES, it is considered that the torque reaction force F from the bolt B is acting on the head 20, and thus Step S7 is advanced to. On the other hand, in a case of this determination being NO, Step S13 is advanced to.

Figure 44:
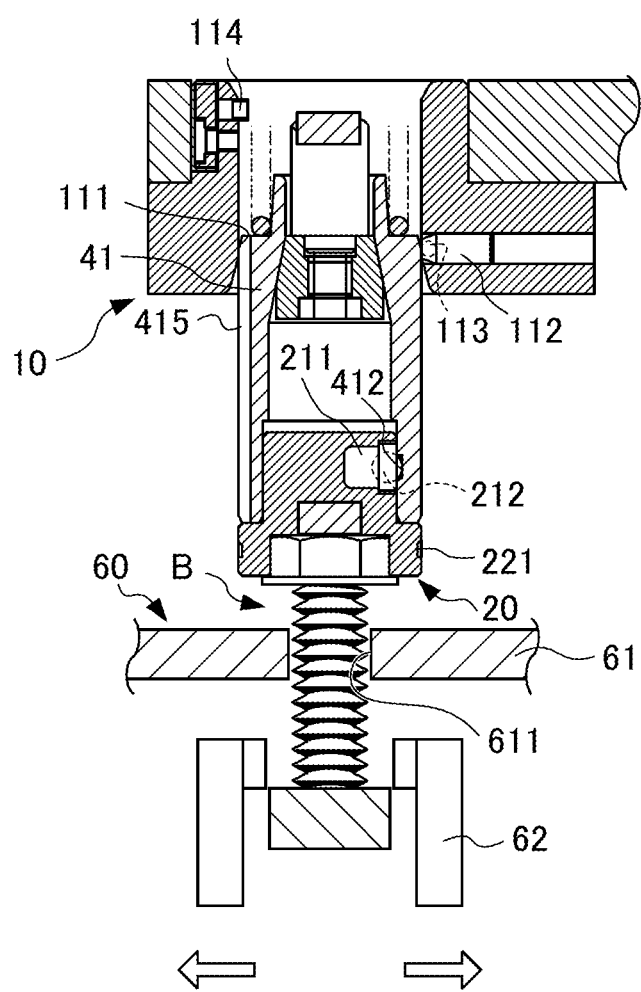
FIG. 44 is a view (3) illustrating operation of the bolt loading system according to this embodiment.

In Step S7, it is determined that the bolt B fits in the head 20, and in Step S8, the holding of the bolt B by the holding portion 62 is released, as shown in FIG. 44. In Step S9, detection of the torque reaction force F of the head 20 by the force sensor and measurement of the elapsed time by the timer are terminated, and in Step S10, rotation of the head 20 by the rotational drive portion 93 is stopped. In Step S11, the head 20 is switched from descending to ascending by controlling the advance/retract drive portion 97. When this is done, the head retracts along with the socket 41, the concaved portion 221 of the head 20 and the plunger 112 of the magazine 10 engage, and the head 20 is retained to the magazine 10 again.

Furthermore, the socket 41 is made to retract by driving the advance/retract drive portion 97, and this socket 41 pulls out from the head recess portion 111, as shown in FIG. 45. At this time, the engaging between the plunger 211 of the head 20 and the concaved portion 412 of the socket 41 is released, the head 20 detaches from the socket 41, and the socket 41 retracts alone.

Subsequently, the same operations as the aforementioned operations are repeated to load the bolts B into all of the heads 20.

On the other hand, in Step S12, it is determined whether the elapsed time required in fitting of the bolt has exceeded a predetermined value. In a case of this determination being YES, there is a possibility that a failure has occurred, and thus Step S14 is advanced to. On the other hand, in a case of this determination being NO, Step S5 is returned to, and fitting of the bolt continues to be tried.

In Step S13, it is determined whether this relative distance d is less than the second predetermined value $d_2$. In a case of this determination being YES, there is a possibility that a failure has occurred, and thus Step S14 is advanced to. On the other hand, in a case of this determination being NO, Step S6 is returned to, and fitting of the bolt continues to be tried.

In Step S14, it is determined that the bolt B is not fitted in the head 20, Step S9 is advanced to, and the bolt retaining operation ends.

There are the following effects according to the present embodiment.

(1) In a case of a relative distance d between the head 20 and the bolt B being less than the first predetermined value $d_1$, it is determined that the bolt B fits in the head 20. Therefore, since it can be determined that the bolt B fits in the head 20 just by being slightly inserted, even if the leading end of the bolt is not completely inserted in the head 20 as is conventionally, phasing between the bolt B and the head 20 ends, and then rotation of the head 20 can be stopped immediately, and thus time loss can be reduced.

(2) In a case of the torque reaction force F of the retaining portion being at least the predetermined value $F_1$ in addition to the relative distance between the head 20 and the bolt B being less than the first predetermined value $d_1$, it is determined that the bolt B fits in the head 20. If the leading end of the bolt B is slightly inserted into the bolt retaining portion 23 of the head 20, rotation of the head 20 will be restricted by the bolt B, and a torque reaction force generates at the head 20. Therefore, it can be more reliably determined that the bolt B has been fitted to the head 20, whereby malfunctions can be prevented.

In addition, in a case of the relative distance d being less than the second predetermined value $d_2$, it is determined that the bolt B is not fitted into the head 20. Therefore, even in a case of the head 20 being made to descend in an attempt to retain the bolt B, irrespective of the bolt B not existing directly below the head 20, it is possible to quickly move to a subsequent operation.

(3) In a case of determining that the bolt B is fitted to the head 20, since the head 20 is made to retract by the advance/retract drive portion 97, it is possible to quickly move to a subsequent operation after the head 20 retains the bolt B.

(4) In a case of determining that the bolt B is fitted in the head 20, holding of the bolt B by the holding portion 52 is released. Therefore, the bolt B can be prevented from falling in the period until fitting into the head 20 of the bolt loading device 4A, 4B by the holding portions 62, and the bolt B can be reliably loaded to the bolt loading devices 4A, 4B. In addition, provided that it is not determined that the bolt B is fitted in the head 20, the holding of the bolt B by the holding portions 62 is not released; therefore, the bolt B can be prevented from being retained in the head 20 at an unstable attitude. Therefore, irrespective of the phase of the bolt B and the phase of the head 20 not matching, for example, when the bolt B is attracted by the magnet 24 of the head 20, although this bolt B may be at a sloped attitude relative to the head 20, such a situation can be avoided. In addition, even in a case of fitment between the bolt B and the head 20 having failed, a retry trying to retain the bolt B again is possible by making the head 20 retract to temporarily separate the head 20 from the bolt B, and then making the head 20 advance toward the bolt B again. In addition, in a case of determining that the bolt B is not fitted into the head 20, the time loss due to the retry can be reduced if the retry is executed immediately.

(5) The elapsed time require in fitment of the bolt is measured, and in a case of the relative distance d being at least the first predetermined value $d_1$ when this elapsed time exceeds a predetermined value, it determined that the bolt B is not fitted in the head 20. Therefore, in a case in which a long time is required for the bolt B to fit into the head 20, it is possible to quickly move to a subsequent operation.

Figure 46A:
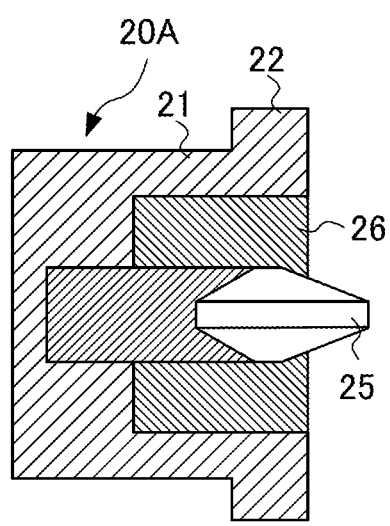
FIGS. 46A and 46B are a cross-sectional view and front view, respectively, of a head according to a modified example according to the present invention.
Figure 46B:
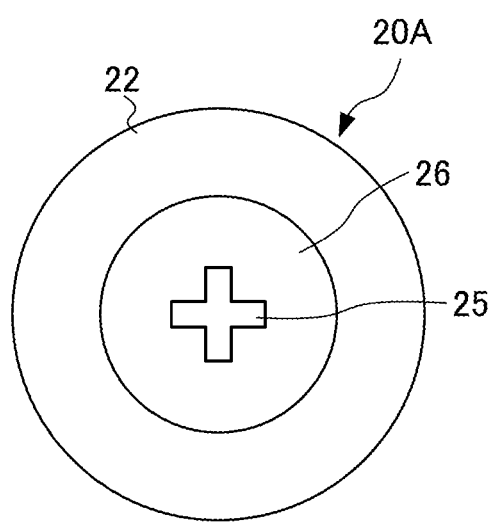

It should be noted that the present invention is not to be limited to the aforementioned embodiments, and modifications, improvements, etc. within a scope that can achieve the objects according to the present invention are included in the present invention. For example, although the head 20 is structured to retain the bolt B in each of the embodiments, it is not limited thereto, and a head 20A may be a structure to retain a screw, as shown in FIG. 46. Specifically, a projecting portion of a substantially cross-shape is formed at the leading end surface of the head 20A, and this projecting portion serves as a screw retaining portion 25 with which the head of a screw fits. In addition, a magnet 26 is attached to the circumference of this screw retaining portion 25, and a screw is retained by the magnetic force of this magnet 26.

The invention claimed is:

1. A method of loading a fastening member to a plurality of heads retained to a magazine, comprising the steps of:
   selecting one of said plurality of heads;
   disposing the selected head between a socket and the fastening member;
   advancing the socket in an advancing direction toward the selected head and engaging said socket with said selected head;

retaining the selected head on the socket;

moving the socket further in the advancing direction so as to detach the selected head from the magazine and move the selected head away from the magazine in the advancing direction while retaining the selected head on the socket;

engaging the selected head with the fastening member;

retaining the fastening member on the selected head by fitting the fastening member into the selected head as the socket and selected head are moved in the advancing direction; and retracting the socket and the selected head together with the retained fastening member so as to move the socket and selected head in a retracting direction, which is opposite to the advancing direction and toward the magazine, wherein the step of retaining the fastening member includes the steps of:

rotating the socket, while advancing the selected head toward the fastening member;

initiating detection of a torque reaction force of the head, and measurement of an elapsed time required in the fastening member retaining;

monitoring a relative distance of the selected head relative to the fastening member, while determining whether the elapsed time required in fitting of the fastening member has exceeded a predetermined time value;

determining whether the torque reaction force of the head is at least a predetermined torque reaction force value when the relative distance is equal to or less than a first predetermined value, while determining whether the relative distance is less than a second predetermined value; and determining that the fastening member is fitted to the selected head when the torque reaction force of the head is at least the predetermined value.

2. A method of loading a fastening member according to claim 1, further comprising: when the relative distance is more than the predetermined value after a second predetermined time value performing the steps of: determining that the fastening member is not fitted to the selected head, causing the selected head to be separated from the fastening member by moving the socket in the retracting direction, and performing a retry by rotating and advancing the socket and the selected head.

3. A method of loading a fastening member according to claim 1, wherein the step of retaining the fastening member further includes the step of:

determining that the fastening member is not fitted to the selected head when the torque reaction force of the head is not at least the predetermined value and the relative distance is less than a second predetermined value or when the relative distance is not equal to or less than a first predetermined value and the elapsed time required in fitting of the fastening member has exceeded a predetermined value.

* * * * *